United States Patent [19]

Watanabe

[11] Patent Number: 4,733,307

[45] Date of Patent: Mar. 22, 1988

[54] LIGHT BEAM RECORDING APPARATUS, LIGHT BEAM READ-OUT APPARATUS AND LIGHT BEAM SCANNING APPARATUS

[75] Inventor: Hideo Watanabe, Kanagawa, Japan

[73] Assignee: Fuji Photo Film Co., Ltd., Minami-ashigara, Japan

[21] Appl. No.: 913,484

[22] Filed: Sep. 30, 1986

[30] Foreign Application Priority Data

| Oct. 1, 1985 | [JP] | Japan | 60-218393 |
|---|---|---|---|
| Oct. 1, 1985 | [JP] | Japan | 60-218394 |
| Oct. 2, 1985 | [JP] | Japan | 60-219820 |
| Oct. 2, 1985 | [JP] | Japan | 60-219821 |
| Oct. 2, 1985 | [JP] | Japan | 60-219822 |
| Oct. 9, 1985 | [JP] | Japan | 60-225872 |
| Oct. 9, 1985 | [JP] | Japan | 60-225873 |
| Oct. 16, 1985 | [JP] | Japan | 60-230292 |
| Oct. 16, 1985 | [JP] | Japan | 60-230293 |
| Oct. 16, 1985 | [JP] | Japan | 60-230294 |
| Oct. 17, 1985 | [JP] | Japan | 60-232027 |
| Oct. 17, 1985 | [JP] | Japan | 60-232028 |

[51] Int. Cl.⁴ ............................................. H04H 1/04
[52] U.S. Cl. ........................... 358/285; 353/293; 250/578; 355/14 SH
[58] Field of Search .............. 358/285, 293, 294; 400/636.2, 187; 355/8, 14 SH; 250/570

[56] References Cited

U.S. PATENT DOCUMENTS

| 4,622,594 | 11/1986 | Homjo et al. | 358/293 |
| 4,623,937 | 11/1986 | Watanabe | 358/293 |
| 4,630,127 | 12/1986 | Fuwa | 358/285 |
| 4,649,437 | 3/1987 | Watanabe | 358/285 |

Primary Examiner—Edward L. Coles, Sr.
Attorney, Agent, or Firm—Gerald J. Ferguson, Jr.; Michael P. Hoffman; Michael J. Foycik, Jr.

[57] ABSTRACT

A light beam scanning apparatus used for image recording or read-out comprises a light deflector for deflecting a light beam, an image forming lens for forming an image of the light beam on a predetermined straight line, and a long sub-scanning mirror provided moveably in the optical axis direction of the image forming lens and extending in a main scanning direction in the form inclining with respect to the optical path of the light beam passing through the image forming lens. A scanning sheet holding device holds the scanning sheet on a plane formed by a locus of a straight line moving as the sub-scanning mirror is moved in the optical axis direction of the image forming lens and lying at a position conjugate with the predetermined straight line, on which the image of the light beam is formed by the image forming lens, with respect to the sub-scanning mirror.

34 Claims, 109 Drawing Figures

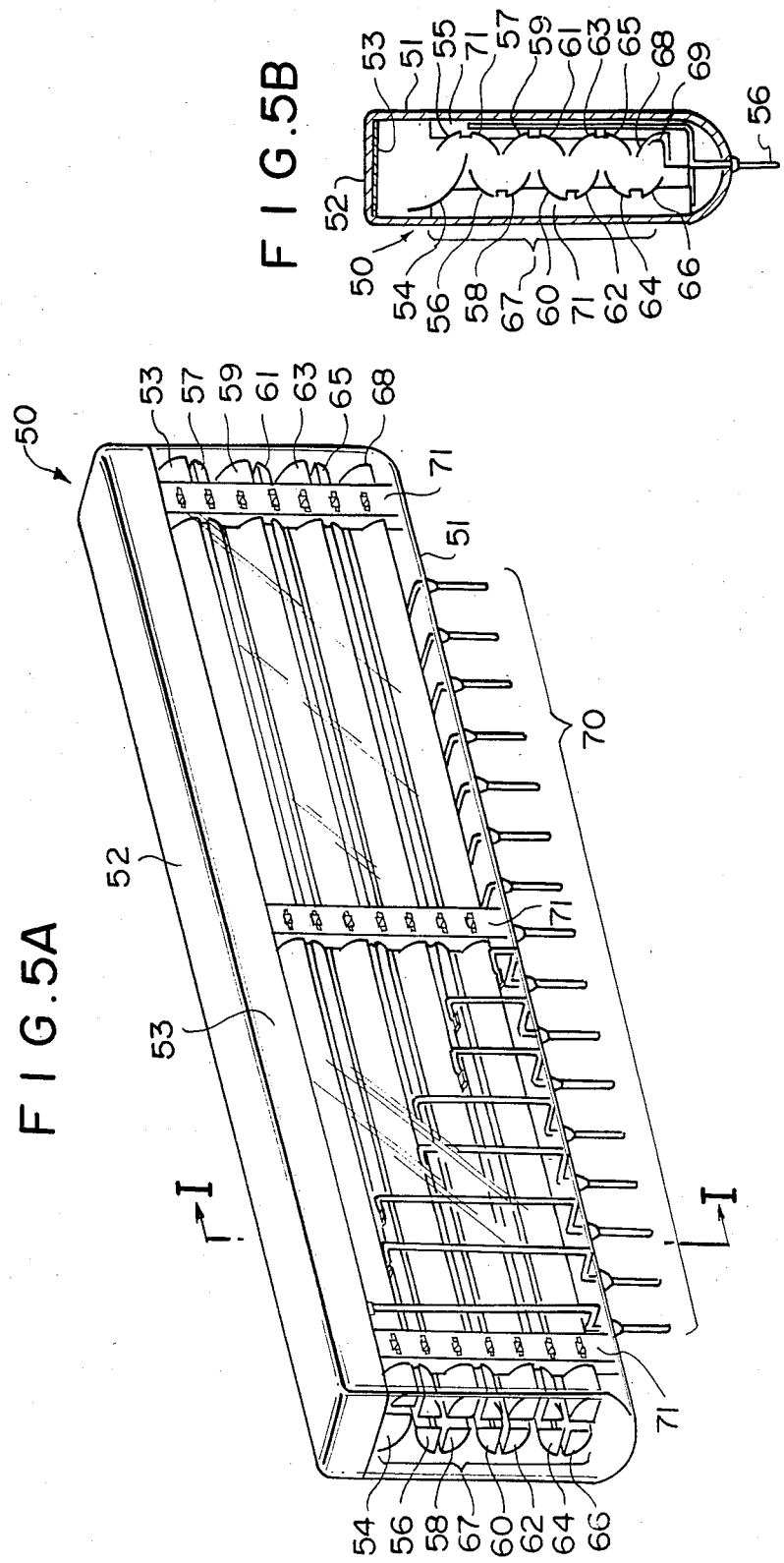

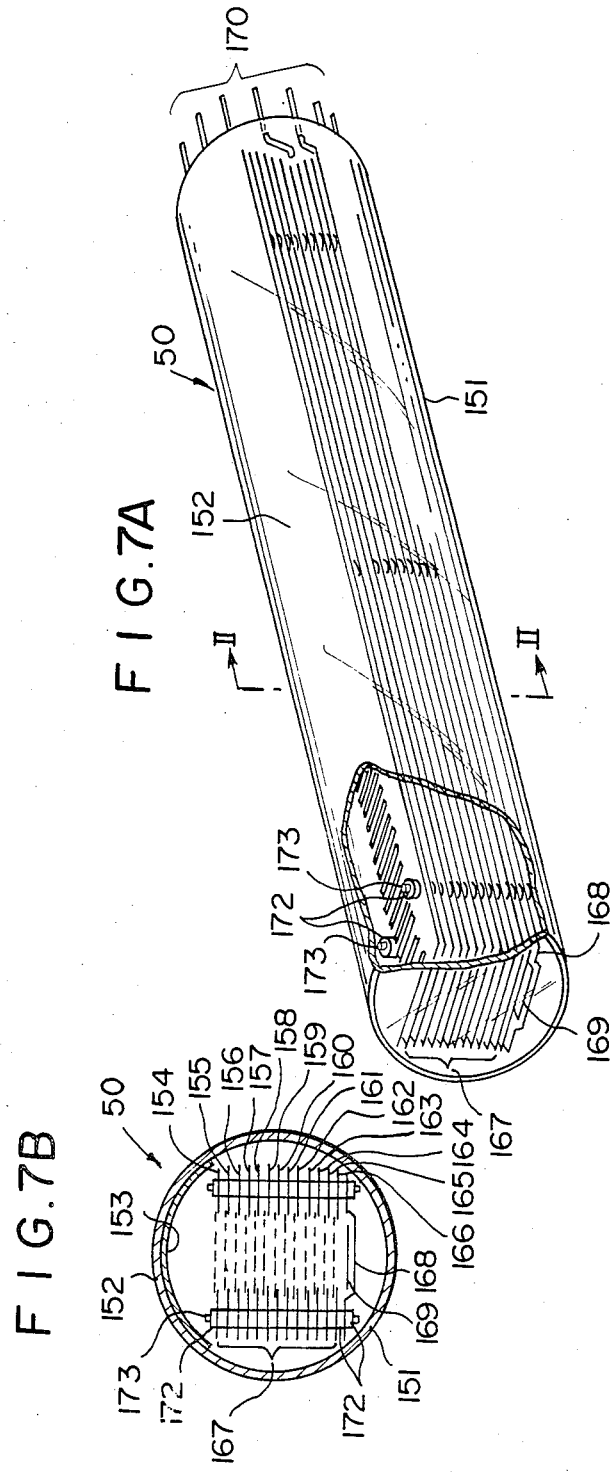

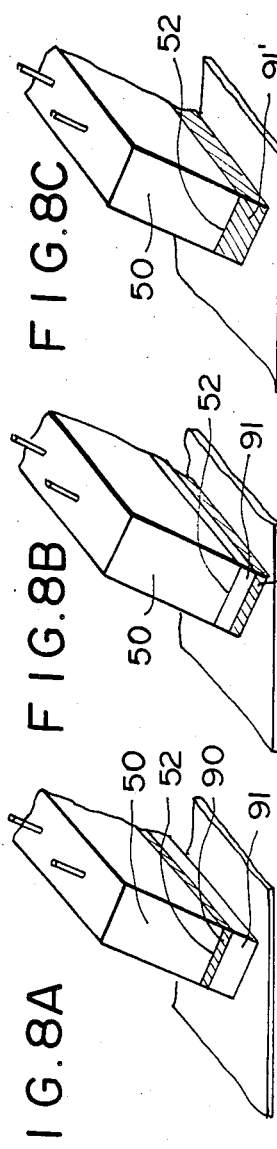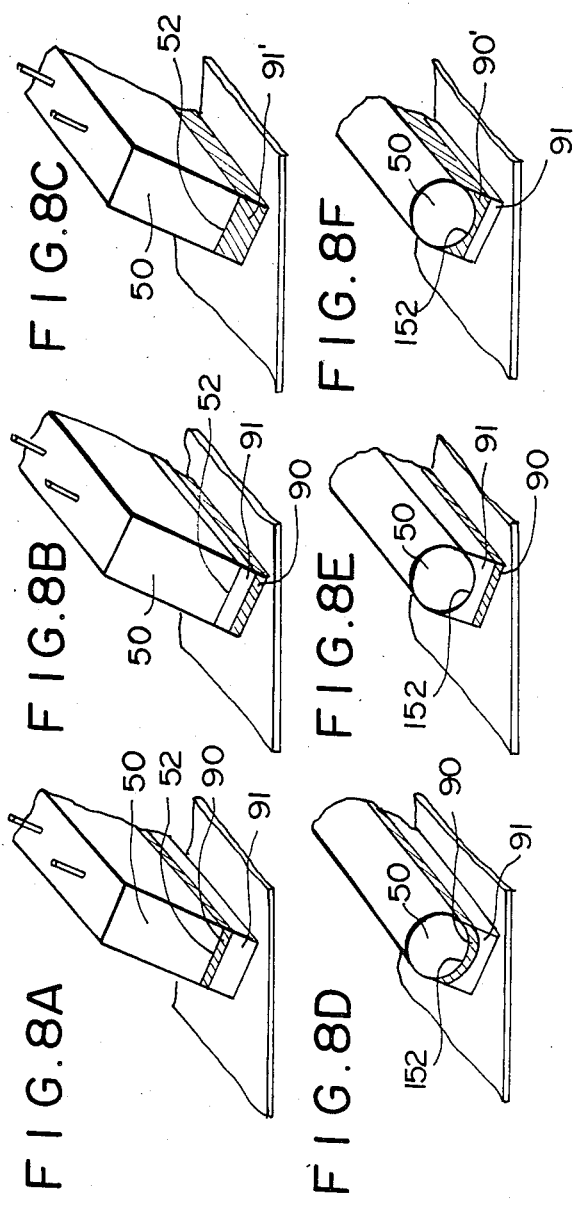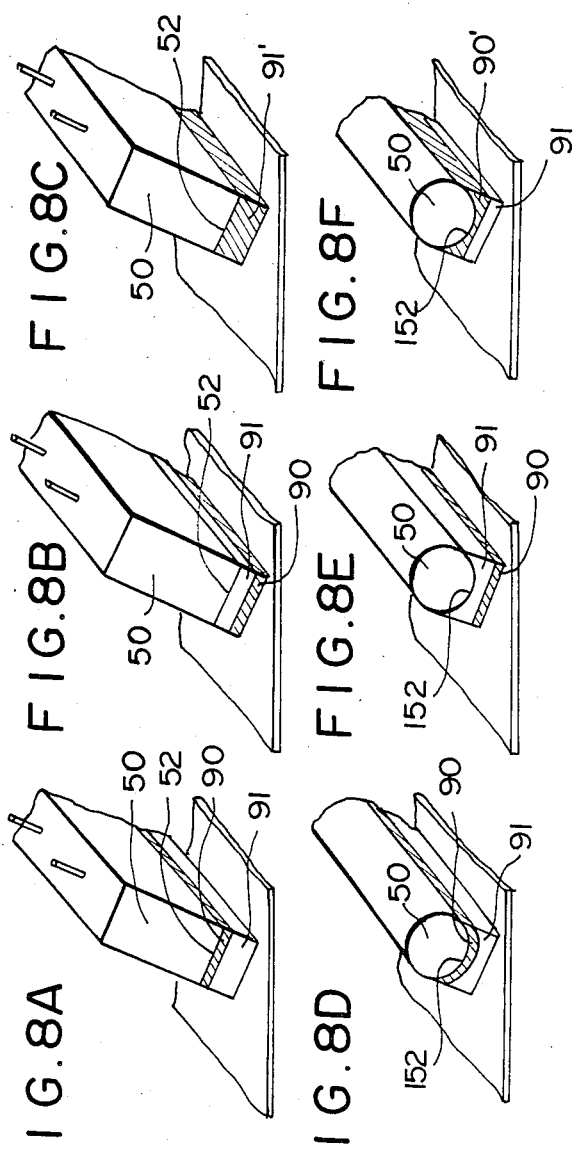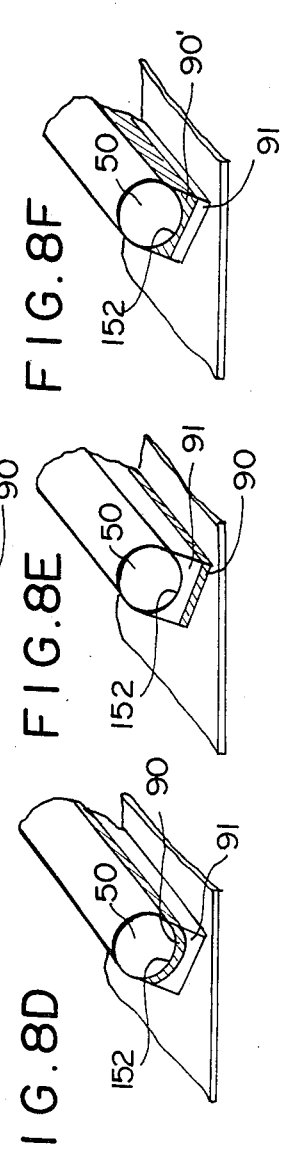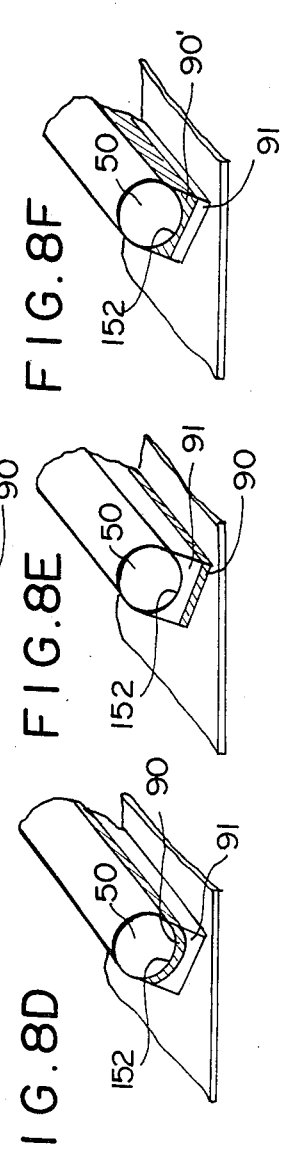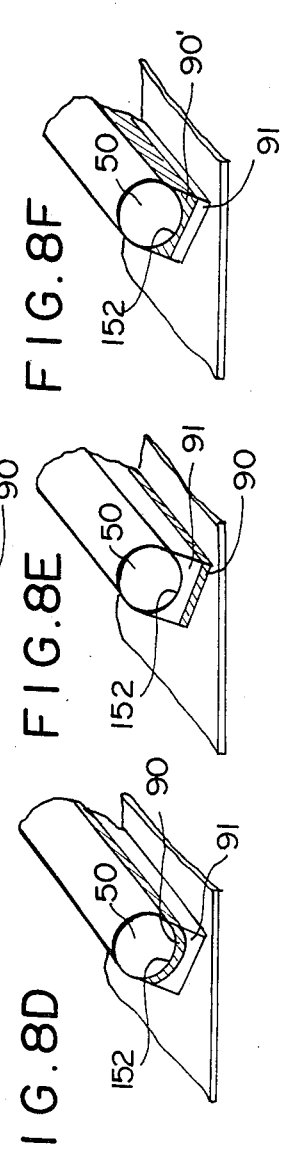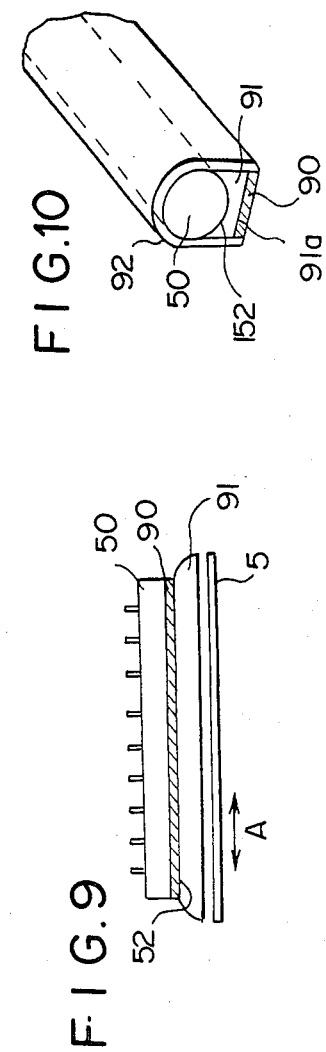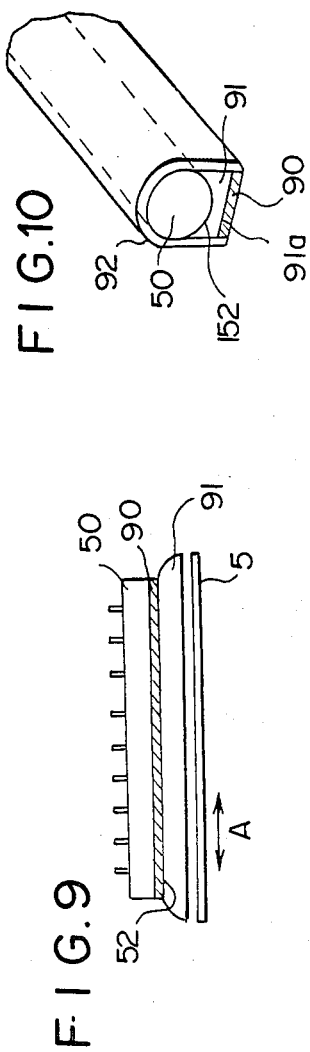

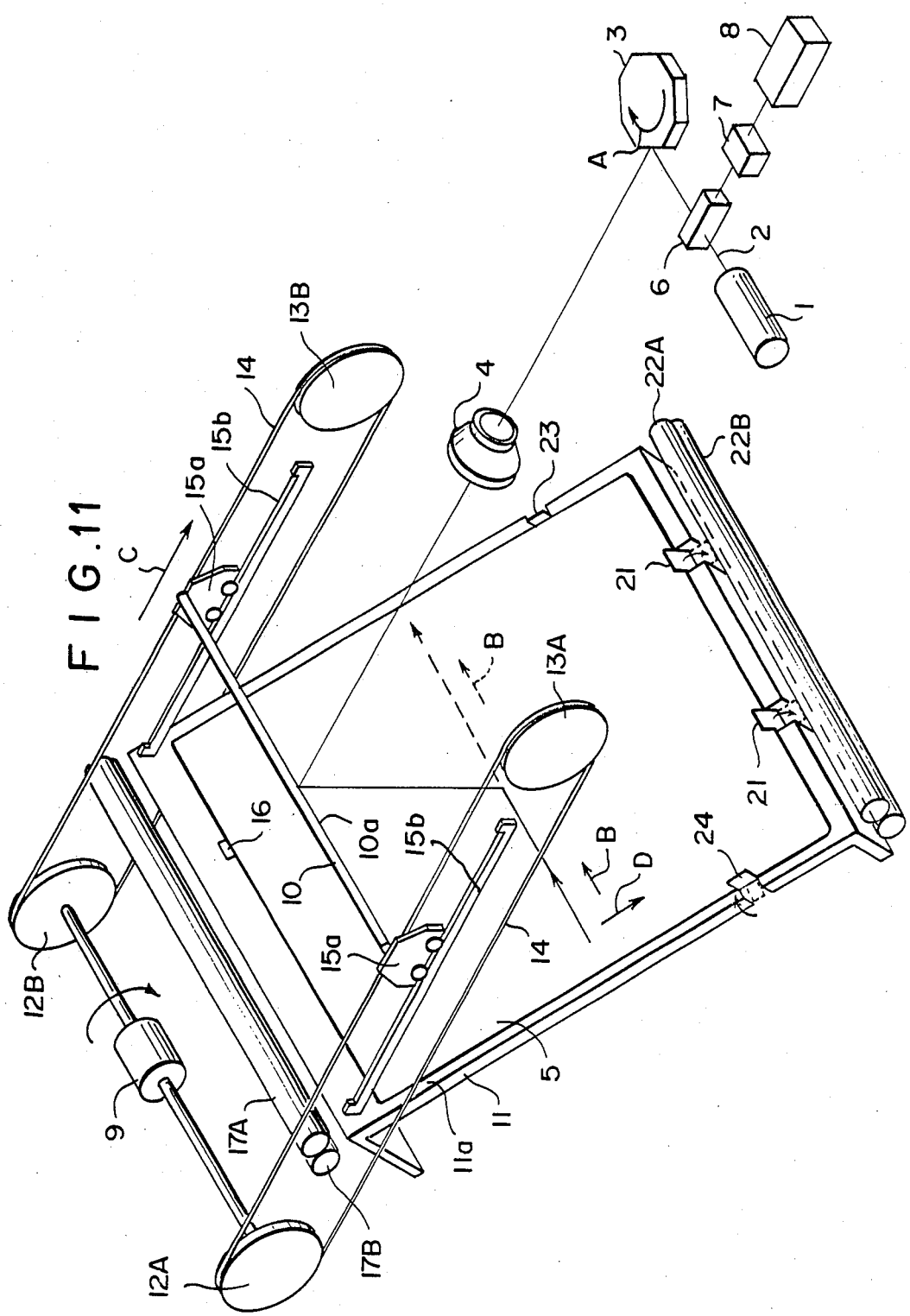

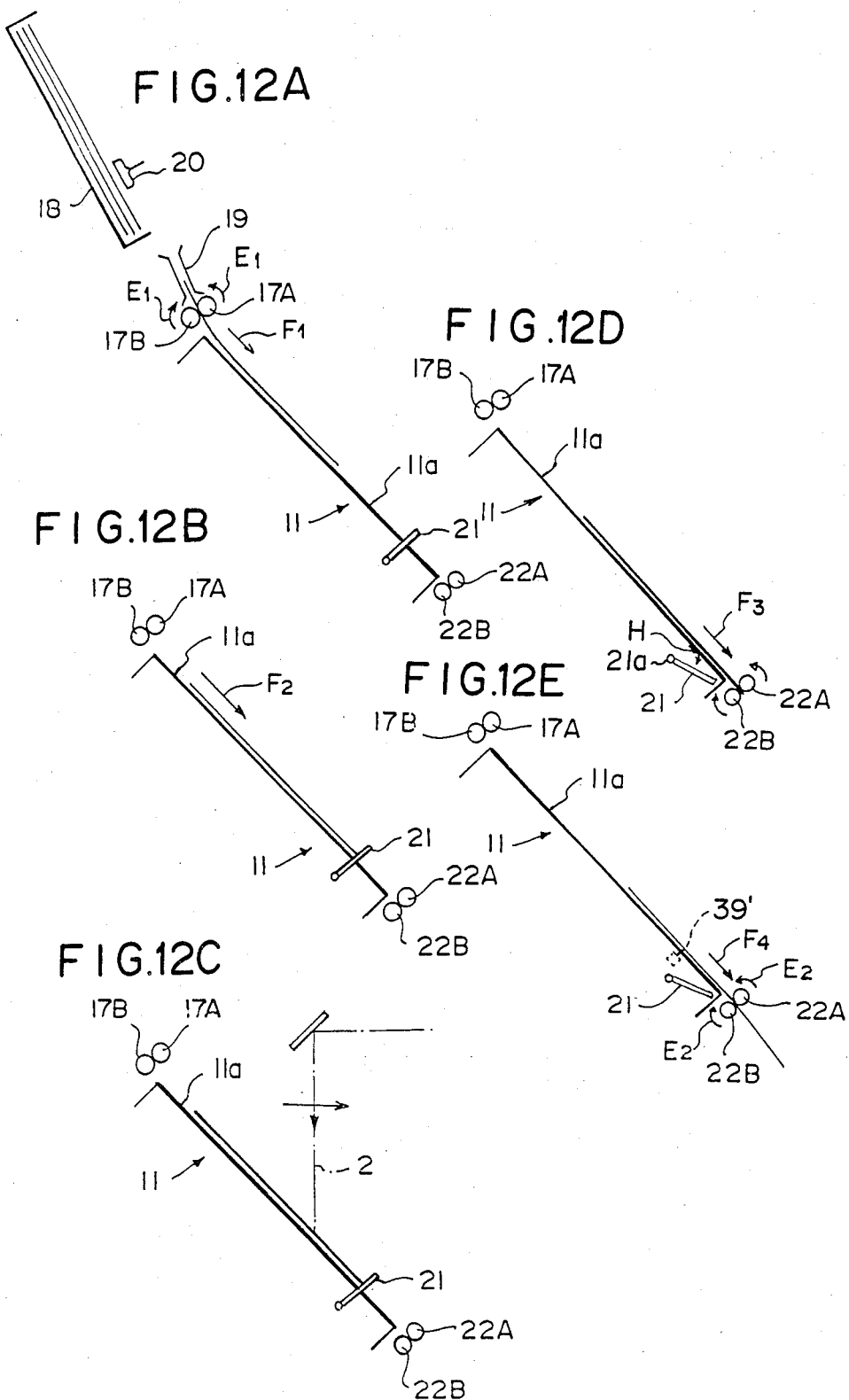

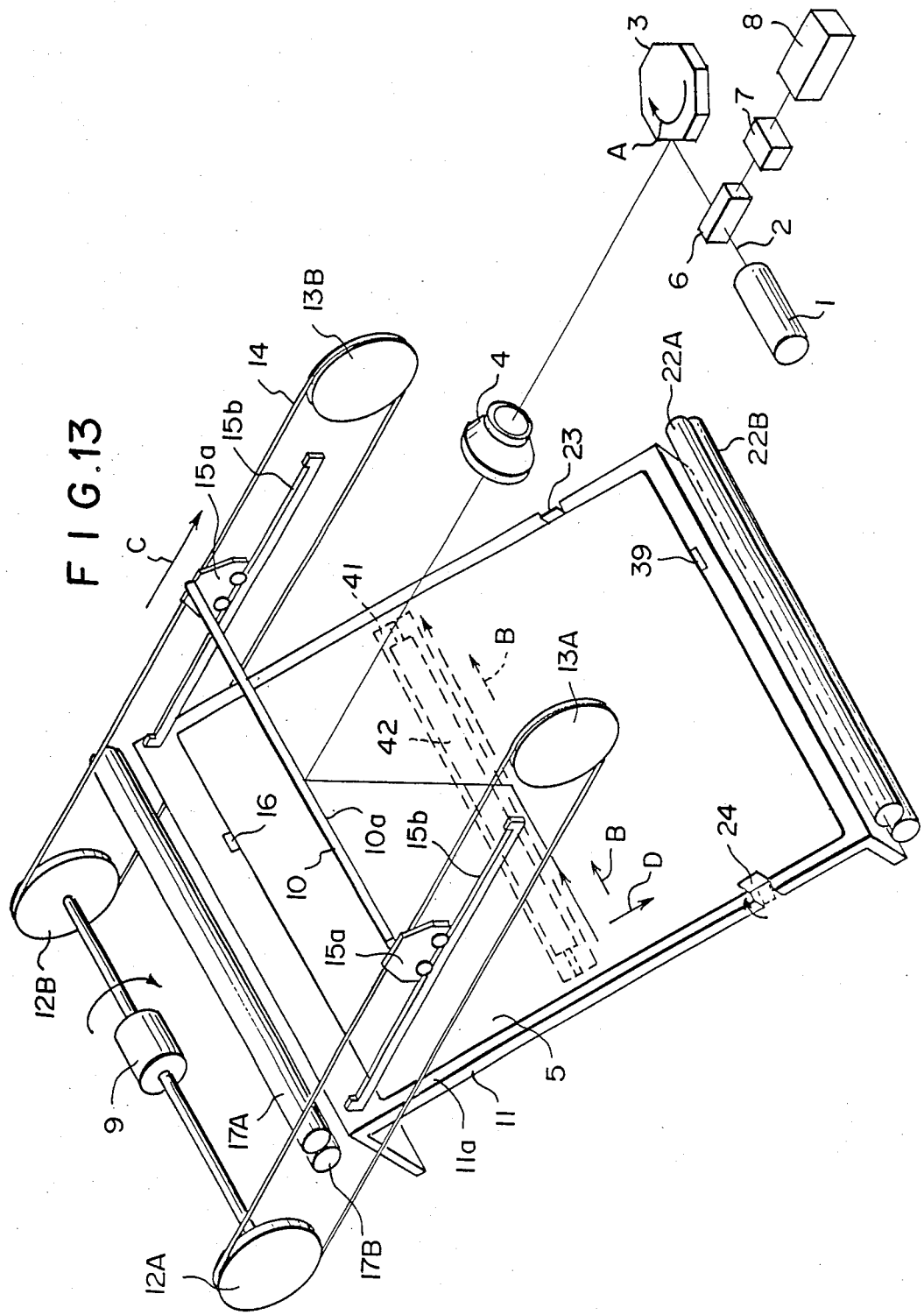

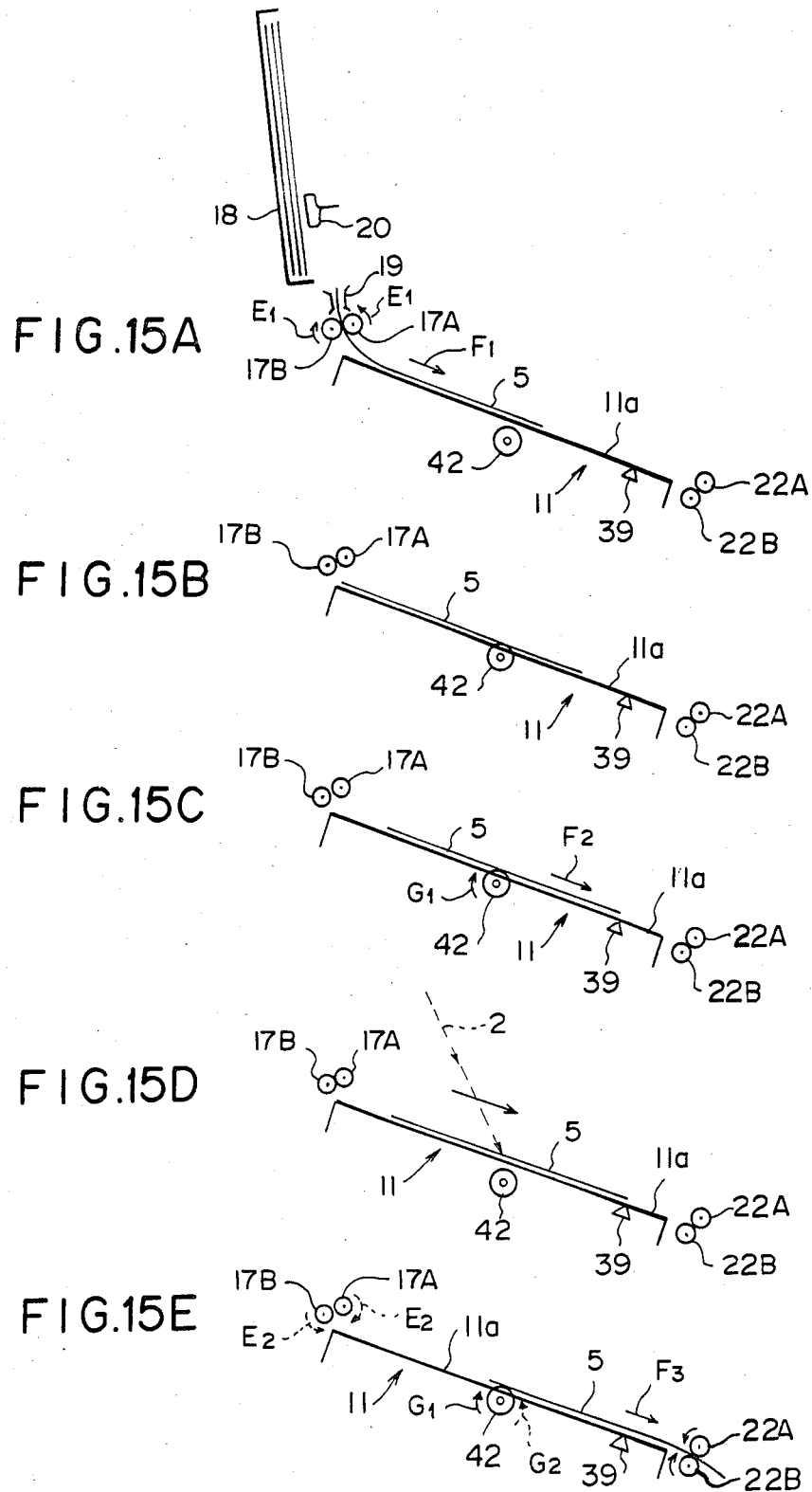

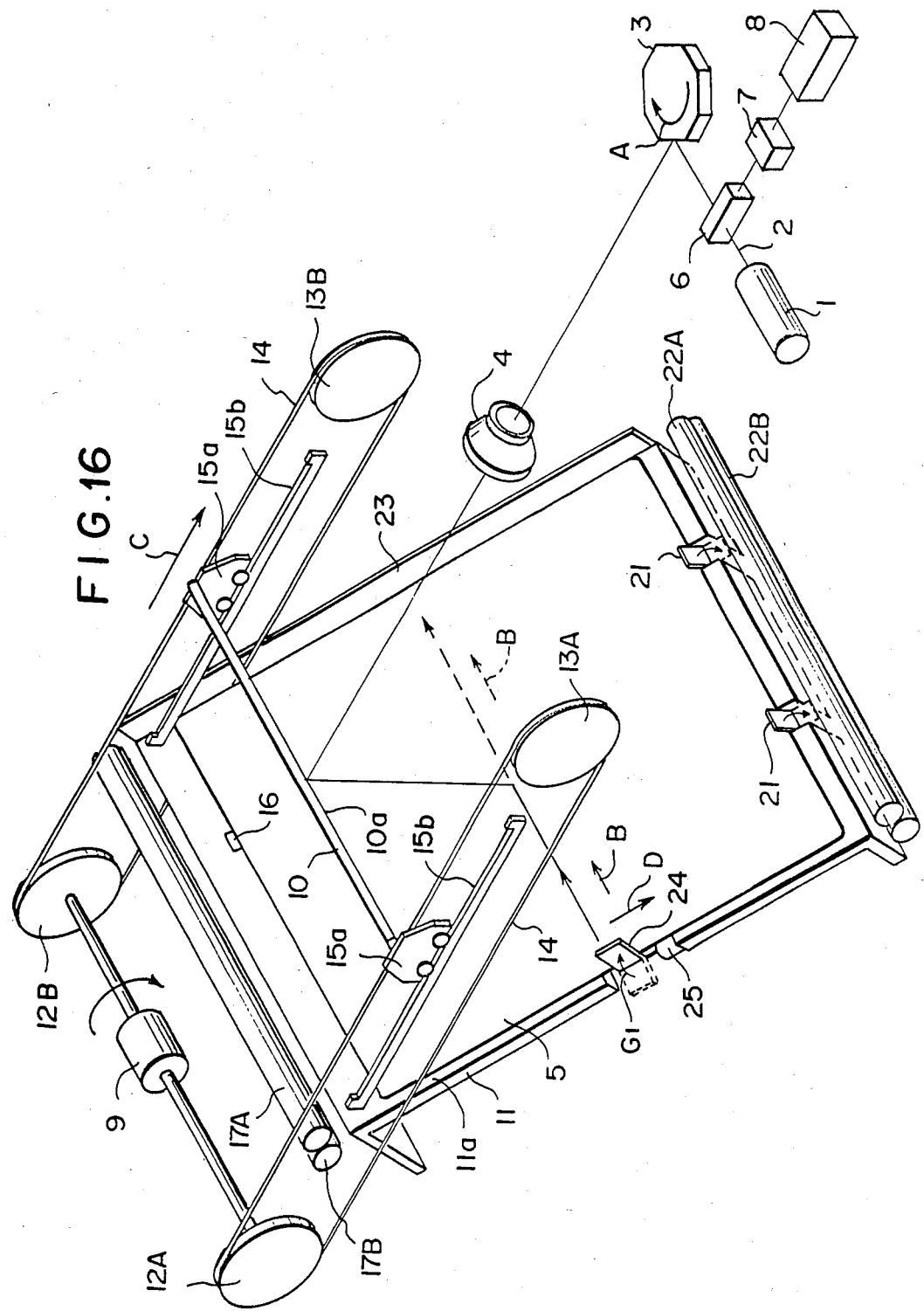

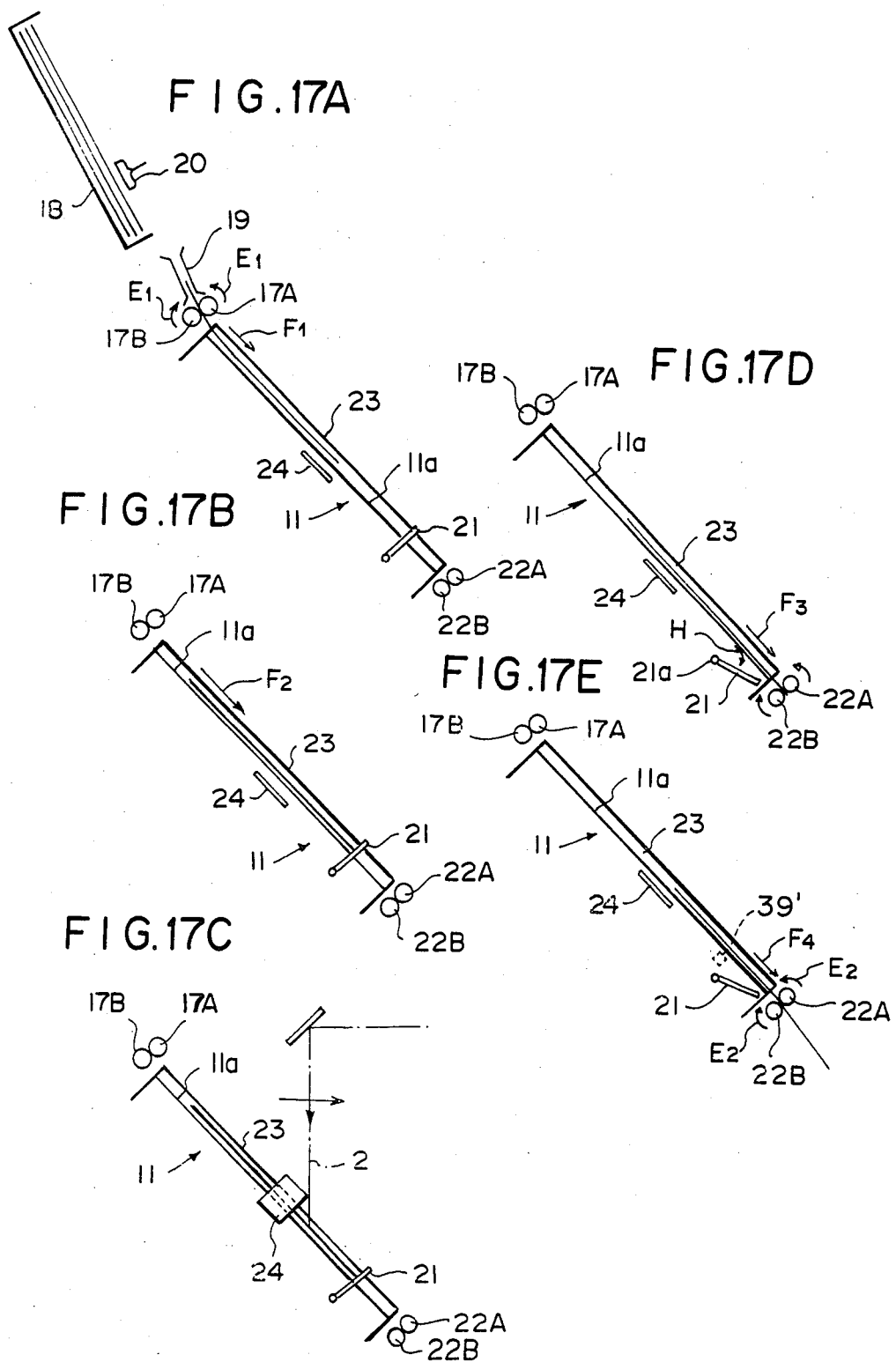

F I G. 20
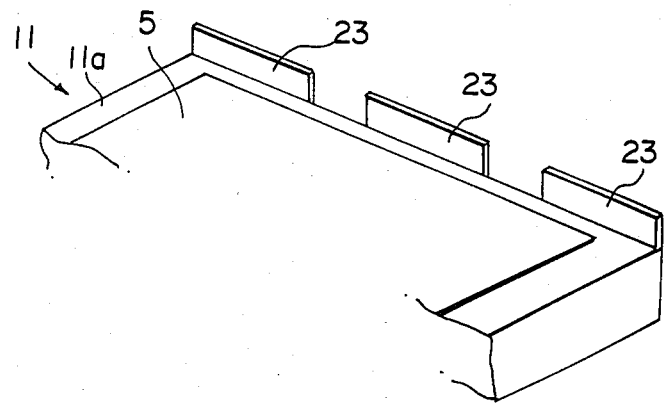
F I G. 21
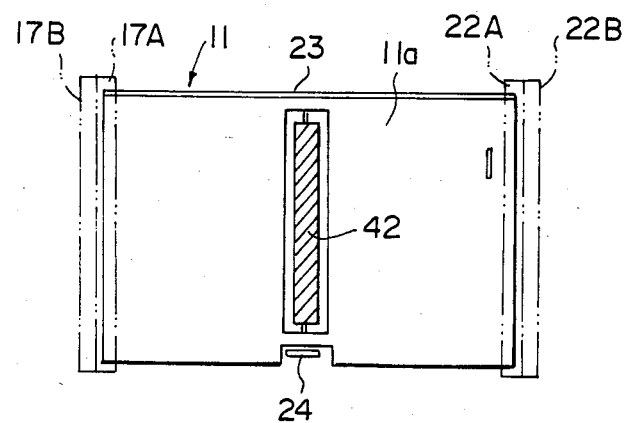

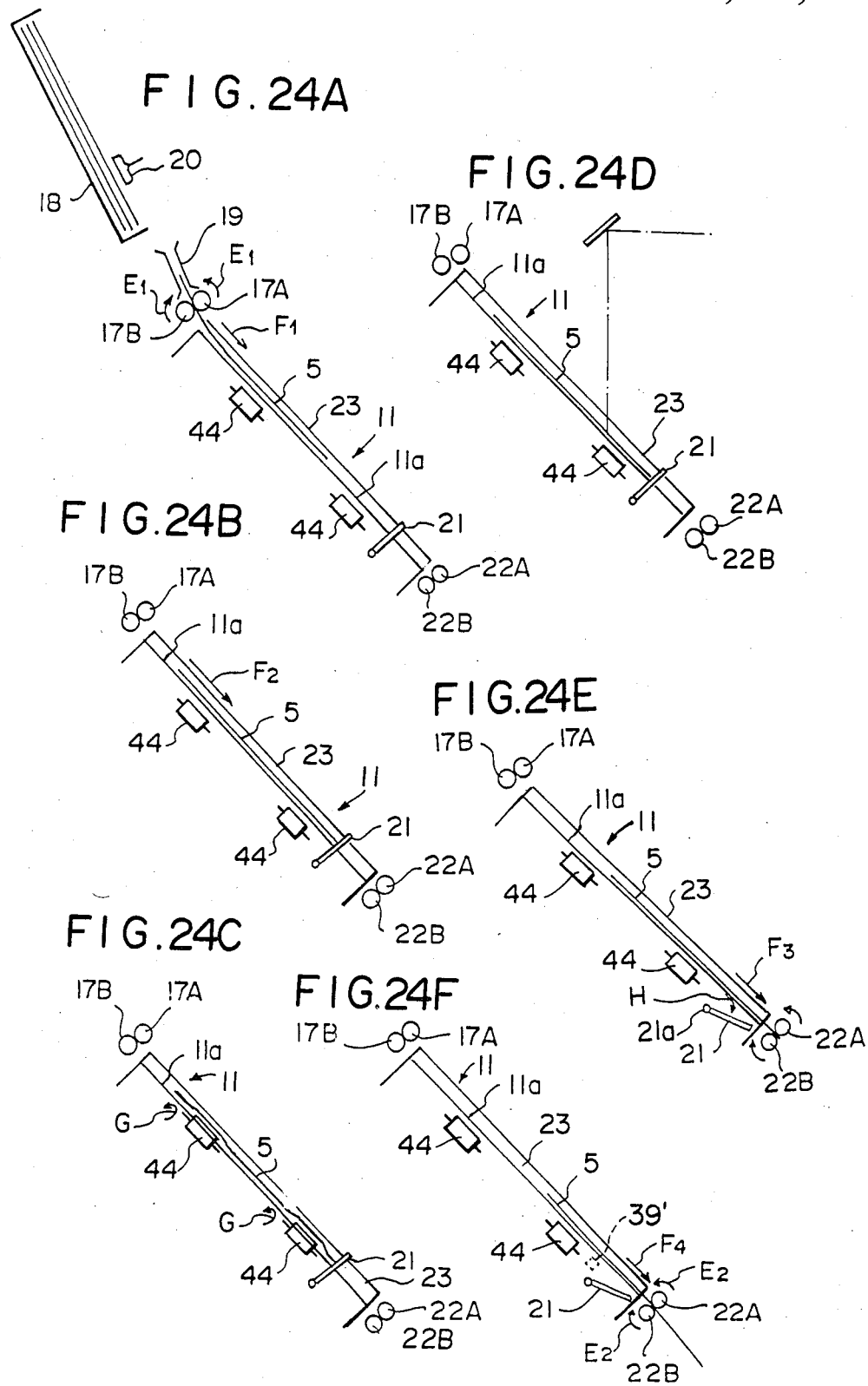

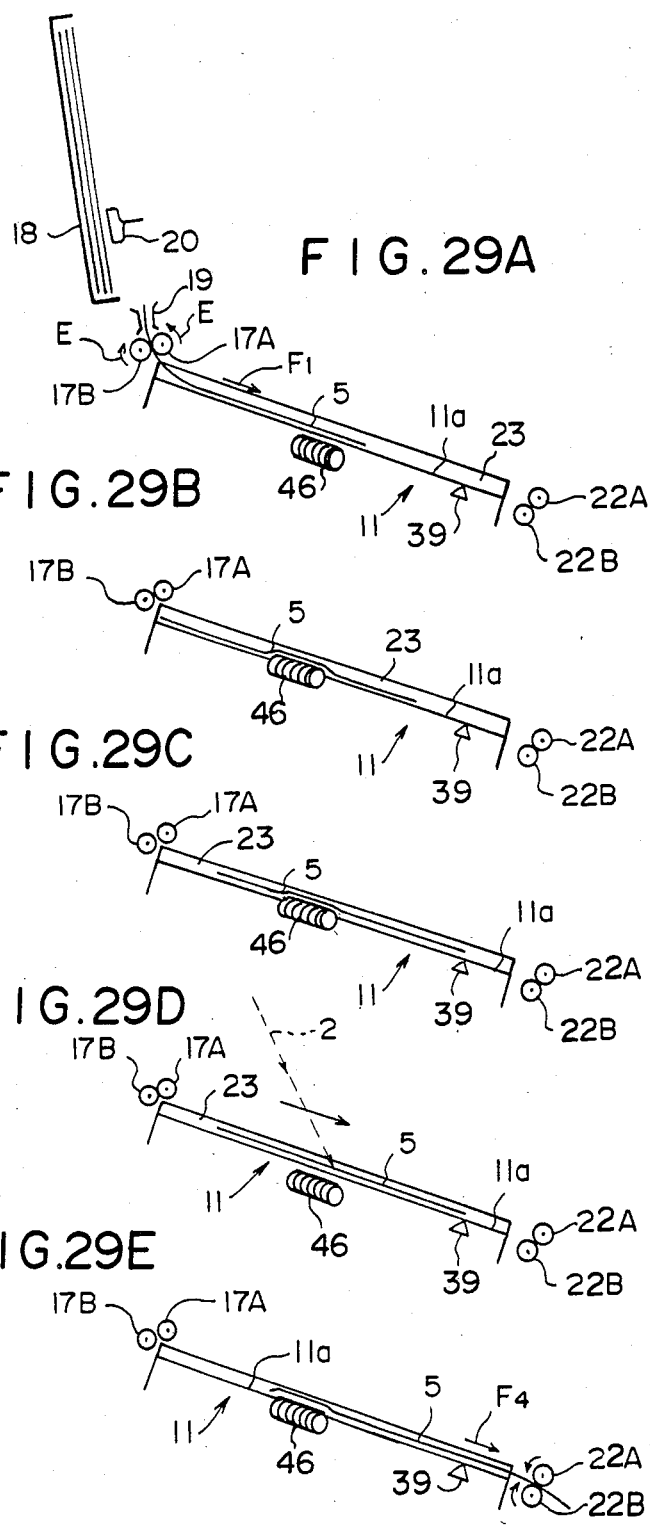

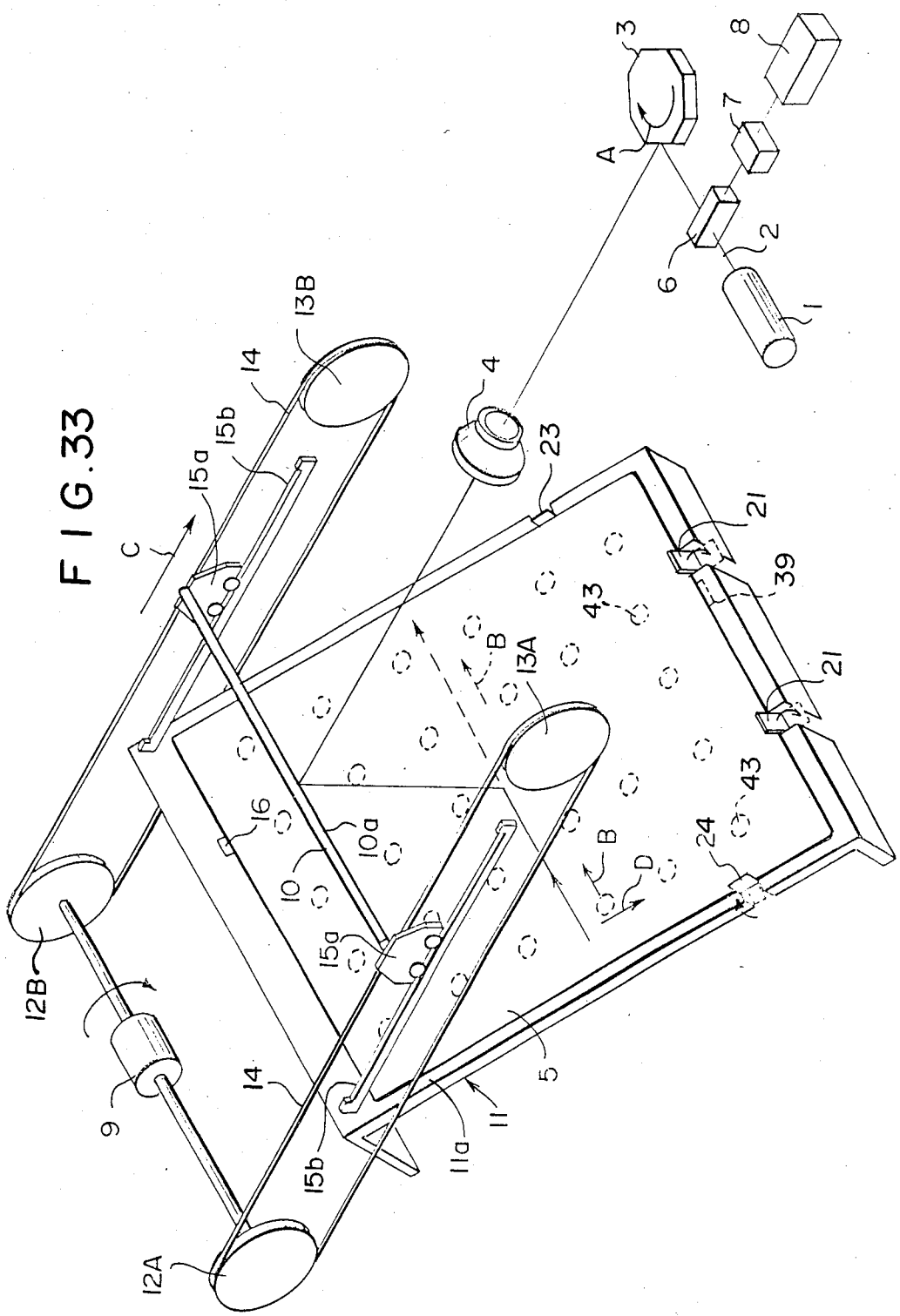

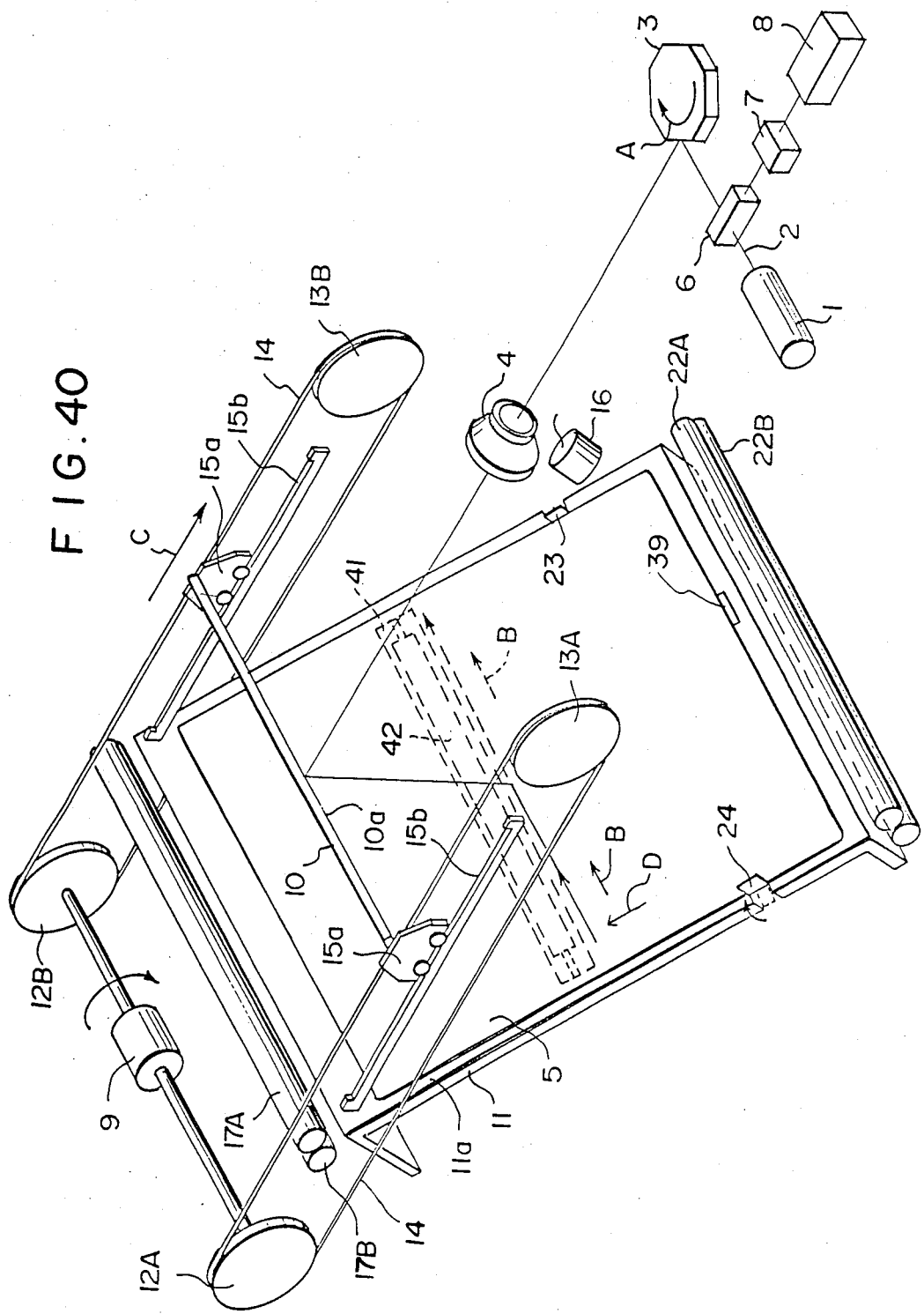

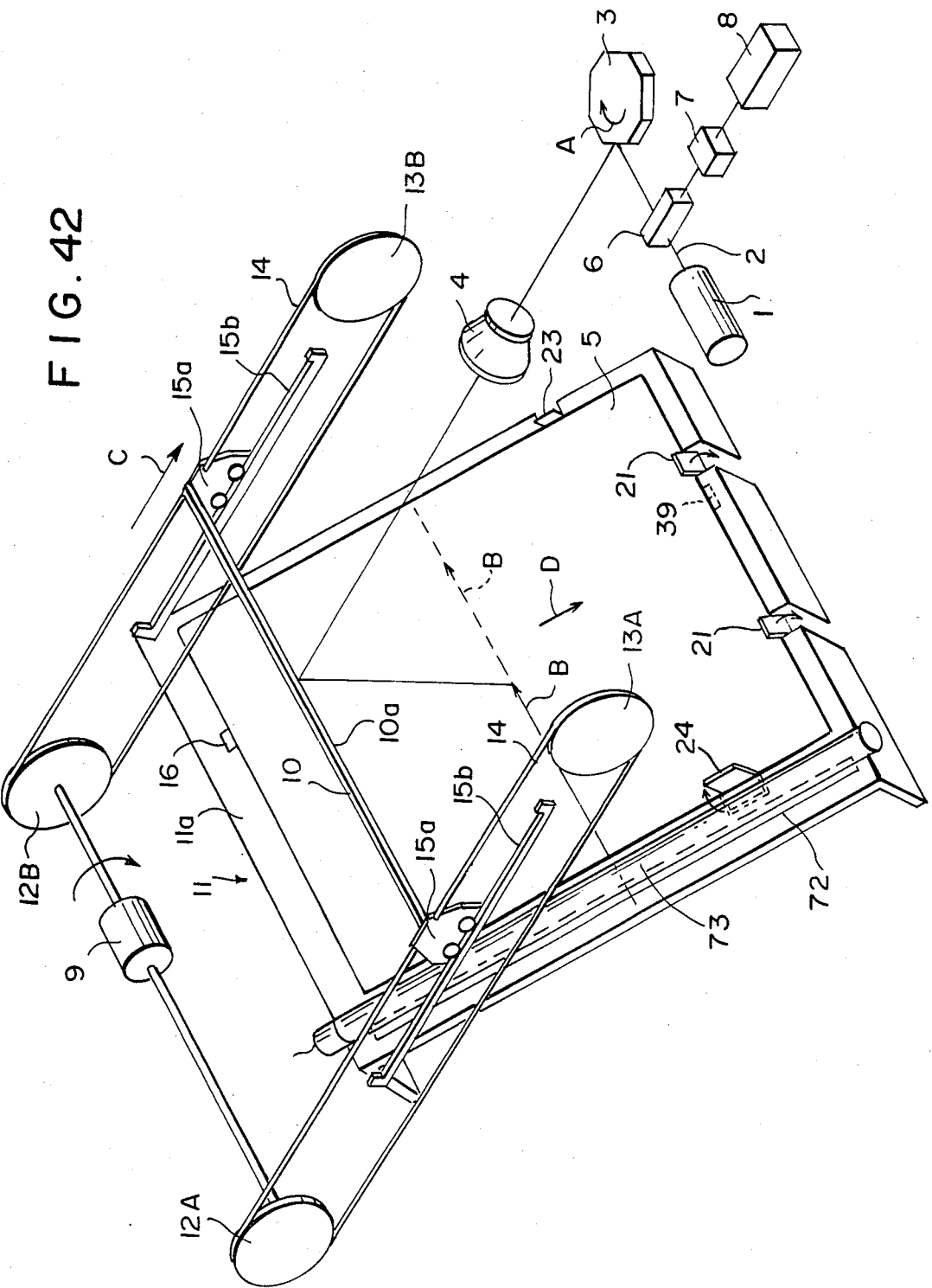

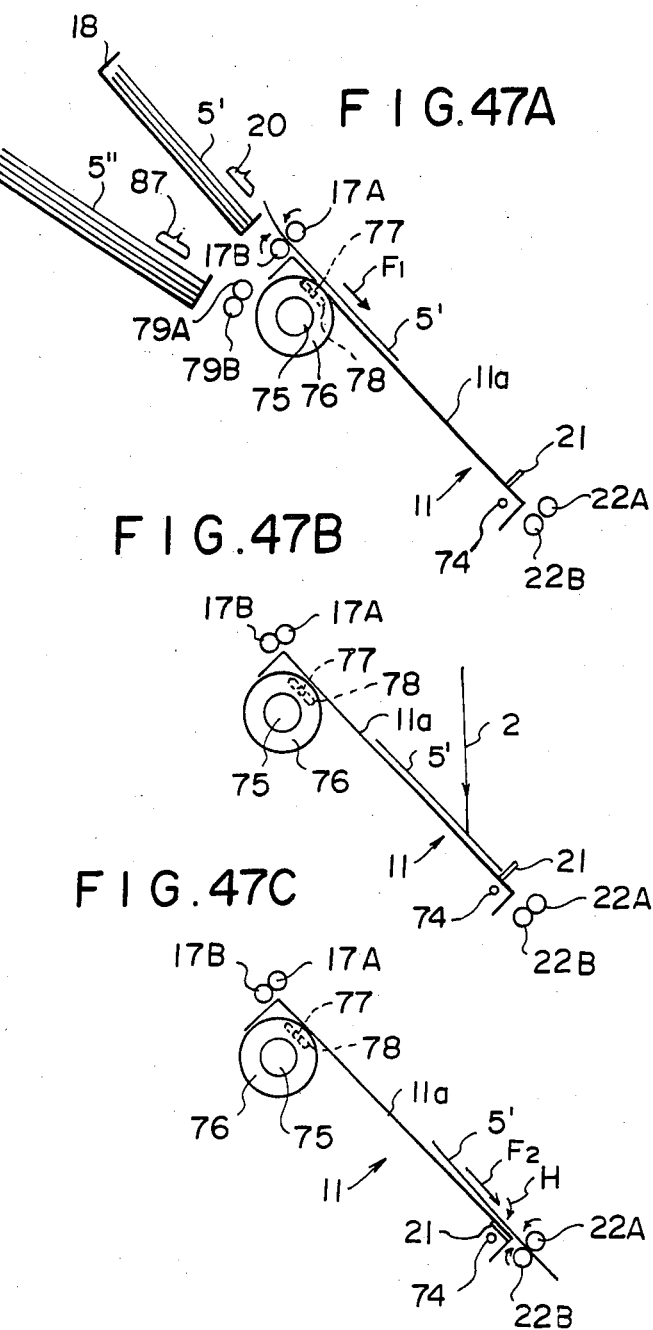

LIGHT BEAM RECORDING APPARATUS, LIGHT BEAM READ-OUT APPARATUS AND LIGHT BEAM SCANNING APPARATUS

BACKGROUND OF THE INVENTION

1. Field of the Invention

This invention relates to a light beam recording apparatus for recording an image by deflecting a light beam modulated on the basis of image information and scanning the light on a recording surface, a light beam read-out apparatus for reading out an image such as a radiation image, and a light beam scanning apparatus for scanning a light beam with a light deflector. This invention particularly relates to a light beam recording apparatus, a light beam read-out apparatus, and a light beam scanning apparatus which have a small size and may be manufactured with a low cost.

2. Description of the Prior Art

Various light beam recording apparatuses have heretofore been proposed for modulating a light beam emitted by a light beam source on the basis of image information, and two-dimensionally scanning the modulated light beam on a recording material by use of a light beam scanning apparatus, thereby recording an image on the recording material. The light beam recording apparatus of this type is connected, for example, to a radiation image read-out apparatus as proposed by the applicant for scanning a stimulable phosphor sheet carrying a radiation image stored thereon with stimulating rays and photoelectrically detecting the image to generate an image signal, and is used for obtaining a hard copy having an improved image quality, particularly a high diagnostic efficiency and accuracy, based on the image signal.

In the aforesaid light beam recording apparatus, two-dimensional light beam scanning by the light beam scanning apparatus is conducted by deflecting the light beam with a light deflector so that the light beam scans the recording material in a main scanning direction, and at the same time moving the recording material with respect to the light beam in a sub-scanning direction approximately normal to the main scanning direction. However, the conventional apparatus has the drawbacks that the apparatus becomes large and expensive because of the means for conducting the scanning in the sub-scanning direction. FIG. 50 is a schematic perspective view showing the conventional light beam recording apparatus. Drawbacks of the conventional light beam recording apparatus will hereinbelow be described with reference to FIG. 50.

In FIG. 50, a light beam 102 emitted by a light beam source 101 is made to impinge upon a modulator 103 operated by a modulator drive circuit 104, and is modulated with a signal generated by an image signal output device 105. Then, the light beam 102 is made to impinge upon a multi-face rotating mirror 106 acting as a light deflector, and is reflected and deflected thereby as the multi-face rotating mirror 106 rotates in the direction as indicated by the arrow A. The light beam 102 reflected by the multi-face rotating mirror 106 passes through an fθ lens 107 provided in the optical path as an image forming lens, and scans a recording sheet 108 in the main scanning direction as indicated by the arrow B. The recording sheet 108 is held between a rotatable drum 109 for rotation in the direction as indicated by the arrow C and a pair of rollers 110A and 110B provided on the rotatable drum 109. As the rotatable drum 109 rotates, the recording sheet 108 is conveyed in the sub-scanning direction as indicated by the arrow D approximately normal to the main scanning direction. Thus the recording sheet 108 conveyed in the sub-scanning direction as indicated by the arrow D is repeatedly scanned by the light beam 102 in the main scanning direction as indicated by the arrow B. Therefore, the recording sheet 108 is scanned two-dimensionally, and an image is recorded approximately over the whole surface of the recording sheet 108.

In the aforesaid light beam recording apparatus, scanning in the sub-scanning direction is conducted by moving the recording sheet 108. However, in order to prevent sub-scanning nonuniformity by minimizing fluctuations in load to a motor 113 during the sub-scanning, it is necessary to provide a space for accommodating one recording sheet 108 at the front and rear of the scanning position of the light beam 102, for example, by providing supporting bases 111 and 112 for supporting the recording sheet 108. Therefore, in the aforesaid light beam recording apparatus, it is necessary to provide a space having a length equal to the sum of the lengths of two recording sheets 108 or more in the sub-scanning direction, and the apparatus becomes large. Also, in order to convey the recording sheet 108 consistently, the rotatable drum 109 for conveying the recording sheet 108 should have a width larger than the width of the recording sheet 108. Further, since the motor 113 for rotating the rotatable drum 109 is provided in the width direction of the rotatable drum 109, the aforesaid apparatus becomes large also in the main scanning direction.

Also, in order to record accurately on the recording sheet 108 which the recording sheet 108 is conveyed, it is necessary to control the motor 113 accurately so that the recording sheet 108 may be accurately conveyed at a predetermined speed in the correct direction. However, since the accurately controllable motor is expensive, the cost of the whole apparatus becomes markedly high. Further, the rollers 110A and 110B are essential to convey the recording sheet 108 consistently. However, when the rollers 110A and 110B are provided, recording cannot be achieved at two end portions of the recording sheet 108 in the sub-scanning direction, and a need for recording the two end portions as black edges or the like cannot be satisfied.

On the other hand, there have also been widely used image read-out apparatuses wherein an image recorded on a sheet is read out by two-dimensionally scanning the sheet with a light beam such as a laser beam, and detecting light carrying the image information obtained by exposure of the sheet to the light beam, such as light reflected by the sheet, light transmitting through the sheet, or light emitted by the sheet, by use of a light detection means provided with a photomultiplier or the like.

The image read-out apparatus of this type is used, for example, as a scanner for plate making, an input apparatus for a computer or a facsimile, and a radiation image read-out apparatus in a radiation image recording and reproducing system using a stimulable phosphor sheet as disclosed, for example, in U.S. Pat. Nos. 4,258,264 and 4,346,295, and Japanese Unexamined Patent Publication No. 56(1981)-11395.

Specifically, when certain kinds of phosphors are exposed to a radiation such as X-rays, α-rays, β-rays γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor. In the aforesaid radiation image read-out apparatus, a radiation image of an object such as the human body is stored on a sheet provided with the stimulable phosphor, the stimulable phosphor sheet carrying the radiation image stored thereon is then scanned with stimulating rays such as a laser beam which cause the sheet to emit light in proportion to the stored energy of the radiation, and the emitted light is photoelectrically detected to obtain an image signal.

In the light beam read-out apparatus as mentioned above, two-dimensional light beam scanning is conducted as described above. However, the apparatus has the drawbacks that the apparatus becomes large because of the sub-scanning means and the optical system is complicated and expensive. FIG. 51 is a perspective view showing an example of the conventional light beam read-out apparatus, and FIG. 52 is a side view showing another example thereof. Drawbacks of the conventional light beam read-out apparatus will hereinbelow be described with reference to FIGS. 51 and 52.

In FIG. 51, the light beam read-out apparatus is constituted as a radiation image read-out apparatus. Stimulating rays 122 of a predetermined intensity emitted by a stimulating ray source 121 are made to impinge upon a galvanometer mirror 123 acting as a light deflector, and are reflected and deflected thereby as the galvanometer mirror 123 rotates in the direction as indicated by the arrow A. The stimulating rays 122 deflected by the galavanometer mirror 123 pass through an fθ lens 124 provided in the optical path as an image forming lens, and then scan a stimulable phosphor sheet 105 both ways in the main scanning direction as indicated by the arrow B. While the stimulating rays 122 impinge upon the stimulable phosphor sheet 105, the sheet 105 is conveyed by an endless belt device 126 in the sub-scanning direction as indicated by the arrow D approximately normal to the main scanning direction. Therefore, the stimulable phosphor sheet 105 is two-dimensionally scanned over the whole surface by the stimulating rays 122 through the deflection of the stimulating rays 122 conducted by the galvanometer mirror 123 and the conveyance of the stimulable phosphor sheet 105 conducted by the endless belt device 126.

As the stimulable phosphor sheet 105 is scanned by the stimulating rays 122, the portion of the sheet 105 exposed to the stimulating rays 122 emits light in proportion to the stored radiation energy. The light emitted by the stimulable phosphor sheet 105 enters a transparent light guide member 127 from its light input face 127a positioned close to the sheet 105 in parallel to the main scanning line. The light guide member 127 has a flat-shaped front end portion 127b positioned close to the stimulable phosphor sheet 105 and is shaped gradually into a cylindrical shape towards the rear end side to form an approximately cylindrical rear end portion 127c which is closely contacted with a photomultiplier 128. The light emitted by the stimulable phosphor sheet 105 upon stimulation thereof and entering the light guide member 127 from its light input face 127a is guided inside of the light guide member 127 up to the rear end portion 127c, and received by the photomultiplier 128 via a filter (not shown) for selectively transmitting the light emitted by the stimulable phosphor sheet 105. Thus the light emitted by the stimulable phosphor sheet 105 in proportion to the stored radiation energy is detected and converted into an electric image signal by the photomultiplier 128. The electric image signal thus obtained is sent to an image processing circuit 129 and processed therein. The electric image signal thus processed is then reproduced into a visible image and displayed, for example, on a cathode ray tube (CRT) 130, or stored on a magnetic tape 131, or directly reproduced as a hard copy on a photographic film or the like.

However, in the aforesaid radiation image read-out apparatus, since the sub-scanning is conducted by moving the stimulable phosphor sheet 105, it is necessary for the endless belt device 126 to have such a size that one stimulable phosphor sheet 105 may be placed at the front and rear of the scanning position of the stimulating rays 122 as shown. Therefore, the endless belt device 126 should have a length at least equal to the sum of the lengths of two stimulable phosphor sheets in the sub-scanning direction, and the apparatus becomes large as a whole.

In the radiation image read-out conducted by use of the aforesaid radiation image read-out apparatus, preliminary read-out may be carried out for ascertaining the radiation image stored on the stimulable phosphor sheet 105 prior to final read-out for obtaining the image signal used for reproducing a visible image, and read-out conditions in the final read-out or the like may be adjusted based on the image information obtained by the preliminary read-out, and the final read-out may be carried out by use of the read-out conditions.

One method of conducting the aforesaid preliminary read-out is disclosed, for example, in Japanese Unexamined Patent Publication No. 58(1983)-67240. In the disclosed method, the stimulable phosphor sheet 105 is scanned with the stimulating rays of a level lower than the stimulating rays used in the final read-out, and light emitted by the stimulable phosphor sheet 105 during the scanning is detected by use of a photoelectric read-out means.

In order to conduct the preliminary read-out and the final read-out continuously, the preliminary read-out is first conducted by conveying the stimulable phosphor sheet 105 in the direction as indicated by the arrow D, and then the endless belt device 126 is rotated reversely to return the stimulable phosphor sheet 105 in the direction as indicated by the arrow D' to the read-out starting position. Thereafter, the final read-out is carried out by conveying the stimulable phosphor sheet 105 in the direction as indicated by the arrow D. Or, the preliminary read-out is conducted by conveying the stimulable phosphor sheet 105 in the direction as indicated by the arrow D, the final read-out is carried out by returning the sheet 105 in the direction as indicated by the arrow D', and then the sheet 105 is conveyed in the direction as indicated by the arrow D out of the read-out apparatus. However, in any case, since the time is required for conveying the stimulable phosphor sheet 105 and changing the position thereof, the time required for the preliminary read-out and the final read-out becomes long, and the read-out cannot be conducted efficiently. Further, in another example of the conventional radiation image read-out apparatus shown in FIG. 52, a stimulating ray source 121A for preliminary readout and a stimulating ray source 121B for final read-out are provided in the read-out apparatus, a stimulable phosphor sheet is conveyed in the direction as indicated by the arrow E by a conveyance means comprising endless belt devices 129A, 129B, 129C, 129D and 129E, and the preliminary read-out and the final read-out are conducted sequentially without conveying the stimulable phosphor sheet reversely. However, in this apparatus, the conveyance means having a length at least equal to the sum of the lengths of three stimulable phosphor sheets in the sub-scanning direction is necessary for conducting the preliminary read-out and the final read-out on the stimulable phosphor sheet. Further, two photoelectric read-out means are necessary for the preliminary read-out and the final read-out. Therefore, the apparatus becomes very large and expensive.

Also, with the conventional light beam read-out apparatuses shown in FIGS. 51 and 52, since read-out should be effected accurately while the stimulable phosphor sheet is conveyed, it is necessary to convey the stimulable phosphor sheet accurately at a predetermined speed in the correct direction by the conveyance means such as the endless belt device. Therefore, a motor or the like for operating the conveyance means must be controlled accurately so that the conveyance means operates consistently even though load fluctuations arise during movement of the stimulable phosphor sheet. However, since the accurately controllable motor is expensive, the cost of the apparatus as a whole becomes markedly high.

SUMMARY OF THE INVENTION

The primary object of the present invention is to provide a compact and inexpensive light beam recording apparatus which eliminates drawbacks of the conventional apparatus concerning the size and cost caused by sub-scanning conducted by moving a recording material.

Another object of the present invention is to provide a compact and inexpensive light beam read-out apparatus which eliminates drawbacks of the conventional apparatus concerning the size and cost caused by sub-scanning conducted by moving a sheet.

The specific object of the present invention is to provide a compact and inexpensive light beam scanning apparatus which eliminates drawbacks of the conventional apparatus concerning the size and cost caused by sub-scanning conducted by moving a scanning sheet.

The present invention provides a light beam recording apparatus in which a light beam emitted by a light beam source and modulated on the basis of image information is scanned in a main scanning direction on a recording material, and moved with respect to the recording material in a subscanning direction approximately normal to the main scanning direction, whereby the light beam is two-dimensionally scanned on the recording material and an image represented by said image information is recorded, the light beam recording apparatus comprising:

(i) a main scanning light deflector positioned in an optical path of said light beam, which is emitted by said light beam source, for deflecting said light beam, (ii) an image forming lens positioned in an optical path of said light beam, which has been deflected by said main scanning light deflector, for forming an image of said light beam on a predetermined straight line, (iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens, and (iv) a recording material holding means for holding said recording material on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror.

The present invention also provides a light beam read-out apparatus in which a light beam emitted by a light beam source is scanned in a main scanning direction on a sheet carrying an image recorded thereon, and is moved with respect to the sheet in a sub-scanning direction approximately normal to the main scanning direction, whereby the light beam is two-dimensionally scanned on the sheet, light representing the image is generated, and the image is read out by detecting the light, the light beam read-out apparatus comprising:

(i) a main scanning light deflector positioned in an optical path of said light beam, which is emitted by said light beam source, for deflecting said light beam, (ii) an image forming lens positioned in an optical path of said light beam, which has been deflected by said main scanning light deflector, for forming an image of said light beam on a predetermined straight line, (iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens, (iv) a sheet holding means for holding said sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror, and (v) a light detection means provided with a light receiving face extending along a main scanning line on said sheet, and positioned close to said sheet for movement in said sub-scanning direction as said main scanning line is moved accompanying the movement of said sub-scanning mirror.

The present invention further provides a light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:

(i) a main scanning light deflector positioned in an optical path of said light beam, which is emitted by said light beam source, for deflecting said light beam, (ii) an image forming lens positioned in an optical path of said light beam, which has been deflected by said main scanning light deflector, for forming an image of said light beam on a predetermined straight line, (iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens, and (iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror.

With the light beam recording apparatus, the light beam read-out apparatus, and the light beam scanning apparatus in accordance with the present invention, the light beam deflected in the main scanning direction is reflected by the sub-scanning mirror and made to impinge upon the recording material, the sheet for read-out, or the scanning sheet, and the sub-scanning is carried out by moving the sub-scanning mirror. The recording material, the read-out sheet, or the scanning sheet is held by the holding means. Therefore, the apparatus need not be made large in the sub-scanning direction as in the case where the sub-scanning is conducted by conveying the recording material, the read-out sheet, or the scanning sheet, and it becomes possible to make the whole apparatus compact. Also, since such load fluctuations as arise when the recording material, the read-out sheet, or the scanning sheet is conveyed do not arise with a motor for moving the sub-scanning mirror for the sub-scanning, it is easy to control the motor. Therefore, it is possible to use a relatively inexpensive motor, and to decrease the manufacturing cost of the apparatus.

The light beam recording apparatus in accordance with the present invention is also advantageous in that recording may be achieved over the whole surface of the recording material.

Also, with the light beam read-out apparatus in accordance with the present invention, in the case where the apparatus is constituted for reading out a radiation image and the preliminary read-out and the final read-out are conducted on the stimulable phosphor sheet, it becomes possible to conduct the preliminary read-out and the final read-out efficiently by reciprocally moving the sub-scanning mirror.

In the light beam scanning apparatus of the present invention, since the scanning sheet is held on the specific plane mentioned above by the scanning sheet holding means, it is necessary to convey the scanning sheet reliably onto the holding plane, to position the scanning sheet accurately thereon, and to convey the scanning sheet reliably out of the holding position.

Accordingly, an embodiment of the aforesaid light beam scanning apparatus in accordance with the present invention is further characterized by constituting said scanning sheet holding means so that the scanning sheet holding surface thereof allows said scanning sheet to fall by its weight, and said scanning sheet holding means is provided, in the vicinity of a lower end portion thereof, with a sheet stop plate moveable between a first position at which one end portion of said sheet stop plate projects out of said scanning sheet holding surface and contacts said scanning sheet, thereby to stop said scanning sheet at a predetermined position on said scanning sheet holding surface, and a second position at which said one end portion of said sheet stop plate is retracted from said scanning sheet holding surface. The light beam scanning apparatus further comprises:

(v) a feed means positioned in the vicinity of an upper end of said scanning sheet holding means for conveying said scanning sheet onto said scanning sheet holding surface, and (vi) an unloading means positioned in the vicinity of a lower end of said scanning sheet holding means for grasping said scanning sheet, which falls by its weight from said predetermined position, and conveying said scanning sheet out of said scanning sheet holding means.

With this embodiment of the light beam scanning apparatus, feeding and unloading of the scanning sheet are conducted by use of the feed means and the unloading means, the holding surface of the scanning sheet holding means allows the scanning sheet to fall by its weight, and the sheet stop plate projectable out of the holding surface is provided. Therefore, it is possible to reliably conduct feeding, unloading and positioning of the scanning sheet on the holding surface.

Another embodiment of the light beam scanning apparatus in accordance with the present invention comprises the main scanning light deflector, the image forming lens, the long sub-scanning mirror and the scanning sheet holding means as defined above, and further comprises:

(v) a feed means positioned in the vicinity of an upper end of said scanning sheet holding means for feeding said scanning sheet up to a position prior to a predetermined position on said scanning sheet holding means, and (vi) a scanning sheet conveying roller extending in said main scanning direction under a scanning sheet holding surface of said scanning sheet holding means for movement between a first position at which an upper end of said scanning sheet conveying roller appears on said scanning sheet holding surface and a second position at which said upper end of said scanning sheet conveying roller is retracted from said scanning sheet holding surface so that, when said scanning sheet conveying roller is at said first position, it conveys the fed scanning sheet towards said predetermined position.

With this embodiment of the light beam scanning apparatus, since feeding of the scanning sheet is conducted with the feed means such as feed rollers and positioning of the scanning sheet is carried out by the scanning sheet conveying roller provided at the scanning sheet holding means, it is possible to reliably conduct feeding of the scanning sheet onto the scanning sheet holding surface and positioning of the scanning sheet thereon.

A further embodiment of the light beam scanning apparatus in accordance with the present invention comprises the main scanning light deflector, the image forming lens, the long sub-scanning mirror and the scanning sheet holding means as defined above, and further comprises:

(v) a guide plate projecting upwardly at one side end of said scanning sheet holding means, and (vi) a shifting plate positioned in the vicinity of the other side end of said scanning sheet holding means for movement between a first position at which said shifting plate pushes a side edge of said scanning sheet on said scanning sheet holding means and makes said scanning sheet contact said guide plate and a second position at which said shifting plate is retracted from the side edge of said scanning sheet.

A still further embodiment of the light beam scanning apparatus in accordance with the present invention comprises the main scanning light deflector, the image forming lens, the long sub-scanning mirror and the scanning sheet holding means as defined above, and further comprises:

(v) a guide plate projecting upwardly at one side end of said scanning sheet holding means, and (vi) a shifting roller positioned under a scanning sheet holding surface of said scanning sheet holding means for movement between a first position at which an upper end of said shifting roller appears on said scanning sheet holding surface and a second position at which said upper end of said shifting roller is retracted from said scanning sheet holding surface so that, when said shifting roller is at said first position, it shifts said scanning sheet on said scanning sheet holding surface towards said one side end of said scanning sheet holding means and makes said scanning sheet contact said guide plate.

With the two embodiments of the light beam scanning apparatus just mentioned above, since the positioning means comprising the guide plate and the shifting plate or the shifting roller is provided, it becomes possible to adjust the position of the scanning sheet in the main scanning direction on the scanning sheet holding surface, and to reliably adjust the scanning sheet at the predetermined position on the scanning sheet holding surface.

Another embodiment of the light beam scanning apparatus in accordance with the present invention comprises the main scanning light deflector, the image forming lens, the long sub-scanning mirror and the scanning sheet holding means as defined above, and further comprises:

(v) a scanning sheet stop means for said main scanning direction positioned in the vicinity of one side edge of a scanning sheet holding surface of said scanning sheet holding means, (vi) a scanning sheet stop means for said sub-scanning direction positioned in the vicinity of a different edge of said scanning sheet holding surface in a direction normal to said one side edge of said scanning sheet holding surface, (vii) a feed means for feeding said scanning sheet onto said scanning sheet holding surface inwardly of said scanning sheet stop means for said main scanning direction and said scanning sheet stop means for said sub-scanning direction, and (viii) an oblique conveying roller positioned under said scanning sheet holding surface for movement between a first position at which an upper end of said oblique conveying roller appears on said scanning sheet holding surface and a second position at which said upper end of said oblique conveying roller is retracted from said scanning sheet holding surface so that, when said oblique conveying roller is at said first position, it conveys said scanning sheet in a resultant oblique direction obtained by combining the direction of said one side edge of said scanning sheet holding surface with the direction of said different edge thereof.

With this embodiment of the light beam scanning apparatus, since the oblique conveying roller, the scanning sheet stop means for the main scanning direction and the scanning sheet stop means for the sub-scanning direction are provided and positioning of the scanning sheet on the scanning sheet holding surface of the scanning sheet holding means is effected by these members, it is possible to adjust without fail the position of the scanning sheet on the scanning sheet holding surface in the main scanning direction and in the sub-scanning direction.

A further embodiment of the light beam scanning apparatus in accordance with the present invention comprises the main scanning light deflector, the image forming lens, the long sub-scanning mirror and the scanning sheet holding means as defined above, wherein said scanning sheet holding means is provided with an adhesion means for adhering said scanning sheet to a scanning sheet holding surface of said scanning sheet holding means.

With the just mentioned embodiment of the light beam scanning apparatus, since the scanning sheet holding means is provided with the adhesion means, it is possible to hold the scanning sheet in the flat form along the scanning sheet holding surface, and to secure the scanning sheet at a predetermined position.

A still further embodiment of the light beam scanning apparatus in accordance with the present invention comprises the main scanning light deflector, the image forming lens, the long sub-scanning mirror and the scanning sheet holding means as defined above, and further comprises:

(v) a scanning sheet positioning means for feeding said scanning sheet onto a scanning sheet holding surface of said scanning sheet holding means and stopping said scanning sheet at a predetermined position on said scanning sheet holding surface, and (vi) a photodetector positioned in the vicinity of an edge, as viewed in said sub-scanning direction, of said scanning sheet stopped at said predetermined position on said scanning sheet holding surface for detecting said light beam prior to said scanning sheet, as viewed in said sub-scanning direction, and generating a read-out or recording start signal.

With this embodiment of the light beam scanning apparatus, since the scanning sheet positioning means and the photodetector for detecting the light beam and generating the read-out or recording start signal are provided, it is possible to accurately control the read-out or recording start position of the light beam on the scanning sheet, and to start the substantial scanning at the edge of the scanning sheet. Thus it becomes possible to improve the scanning position accuracy on the scanning sheet.

Another embodiment of the light beam scanning apparatus in accordance with the present invention comprises the main scanning light deflector, the image forming lens, the long sub-scanning mirror and the scanning sheet holding means as defined above, wherein a scanning sheet holding surface of said scanning sheet holding means is formed of a material exhibiting a reflectivity with respect to said light beam different from the reflectivity of the surface of said scanning sheet, and a photodetector is positioned above an edge, as viewed in said sub-scanning direction, of said scanning sheet held on said scanning sheet holding surface for detecting light reflected by said scanning sheet holding surface.

With this embodiment of the light beam scanning apparatus, since the scanning sheet and the scanning sheet holding surface are formed of materials different in reflectivity to the light beam and a read-out or recording start signal may be generated by detecting changes in reflected light by use of the photodetector, it is possible to accurately control the read-out or recording start position of the light beam on the scanning sheet, and to start the substantial scanning at the edge of the scanning sheet. Thus it becomes possible to improve the scanning position accuracy on the scanning sheet.

A further embodiment of the light beam scanning apparatus in accordance with the present invention comprises the main scanning light deflector, the image forming lens, the long sub-scanning mirror and the scanning sheet holding means as defined above, and further comprises:

(v) a reflection band for reflecting said light beam, said reflection band extending in parallel with a side edge of said scanning sheet, which is held by said scanning sheet holding means, outside of said side edge and within a scanning region of said light beam on said scanning sheet holding means, and (vi) a photodetector positioned above said reflection band for detecting light reflected by said reflection band and generating a signal for main scanning synchronization.

With the just mentioned embodiment of the light beam scanning apparatus, since the reflection band is provided on the holding surface of the scanning sheet holding means for periodically generating reflected light for each scanning of the light beam in the main scanning direction, and the reflected light is detected by the photodetector for generating the main scanning synchronizing signal, it is possible to accurately control the start point of substantial scanning of the light beam in the main scanning direction by use of a very compact and inexpensive means.

An even further embodiment of the light beam scanning apparatus in accordance with the present invention comprises the main scanning light deflector, the image forming lens, the long sub-scanning mirror and the scanning sheet holding means as defined above, and further comprises:

(v) a rotation means for rotating said scanning sheet holding means around a straight line approximately parallel with a main scanning line in the vicinity of a scanning sheet holding surface of said scanning sheet holding means.

With the embodiment of the light beam scanning apparatus mentioned last, since the scanning sheet holding means is rotatable, it is possible to conduct feeding of the scanning sheet to the scanning sheet holding means and/or conveyance thereof out of the scanning sheet holding means by changing the position of the scanning sheet holding means in accordance with the type of the scanning sheet, and to efficiently carry out the sheet feeding and/or conveyance out of the scanning sheet holding means.

BRIEF DESCRIPTION OF THE DRAWINGS

FIG. 5A is a perspective view showing the long box type photomultiplier used in the embodiment of FIG. 3, FIG. 5B is a sectional view taken along line I—I of FIG. 5A, FIG. 7A is a perspective view showing the long venetian blind type photomultiplier used in the embodiment of FIG. 3, FIG. 7B is a sectional view taken along line II—II of FIG. 7A, FIGS. 8A to 8F and 9 are schematic views showing the photomultipliers provided with a filter and a thin light guide member on the light receiving face, FIG. 10 is a perspective view showing the photomultiplier housed in a light shielding case, FIG. 11 is a schematic perspective view showing an embodiment of the light beam scanning apparatus in accordance with the present invention, FIGS. 12A to 12E are explanatory views showing the feeding, unloading and positioning of the scanning sheet in the embodiment of FIG. 11, FIG. 13 is a schematic perspective view showing another embodiment of the light beam scanning apparatus in accordance with the present invention, FIG. 16 is a schematic perspective view showing a further embodiment of the light beam scanning apparatus in accordance with the present invention, FIGS. 17A to 17E are explanatory side views showing the feeding, unloading and positioning of the scanning sheet in the embodiment of FIG. 16, FIGS. 18A and 18B are explanatory plan views showing the positioning of the scanning sheet in the main scanning direction in the embodiment of FIG. 16, FIG. 20 is a perspective view showing an example of the guide plate used in the embodiment of FIG. 16, FIG. 21 is a plan view showing the scanning sheet holding means provided with a scanning sheet conveying roller in the embodiment of FIG. 16, FIGS. 22A to 22E are explanatory views showing the positioning of the scanning sheet by the scanning sheet conveying roller in the embodiment of FIG. 16, FIGS. 24A to 24F are explanatory side views showing the feeding, unloading and positioning of the scanning sheet in the embodiment of FIG. 23, FIGS. 25A and 25B are explanatory plan views showing the positioning of the scanning sheet in the main scanning direction in the embodiment of FIG. 23, FIGS. 29A to 29E are explanatory side views showing the feeding and unloading of the scanning sheet and the vertical movement of the oblique conveying roller in the embodiment of FIG. 28, FIGS. 30A to 30D are explanatory plan views showing the positioning of the scanning sheet by the oblique conveying roller in the embodiment of FIG. 28, FIG. 33 is a schematic perspective view showing a further embodiment of the light beam scanning apparatus in accordance with the present invention, FIG. 40 is a schematic perspective view showing another embodiment of the light beam scanning apparatus in accordance with the present invention, FIG. 42 is a schematic perspective view showing a further embodiment of the light beam scanning apparatus in accordance with the present invention, FIGS. 47A to 47G are explanatory views showing the feeding and unloading of the scanning sheet in the embodiment of FIG. 46, FIGS. 48 and 49 are explanatory views showing the rotation of the scanning sheet holding means in a modified form of the embodiment of FIG. 46.

DESCRIPTION OF THE PREFERRED EMBODIMENTS

The present invention will hereinbelow be described in further detail with reference to the accompanying drawings.

Figure 1:
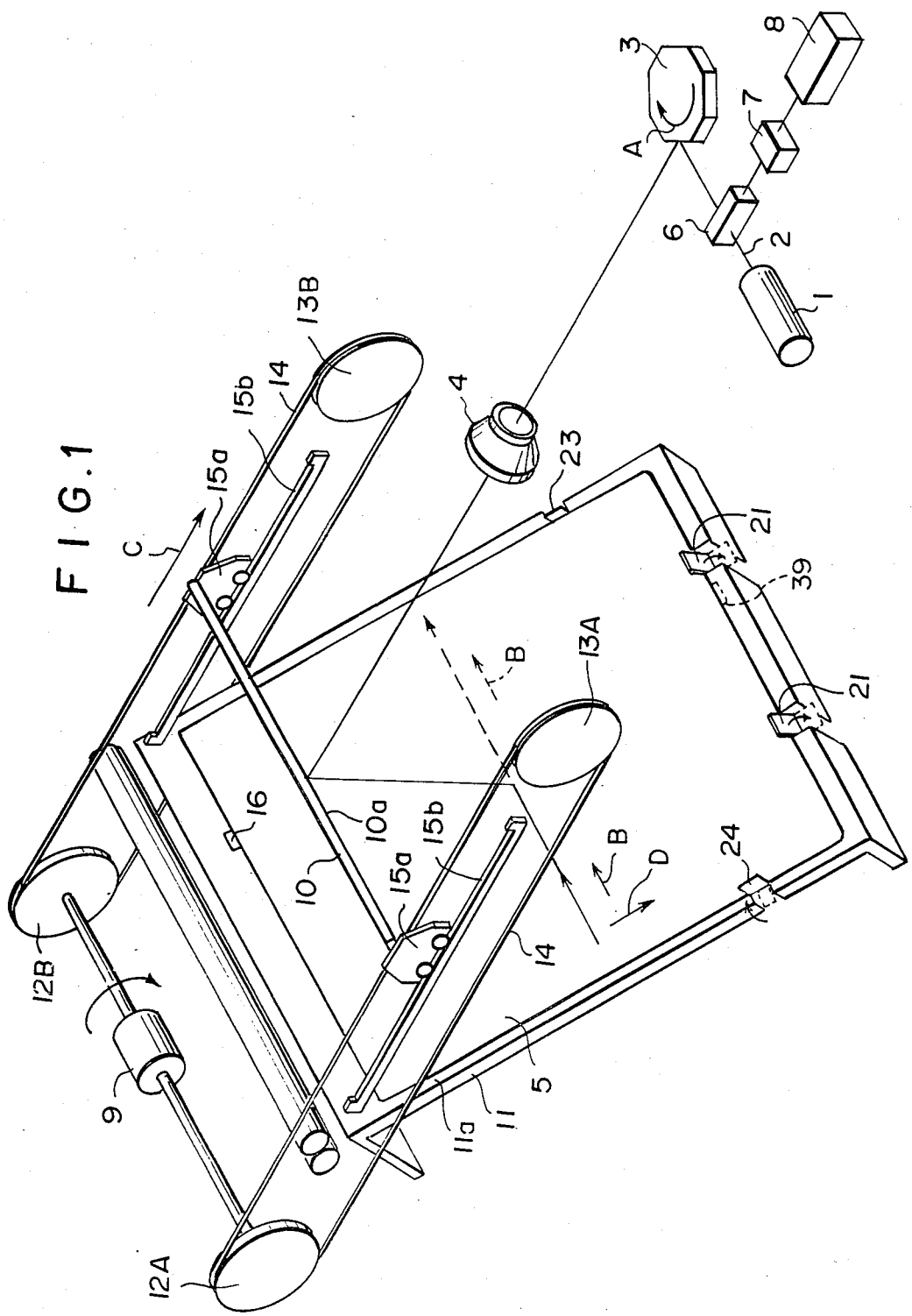
FIG. 1 is a schematic perspective view showing an embodiment of the light beam recording apparatus in accordance with the present invention.

Referring to FIG. 1 showing an embodiment of the light beam recording apparatus in accordance with the present invention, a laser beam 2 emitted by a laser beam source 1 impinges upon a modulator 6 operated by a modulator drive circuit 7 based on an image signal sent by an image signal output circuit 8. The laser beam 2 is modulated by the modulator 6, and then deflected by a multi-face rotating mirror 3 which acts as a main scanning deflector and rotates radiation image read-out apparatus A. The laser beam source 1 may be a He-Ne laser, an Ar laser, a combination of a semiconductor laser with a beam shaping optical system, or the like. In the case where the laser beam source 1 is of the type capable of directly effecting the modulation like a semiconductor laser, modulation of the laser beam 2 may be conducted by directly controlling the laser beam source 1 without providing the modulator 6 in the optical path of the laser beam 2. As the main scanning light deflector, instead of the multi-face rotating mirror 3, it is also possible to use a different type light deflector, such as a galvanometer mirror, or an acousto-optic deflector (AOD).

The laser beam 2 deflected by the multi-face rotating mirror 3 passes through an image forming lens 4 for main scanning such as an f0 lens positioned in the optical path, and is then reflected by a reflection surface 10a of a long sub-scanning mirror 10 extending in the main scanning direction and linearly moving at a low speed in the optical axis direction of the image forming lens 4, i.e. in the direction as indicated by the arrow C, by being operated by a motor 9. A sheet-shaped recording material 5 such as a light-sensitive film or photographic paper is positioned below the sub-scanning mirror 10 in the optical path of the laser beam 2 reflected by the sub-scanning mirror 10. The recording material 5 is supported by a recording material holding means 11 provided with a holding surface 11a inclining at a predetermined angle with respect to the laser beam 2 impinging upon the holding surface 11a in specific relation to the sub-scanning mirror 10 as will be described later in detail. The recording material holding means 11 is fabricated, for example, by processing a plate-like material or integral molding of a synthetic resin.

When the recording material 5 is held on the recording material holding means 11, the laser beam 2 deflected by the multi-face rotating mirror 3 scans the recording material 5 in the main scanning direction as indicated by the arrow B. The image forming lens 4 converges the laser beam 2 onto the recording material 5 and scans the laser beam 2, which is deflected by the multi-face rotating mirror 3 at a uniform angular velocity, at a uniform speed on the flat recording material 5. In the embodiment shown, scanning in the sub-scanning direction is conducted by moving the sub-scanning mirror 10 with respect to the recording material 5. The sub-scanning and the relationship between the sub-scanning mirror 10 and the recording material 5 will now be described with reference to FIG. 2.

As described above, the laser beam 2 reflected and deflected by the multi face rotating mirror 3 passes through the image forming lens 4 positioned in the optical path. The image forming lens 4 forms an image of the incident laser beam 2 at a predetermined image forming position P1 on a straight line lying at an angle normal to the drawing sheet in FIG. 2. The long sub-scanning mirror 10 is positioned as mentioned above in the optical path of the laser beam 2 passing through the image forming lens 4. The sub-scanning mirror 10 is inclined with respect to the optical path of the laser beam 2 so that the laser beam 2 impinges upon the reflection surface 10a at an incidence angle α, and the laser beam 2 is reflected downwardly by the sub-scanning mirror 10. An image of the laser beam 2 reflected by the sub-scanning mirror 10 is formed at an image forming position P2 conjugate with the image forming position P1 with respect to the sub-scanning mirror 10. The image forming position P2 of the laser beam 2 reflected by the sub-scanning mirror 10 changes as the subscanning mirror 10 is moved in the direction as indicated by the arrow C. The recording material 5 is held on a plane formed by the locus of the image forming position P2 which is conjugate with the image forming position P1 with respect to the sub-scanning mirror 10 and which changes as the subscanning mirror 10 is moved. Thus the recording material 5 is held at a position allowing incidence of the laser beam 2, which is reflected by the sub-scanning mirror 10, on the plane including the convergence position P1 of the laser beam 2 and inclining at an angle α equal to the incidence angle α of the laser beam 2 impinging upon the sub-scanning mirror 10 with respect to the laser beam 2 incident upon the plane.

While image recording is conducted on a single recording material 5, the sub-scanning mirror 10 is linearly moved slowly in the direction as indicated by the arrow C over a range S sufficient for the laser beam 2 to scan the whole surface of the recording material 5. As the sub-scanning mirror 10 is thus moved, a main scanning line formed by the laser beam 2 on the recording material 5 gradually moves in the direction as indicated by the arrow D, and sub-scanning is thereby carried out. As a result, the laser beam 2 is two-dimensionally scanned over the whole surface of the recording material 5 by the multi-face rotating mirror 3 and the sub-scanning mirror 10.

Reverting to FIG. 1, movement of the sub-scanning mirror 10 is effected, for example, by the movement of mirror supporting members 15a, 15a along guide rails 15b, 15b. The mirror supporting members 15a, 15a are respectively secured to the ends of the sub-scanning mirror 10 and connected to wires 14, 14 respectively applied around a pulley 12A rotated by a motor 9 and a driven pulley 13A, and around a pulley 12B rotated by the motor 9 and a driven pulley 13B. Thus the mirror supporting members 15a, 15a are moved by the wires 14, 14 as the pulleys 12A and 12B are rotated. In order to move the sub-scanning mirror 10, instead of using the wires 14, 14, any other means such as a linear motor may be used.

After the sub-scanning mirror 10 is moved over the predetermined range at the predetermined speed and an image is recorded over the whole surface of the recording material 5, the sub-scanning mirror 10 is moved reversely to the aforesaid movement direction up to the initial position for image recording on the next recording material 5. In this embodiment, a photodetector 16 is mounted on the recording material holding means 11 as shown in FIG. 1, and the scanning start position for image recording is determined by detecting the laser beam 2 by use of the photodetector 16. Specifically, the sub-scanning mirror 10 is moved in the direction as indicated by the arrow C from the initial position, and arrival of the laser beam 2 at the end portion of the recording material 5 is detected by the photodetector 16. At this time, the modulator 6 is operated based on an image signal for modulating the laser beam 2, and image recording on the recording material 5 is started.

In the embodiment of FIG. 1, since the sub-scanning is conducted by maintaining the recording material 5 standing still and moving the sub-scanning mirror 10 to move the laser beam 2. Therefore, it is possible to decrease the size of the apparatus in the sub-scanning direction to a half or less of the size of an apparatus wherein the sub-scanning is conducted by moving the recording material 5. Also, the length of the sub-scanning mirror 10 in the main scanning direction may be of a value sufficient for allowing the laser beam 2 to impinge upon the recording material 5, and may be shorter than the length of the main scanning line on the recording material 5. Thus it is possible to make the total length of the sub-scanning mirror 10 and the mirror movement means shorter than the length of the recording material holding means 11 in the main scanning direction, and to make the apparatus compact also in the main scanning direction. Further, since the motor 9 for moving the sub-scanning mirror 10 is free from load fluctuations or the like, it is easy to control and a relatively cheap motor may be used as the motor 9. Also, since image recording may be conducted over the whole surface of the recording material 5 held by the recording material holding means 11 by making the laser beam 2 impinge upon the recording material 5 from the forward edge to the rear edge thereof in the sub-scanning direction, it is easy to record black edges at the forward and rear edges of the recording material 5. In the case where the recording material 5 is of the type which cannot snugly fit to the holding surface 11a of the recording material holding means 11 and cannot readily be maintained in the flat form thereon, an adhesion means may be provided in the recording material holding means 11 for adhering the recording material 5 onto the holding surface 11a.

Feeding of the recording material 5 to the recording material holding means 11 and unloading of the recording material 5 therefrom may be conducted, for example, as described below.

Since the holding surface 11a of the recording material holding means 11 is inclined, the recording material 5 is first allowed to fall by its weight along the holding surface 11a from thereabove. Thus the recording material 5 comes into contact with a pair of recording material stop plates 21, 21 provided at the lower end portion of the holding surface 11a, and is maintained at the predetermined position in the sub-scanning direction. Feeding of the recording material 5 may be conducted manually or by use of a recording material feed means. In the case where friction between the recording material 5 and the holding surface 11a is large and the recording material 5 does not readily fall by its weight, the recording material 5 may be fed to the predetermined position by use of a recording material feed means. In this case, a detector 39 such as a reflection type photo-interrupter or a limit switch may be provided on the recording material holding means 11 for adjusting the position of the forward edge of the recording material 5, and the forward edge of the recording material 5 may be detected by the detector 39. Thus it becomes possible to adjust the position of the recording material 5 accurately and easily.

After positioning of the recording material 5 in the sub-scanning direction is finished as described above, the recording material 5 is pushed by a shifting plate 24, which is provided at one side end portion of the recording material holding means 11 for rotation in the direction as indicated by the arrow, against a guide plate 23 provided at the other side end portion of the recording material holding means 11. Thus the position of the recording material 5 in the main scanning direction is adjusted.

After the recording material 5 is adjusted to the predetermined in the main scanning direction and in the sub-scanning direction and scanning with the laser beam 2 is finished at said predetermined position, the recording material stop plates 21, 21 are rotated in the directions as indicated by the arrows and retracted to planes approximately parallel with the holding surface 11a. As a result, the recording material 5 falls by its weight from the predetermined position and is unloaded from the recording material holding means 11. Of course, a recording material unloading means may be provided at the lower end of the recording material holding means 11 for grasping the lower edge portion of the recording material 5 and forcibly unloading the recording material 5.

Figure 2:
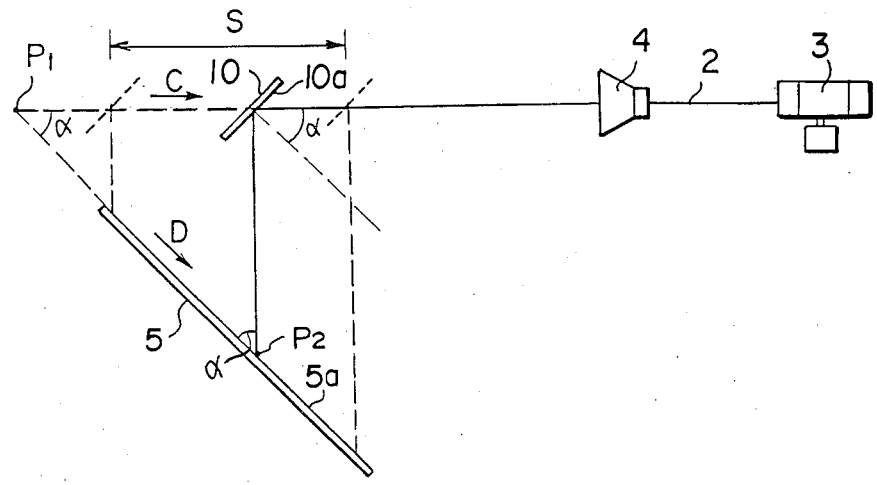
FIG. 2 is an explanatory side view showing the sub-scanning in the embodiment of FIG. 1.
Figure 4:
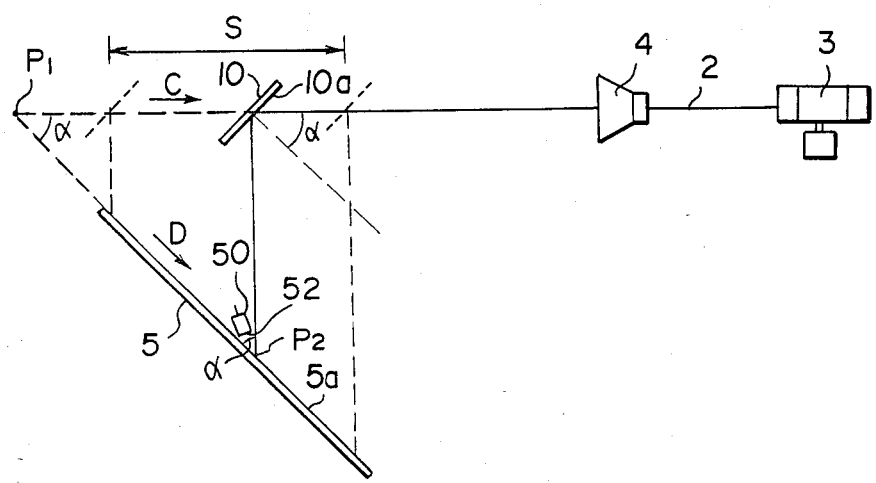
FIG. 4 is an explanatory side view showing the sub-scanning in the embodiment of FIG. 3.
Figure 3:
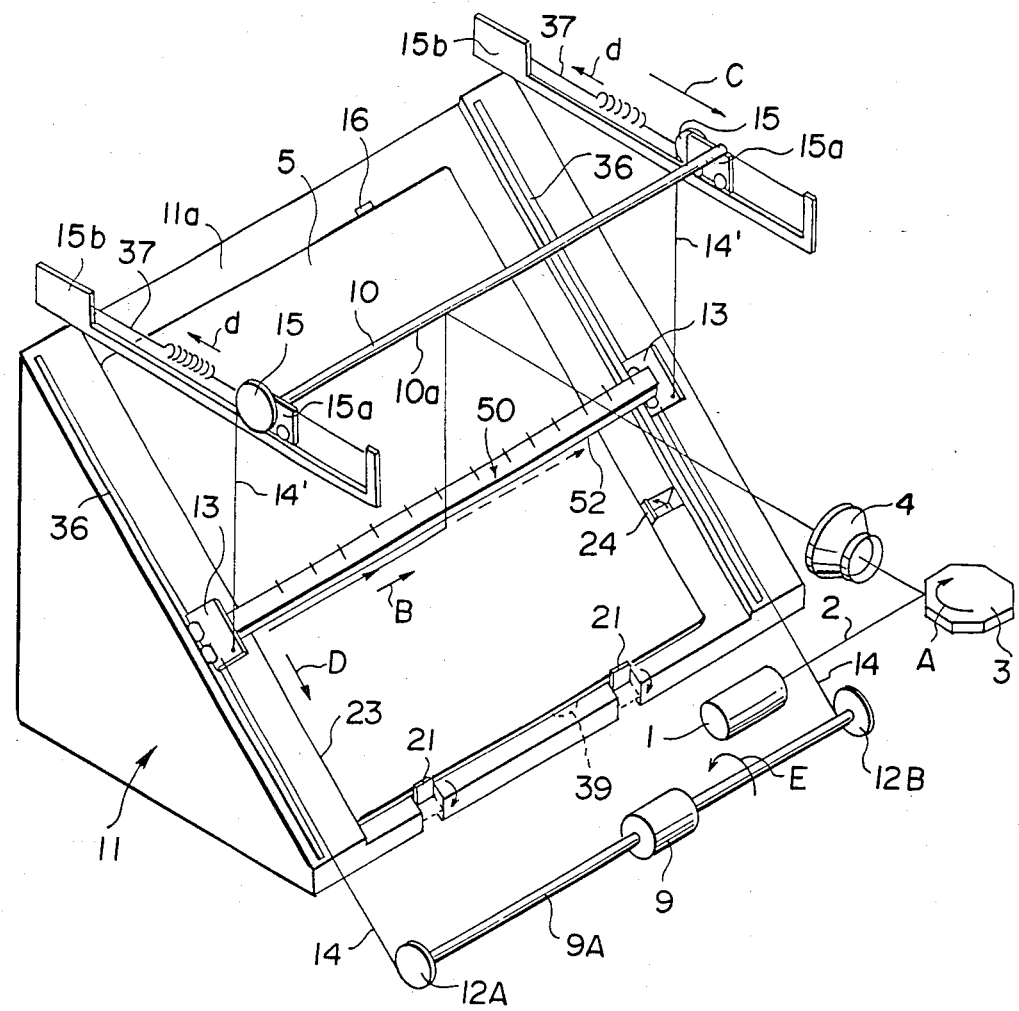
FIG. 3 is a schematic perspective view showing an embodiment of the light beam read-out apparatus in accordance with the present invention.

An embodiment of the light beam read-out apparatus in accordance with the present invention, which is constituted for reading out a radiation image, will now be described with reference to FIGS. 3 to 10. In FIGS. 3 and 4, similar elements are numbered with the same reference numerals with respect to FIGS. 1 and 2.

Referring first to FIG. 3, stimulating rays 2 emitted by a stimulating ray source 1 which may be of the same type as the laser beam source 1 in FIG. 1 are deflected by the multi-face rotating mirror 3 rotating in the direction as indicated by the arrow A, pass through the image forming lens 4, and are reflected by the reflection surface 10a of the sub-scanning mirror 10. A stimulable phosphor sheet 5 carrying a radiation image stored thereon is held on the holding surface 11a of the sheet holding means 11 below the sub-scanning mirror 10. Also in this embodiment, the sub-scanning is conducted by moving the sub-scanning mirror 10 with respect to the stimulable phosphor sheet 5 in the optical axis direction of the image forming lens 4 along mirror guide rails 15b, 15b provided in said optical axis direction.

As shown in FIG. 4, the stimulable phosphor sheet 5 is positioned with respect to the sub-scanning mirror 10 and the sub-scanning is conducted in the same manner as described with reference to FIG. 2.

As the stimulable phosphor sheet 5 is two-dimensionally scanned by the stimulating rays 2, the portion of the stimulable phosphor sheet 5 exposed to the stimulating rays 2 emits light in proportion to the stored radiation energy. In this embodiment, a long photomultiplier 50 is positioned close to the stimulable phosphor sheet 5 as a light detection means for detecting the light emitted by the exposed portion of the sheet 5.

The photomultiplier 50 has a light receiving face 52 positioned along the main scanning line on the stimulable phosphor sheet 5. The length of the light receiving face 52 should preferably be equal to or longer than the read-out scanning width on the stimulable phosphor sheet 5 so that the light receiving face 52 may efficiently receive the light emitted by every portion of the sheet 5 in the main scanning direction. The light entering the photomultiplier 50 is converted thereby into an electric signal, which is sent to an image processing circuit (not shown), processed thereby and used to reproduce a visible image on a CRT or stored on a magnetic tape.

The photomultiplier 50 should move in the sub-scanning direction always closely to the main scanning line which moves in the sub-scanning direction as the sub-scanning mirror 10 is moved. Accordingly, in this embodiment, the sub-scanning mirror 10 and the photomultiplier 50 are moved simultaneously to the predetermined position. Specifically, as shown in FIG. 3, guide grooves 36, 36 for guiding the movement of the photomultiplier 50 in the sub-scanning direction are provided at side end portions of the holding surface 11a of the sheet holding means 11. The photomultiplier 50 is moved in the sub-scanning direction by moveable members 13, 13 which are respectively secured to the ends of the photomultiplier 50, fit into the guide grooves 36, 36, and are connected by wires 14, 14 to pulleys 12A and 12B secured to a rotation shaft 9A of the motor 9. In this embodiment, the holding surface 11a is inclined at an angle of 45° ($\alpha=45°$) with respect to the plane along which the sub-scanning mirror 10 moves. On the other hand, as described above, the sub-scanning mirror 10 is moved in the direction as indicated by the arrow C along mirror guide rails 15b, 15b. Moveable members 15a, 15a for movement along the mirror guide rails 15b, 15b are respectively secured to the ends of the sub-scanning mirror 10. The moveable members 15a, 15a are urged in the direction as indicated by the arrow d by springs 37, 37 secured to ends of the guide rails 15b, 15b. Wires 14', 14' respectively having one end secured to the end of each of the mirror guide rails 15b, 15b opposite to the end thereof where each of the springs 37, 37 is secured, and the other end secured to each of the moveable members 13, 13 of the photomultiplier 50 are applied around pulleys 15, 15. The drive force of the motor 9 is transmitted via the wires 14', 14'. Therefore, when the drive shaft 9A is rotated by the motor 9 in the direction as indicated by the arrow E and the pulleys 12A and 12B at the ends of the drive shaft 9A wind up the wires 14, 14, the moveable members 13, 13 are moved in the direction as indicated by the arrow D along the guide grooves 36, 36, and the photomultiplier 50 is moved in the direction as indicated by the arrow D together with the moveable members 13, 13. Also, the drive force of the motor 9 is transmitted to the moveable members 15a, 15a of the sub-scanning mirror 10 via the wires 14', 14' secured at their ends to the moveable members 13, 13, and the moveable members 15a, 15a are moved in the direction as indicated by the arrow C against the spring force of the springs 37, 37. Thus, with the aforesaid method, it is possible to conduct the movements of the photomultiplier 50 and the sub-scanning mirror 10 in the desired direction by use of a single movement system. Instead of moving the photomultiplier 50 and the sub-scanning mirror 10 by a single motor 9, it is also possible to provide two motors and to move the photomultiplier 50 and the sub-scanning mirror 10 in predetermined directions by use of independent means. In this case, the angle of the movement plane of the sub-scanning mirror 10 with respect to the holding surface 11a need not necessarily be equal to 45°.

After the sub-scanning mirror 10 and the photomultiplier 50 are moved over the predetermined range at the predetermined speed and image read-out is conducted over the whole surface of the stimulable phosphor sheet 5, they are moved reversely to the aforesaid movement direction and returned to the initial positions for image read-out from the next stimulable phosphor sheet. In this embodiment, the photomultiplier 50 is activated and read-out from the stimulable phosphor sheet 5 is started when the sub-scanning mirror 10 is moved in the 5 direction as indicated by the arrow C from the initial position and arrival of the stimulating rays 2 at the end of the sheet 5 is detected by the photodetector 16.

In this embodiment, the long photomultiplier 50 is used. In general, conventional photomultipliers are classified into several types from the viewpoint of the configuration of electrode at a multiplying section inside of the photomultiplier for multiplying minute photocurrent to an appropriate level. The long photomultiplier 50 used in the embodiment of FIG. 3 may be obtained by extending the conventional photomultipliers in the direction normal to their side faces. The photomultiplier 50 used in this embodiment as shown in FIGS. 5A and 5B has an electrode configuration generally called the box type. The photomultiplier 50 comprises a vacuum body 51 fabricated of glass or the like, a photocathode (photoelectric face) 53 positioned to face the long light receiving face 52 for emitting photoelectrons in the vacuum body 51, and a multiplying section 67 positioned under the photocathode 53 in the vacuum body 51 and including a plurality (13 pieces in this embodiment) of electrodes (dynodes) 54 through 66 having a quarter cylinder shape and exhibiting the secondary electron emission effect. A shield electrode 68 is positioned to face the lowermost dynode 66 of the multiplying section 67, and an anode 69 for collecting the electron streams multiplied by the multiplying section 67 and generating a signal is positioned inside of the shield electrode 68. These electrodes are respectively connected electrically in one-to-one relation with terminals of a terminal group 70 positioned on the side opposite to the light receiving face 52 in a number equal to the number of the electrodes. The dynodes 54 through 66 and the shield electrode 68 are secured inside of the body 51 by supporting members 71, 71, 71, fabricated of an insulating material.

Figure 6:
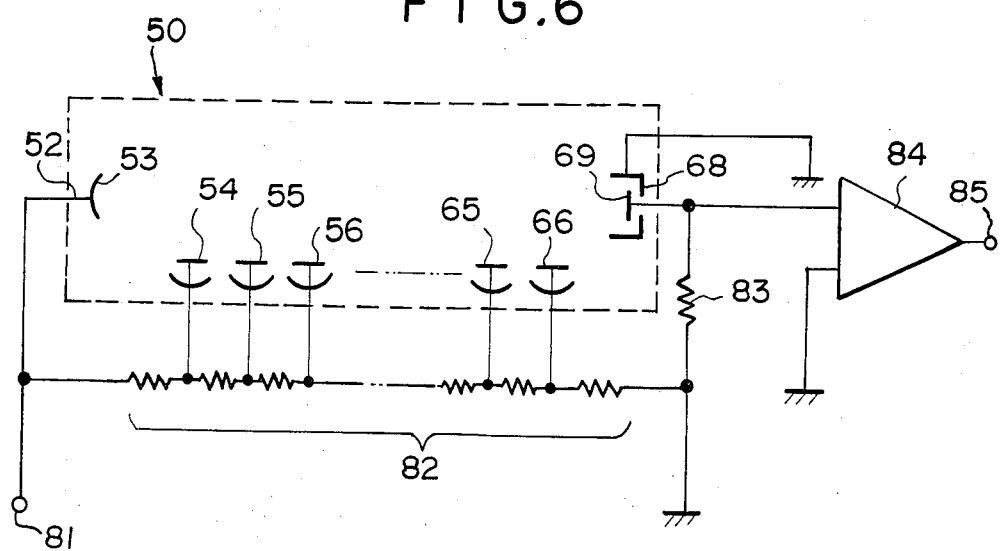
FIG. 6 is a circuit diagram showing the drive circuit for the photomultiplier of FIG. 5A.

FIG. 6 shows an electric circuit 80 for operating the photomultiplier 50 and obtaining a photoelectric output. In FIG. 6, similar elements are numbered with the same reference numerals with respect to FIG. 5A. A high negative voltage is applied to the photocathode 53 via a high negative voltage applying terminal 81. The high negative voltage applied to the high negative voltage applying terminal 81 is divided by a bleeder resistance group 82 into voltages which are applied respectively to the dynodes 54 through 66. The shield electrode 68 is grounded, and the anode 69 is grounded via a resistor 83 and is connected with one of terminals of an amplifier 84. The other terminal of the amplifier 84 is grounded. The photoelectrically converted image information is obtained as an electric signal from an output terminal 85 of the amplifier 84.

FIGS. 7A and 7B show a different type of the photomultiplier 50, which has an electrode configuration generally called the venetian blind type. The photomultiplier 50 comprises a cylindrical body 151, a photocathode 153 positioned along the inner surface of the body 151 to face a light receiving face 152, and a multiplying section 167 positioned under the photocathode 153 and including a plurality (13 pieces in this embodiment) of plate-like dynodes 154 through 166 which are stacked via insulating members 172, 172 secured by pins 173, 173. The dynodes 154 through 166 are respectively constituted by a conductive plate provided with a plurality of sections cut in a U-shape and bent to form a blind-like shape. A shield electrode 168 is secured by the pins 173, 173 under the multiplying section 167 via the insulating members 172, 172, and an anode 169 is positioned inside of the shield electrode 168. These electrodes are electrically connected with terminals of a terminal group 170 positioned at the side end of the body 151. For obtaining the photoelectric output, the circuit as shown in FIG. 6 may be used. The long photomultiplier 50 used in this embodiment may also be fabricated by extending a photomultiplier provided with a multiplying section comprising other known electrode or electrodes. Also, instead of the long photomultiplier, a close contact type photo-sensor array or the like may be used as the light detection means. It is also possible to use a photodetector comprising the conventional light guide member and a photomultiplier closely contacted with the light output face of the light guide member.

When the long photomultiplier 50 is used as the light detection means, the apparatus does not become large even though the sub-scanning is conducted by moving the stimulating rays 2 and the photomultiplier 50 is moved accompanying the sub-scanning. Also, though the conventional light guide member is difficult to process and requires a high manufacture cost, the light guide member need not be used in this embodiment, and therefore the manufacture cost of the apparatus becomes low. Further, when the long photomultiplier 50 is used, since the light receiving face is positioned close to the scanning position on the stimulable phosphor sheet 5 where the light is emitted in proportion to the stored radiation energy, and since almost all of the emitted light directly impinges upon the light receiving face, it is possible to improve the light guiding efficiency as compared with the case where the conventional light guide member is used for guiding the light emitted by the stimulable phosphor sheet 5. The light guiding efficiency may further be improved by providing a reflection mirror to face the light receiving face with the main scanning line intervening therebetween.

In the case of the aforesaid radiation image read-out apparatus as an example of the light beam read-out apparatus, it is necessary to efficiently guide the light emitted by the stimulable phosphor sheet in proportion to the stored radiation energy. Also, when the stimulating rays impinge upon the stimulable phosphor sheet, a part thereof may be reflected by the stimulable phosphor sheet, and a part of the reflected stimulating rays may impinge upon the light receiving face of the photomultiplier. Therefore, it is necessary for the photomultiplier to accurately detect only the light emitted by the stimulable phosphor sheet in proportion to the stored radiation energy and not to detect the reflected stimulating rays. For this purpose, the long photomultiplier in the radiation image read-out apparatus should preferably be provided on its light receiving face with a very thin light guide member and a filter for selectively transmitting only light having a wavelength within the wavelength range of the light emitted by the stimulable phosphor sheet. FIGS. 8A through 8F show examples of the photomultipliers provided with the thin light guide member and the filter on the light receiving face.

FIG. 8A shows the case where a filter 90 is provided on the flat light receiving face of the photomultiplier, for example, on the light receiving face 52 of the box type photomultiplier 50 as shown in FIG. 5A, and a plate-like light guide member 91 fabricated of an acrylic plate or the like is provided on the filter 90. Since the light guide member 91 used in this embodiment is very thin and has a simple shape, the problem of the conventional light guide member that the whole apparatus becomes large and expensive does not arise. The positions of the filter 90 and the light guide member 91 may be interchanged as shown in FIG. 8B. Also, as shown in FIG. 8C, a light guide member 91' provided on the light receiving face 52 may be imparted with the filter action by coloring so that only light having a wavelength within the wavelength range of the light emitted by the stimulable phosphor sheet is selectively transmitted and light having a wavelength within the wavelength range of stimulating rays is absorbed. FIGS. 8D, 8E and 8F show the cases where the filter 90 or a filter 90' and the light guide member 91 are provided on the curved light receiving face of the photomultiplier, for example, on the light receiving face 152 of the venetian blind type photomultiplier 50 as shown in FIG. 7A. In the case where the thickness of the filter 90' is different between various positions thereof, the density distribution of the whole filter 90' should be changed so that the density decreases towards the thicker sections and the filter characteristics become uniform. It is also possible to provide only either one of the filter and the light guide member on the light receiving face of the photomultiplier 50.

As shown in FIG. 9, when the length of the photomultiplier 50 in the main scanning direction is shorter than the read-out scanning width on the stimulable phosphor sheet 5, the light guide member 91 may be extended longitudinally from the light receiving face 52 of the photomultiplier 50 towards the stimulable phosphor sheet 5 so that it efficiently guides the light emitted by the entire read-out scanning width on the sheet 5 to the light receiving face 52 of the photomultiplier 50.

However, when light enters the long photomultiplier 50 from a section outside of the light receiving face or without passing through the filter, noise is caused in a reproduced image. Accordingly, as shown in FIG. 10, the photomultiplier 50 should be covered by a light shielding case 92 to prevent such light causing noise from entering the photomultiplier 50 and to conduct image read-out more accurately. In FIG. 10, the light guide member 91 is provided on the light receiving face 152, and the filter 90 is provided on a light input face 91a of the light guide member 91. In this case, the surface of the photomultiplier 50 outside of the light receiving face 152 and the surface of the light guide member 91 outside of its surface contacting the filter 90 may be covered by the light shielding case 92.

In general, the photomultiplier is readily affected by an external magnetic field, and the photocurrent multiplication factor markedly decreases by the adverse effect of the magnetic field. In this embodiment, since the photomultiplier is long, it may be more vulnerable to the adverse effect of the magnetic field than in the small photomultiplier because of the configuration and the design of the whole apparatus. Accordingly, the light shielding case 92 should preferably be fabricated of Permalloy or the like so that it acts also as a magnetic shielding case.

With the embodiment of the light beam read-out apparatus shown in FIG. 3, it is possible to make the size of the apparatus in the sub-scanning direction small and to use a cheap motor as the motor 6 as mentioned above with reference to the embodiment of the light beam recording apparatus shown in FIG. 1. Also, in the case where preliminary read-out is conducted prior to final read-out for obtaining an image signal for use in reproduction of a visible image, since the preliminary read-out and the final read-out may be conducted continuously by reciprocally moving the sub-scanning mirror 10, a time loss as in the case where the stimulable phosphor sheet is conveyed for the sub-scanning does not arise, and it is possible to efficiently carry out the image read-out including the preliminary read-out and the final read-out.

In the embodiment of FIG. 3, feeding of the stimulable phosphor sheet 5 onto the sheet holding means 11 and unloading of the sheet 5 therefrom may be conducted in the same manner as described with reference to FIG. 1.

Though the embodiment of the light beam read-out apparatus is described above by taking the radiation image read-out apparatus using a stimulable phosphor sheet as an example, the light beam read-out apparatus may also be any other light beam read-out apparatus other than the radiation image read-out apparatus, and the same effects are obtained also with the other embodiments.

Embodiments of the light beam scanning apparatus in accordance with the present invention, which are constituted, by way of example, as a light beam recording apparatus, will hereinbelow be described with reference to FIGS. 11 to 49. In FIGS. 11 to 49, similar elements are numbered with the same reference numerals with respect to FIG. 1.

In the embodiment of FIG. 11, the recording material 5 is positioned with respect to the sub-scanning mirror 10 and the sub-scanning is conducted in the same manner as described with reference to FIG. 2. This embodiment is provided with a feed means, an unloading means and a positioning means for the recording material 5 as described below with reference to FIGS. 11 and 12A through 12E.

A pair of feed rollers 17A and 17B are provided as the feed means for the recording material 5 in the vicinity of the upper end of the recording material holding means 11. As shown in FIG. 12A, recording materials 5 are taken up one by one by an adhesion means 20 from a magazine 18 housing a plurality of the recording materials 5, and allowed to fall by being guided by guide plates 19. The feed rollers 17A and 17B grasp the recording material 5 guided by the guide plates 19, respectively rotate in the directions as indicated by the arrows E1, E1, and feed the recording material 5 along the holding surface 11a.

The feed rollers 17A and 17B thus convey the recording material 5 in the direction as indicated by the arrrow F1, and feed it along the holding surface 11a up to a point prior to the predetermined position on the holding surface 11a. The holding surface 11a allows the recording material 5 to fall by its weight therealong. As shown in FIG. 12B, when the rear edge of the recording material 5, as viewed in the feed direction, leaves the feed rollers 17A and 17B, the recording material 5 falls by its weight in the direction as indicated by the arrow F2 along the holding surface 11a.

Sheet stop plates 21, 21 (by way of example, two pieces in this embodiment) are provided at the lower end portion of the recording material holding means 11. The sheet stop plates 21, 21 are operated, for example, by a rotary solenoid (not shown) for movement between a first position at which one end portion of each of the sheet stop plates 21, 21 projects above the holding surface 11a, contacts the forward edge of the recording material 5, and stops the recording material 5 at the predetermined position, and a second position at which said one end portion of each of the sheet stop plates 21, 21 is retracted down from said holding surface 11a. As shown in FIG. 12B, when the recording material 5 is fed by the feed rollers 17A and 17B and falls by its weight, the sheet stop plates 21, 21 are moved to the first position and stop the falling recording material 5 at the predetermined position. In order to form the holding surface 11a so that it allows the recording material 5 to fall by its weight therealong, the angle of inclination of the holding surface 11a with respect to the horizontal plane may be adjusted to be large, or the holding surface 11a may be formed of a material exhibiting low resistance against the back surface of the recording material 5.

As shown in FIG. 12C, when the recording material 5 is held at the predetermined position on the holding surface 11a, two-dimensional scanning with the laser beam 2 is carried out.

As shown in FIG. 12D, when recording with the laser beam 2 is finished, the sheet stop plates 21, 21 are rotated in the direction as indicated by the arrow H around a rotation shaft 21a, and retracted from the holding surface 11a to the second position. As a result, the recording material 5 falls by its weight in the direction as indicated by the arrow F3 along the holding surface 11a. A pair of unloading rollers 22A and 22B as the unloading means for grasping the forward edge portion of the recording material 5 falling by its weight and conveying the recording material 5 out of the recording material holding means 11 are provided in the vicinity of the lower end of the recording material holding means 11. The recording material 5 falling from the predetermined position is grasped by the unloading rollers 22A and 22B. As shown in FIG. 12E, the unloading rollers 22A and 22B are rotated respectively in the directions as indicated by the arrows E2, E2 for moving the recording material 5 in the direction as indicated by the arrow F4 and unloading it out of the recording apparatus. The recording material 5 unloaded from the apparatus is conveyed into an automatic developing machine, a receiving magazine or the like. The unloading rollers 22A and 22B may also act as inlet rollers of the automatic developing machine. After the recording material 5 is unloaded from the apparatus, the sheet stop plates 21, 21 are rotated reversely to the direction indicated by the arrow H up to the first position for stopping the next recording material 5. As indicated by the broken line in FIG. 12E, a detector 39' such as a reflection type photo-interrupter or a limit switch may be provided in the recording material holding means 11 near the sheet stop plates 21, 21 for detecting the rear edge of the recording material 5 leaving the apparatus and generating a detection signal. Based on the detection signal, the sheet stop plates 21, 21 may be moved from the second position to the first position.

With the embodiment of FIG. 11, since the feed rollers 17A and 17B and the unloading rollers 22A and 22B are provided, the holding surface 11a of the recording material holding means 11 is formed to allow the recording material 5 to fall by its weight therealong, and the sheet stop plates 21, 21 are provided for positioning the recording material 5, it is possible to reliably conduct feeding, unloading and positioning of the recording material 5.

Figure 14:
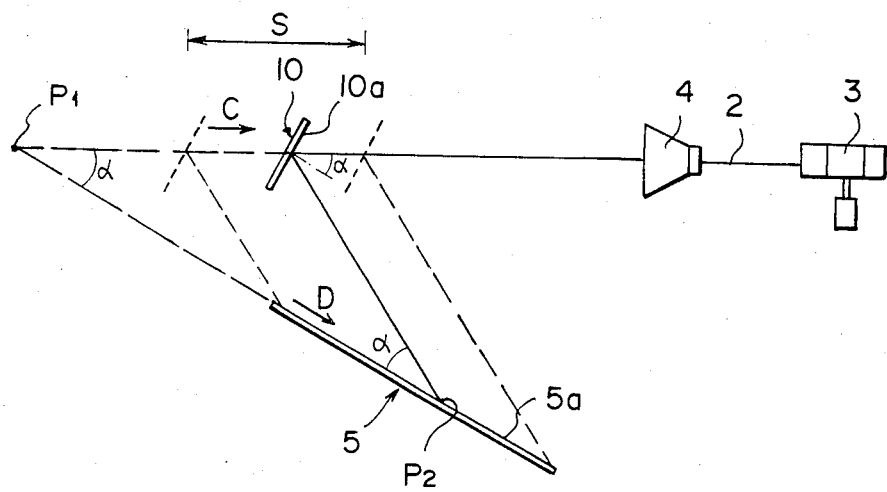
FIG. 14 is an explanatory side view showing the sub-scanning in the embodiment of FIG. 13, FIGS. 15A to 15E are explanatory views showing the feeding, unloading and positioning of the scanning sheet in the embodiment of FIG. 13.

In another embodiment shown in FIG. 13, the recording material 5 is positioned with respect to the sub-scanning mirror 10 and the sub-scanning is conducted as shown in FIG. 14. This embodiment is provided with a feed means and a positioning means for the recording material 5 as described below with reference to FIGS. 13 and 15A through 15E.

As shown in FIG. 15A, the feed rollers 17A and 17B provided as the feed means feed the recording material 5, which is taken up from the magazine 18 and guided by the guide plates 19, onto the holding surface 11a in the manner as described with reference to FIG. 12A.

The feed rollers 17A and 17B rotate and feed the recording material 5 in the direction as indicated by the arrow F1. As shown in FIG. 15B, they convey the recording material 5 up to a point prior to the predetermined position, where the recording material 5 should be held, on the holding surface 11a.

As indicated by the broken line in FIG. 13, a recording material conveying roller 42 extends in the main scanning direction under the holding surface 11a of the recording material holding means 11 and is exposed at the holding surface 11a within an opening 41 provided in the holding surface 11a. The recording material conveying roller 42 is moveable between a first position at which the upper end of the recording material conveying roller 42 appears on the holding surface 11a and a second position at which the upper end thereof is retracted from the holding surface 11a. The recording material 5 fed up to the point prior to the predetermined position by the feed rollers 17A and 17B is then moved to the predetermined position by the recording material conveying roller 42. Specifically, while the recording material 5 is being fed onto the holding surface 11a by the feed rollers 17A and 17B as shown in FIG. 15A, the recording material conveying roller 42 is maintained at the second position at which the upper end thereof is retracted from the holding surface 11a. As shown in FIG. 15B, when the recording material 5 is fed by the feed rollers 17A and 17B up to the point prior to the predetermined position on the holding surface 11a, the recording material conveying roller 42 is moved upwardly to the first position and contacts the lower surface of the recording material 5. As shown in FIG. 15C, at the first position, the recording material conveying roller 42 rotates in the direction as indicated by the arrow G1 and conveys the recording material 5 in the direction as indicated by the arrow F2 up to the predetermined position.

The recording material holding means 11 is provided with the detector 39 constituted by a reflection type photointerrupter, a limit switch or the like at a portion where the forward edge of the recording material 5 is positioned when the recording material 5 is at the predetermined position. The detector 39 detects the arrival of the forward edge of the recording material 5 at the predetermined by being conveyed by the recording material conveying roller 42, and generates a detection signal. The detection signal is sent to a drive member (not shown) for the recording material conveying roller 42 and stops the rotation of the recording material conveying roller 42. As shown in FIG. 15D, when the recording material 5 is placed at the predetermined position on the holding surface 11a, the recording material conveying roller 42 is moved down to the second position, and the two-dimensional scanning with the laser beam 2 is conducted in this condition.

In this embodiment, movement of the recording material 5 is effected only by the feed rollers 17A and 17B and the recording material conveying roller 42, and the recording material 5 should not be allowed to fall by its weight along the inclined holding surface 11a. Therefore, falling of the recording material 5 by its weight should preferably be prevented by making the angle of inclination of the holding surface 11a with respect to the horizontal plane as small as possible, or forming the holding surface 11a by use of a material exhibiting high friction against the recording material 5. When necessary, the recording material holding means 11 may be provided with an adhesion means for adhering the recording material 5 onto the holding surface 11a to such an extent that the recording material 5 is prevented from falling by its weight and can be moved by the feed rollers 17A and 17B and the recording material conveying roller 42.

As shown in FIG. 15E, when recording with the laser beam 2 is finished, the recording material conveying roller 42 is moved upwardly to the first position and rotated in the direction as indicated by the arrow G1 to move the recording material 5 towards the other end of the recording material holding means 11. The recording material conveying roller 42 conveys the recording material 5 until the forward edge portion of the recording material 5 is grasped between the unloading rollers 22A and 22B provided, by way of example, as the unloading means for the recording material 5 in the vicinity of said other end of the recording material holding means 11. The recording material 5 is moved in the direction as indicated by the arrow F3 by the rotation of the unloading rollers 22A and 22B and unloaded from the recording apparatus. When the recording material 5 is unloaded from the apparatus, the recording material conveying roller 42 is moved down to the second position for allowing the next recording material 5 to be fed onto the holding surface 11a. The position of the detector 39 is not limited to the aforesaid position. For example, the detector 39 may be provided at the portion of the recording material holding means 11 where the rear edge of the recording material 5 is positioned when the recording material 5 is at the predetermined position, and the rear edge of the recording material 5 placed at the predetermined position may be detected. In the case where the recording material positioning accuracy may not be so much high, the detector 39 need not necessarily be provided. Thus, for example, the operating time of the drive means for operating the recording material conveying roller 42 may be determined, and the recording material 5 may be stopped by stopping the recording material conveying roller 42 when the recording material 5 has been moved up to the predetermined position. In this case, the control may be facilitated by using a pulse motor as the drive means. Also, the method of unloading the recording material 5 out of the apparatus is not limited to the method using the unloading rollers 22A and 22B. For example, after the recording with the laser beam 2 is finished, the recording material conveying roller 42 may be reversely rotated in the direction as indicated by the arrow G2 in FIG. 15E to move the recording material 5 towards the feed rollers 17A and 17B, and the feed rollers 17A and 17B may be reversely rotated in the directions as indicated by the arrows E2, E2 to grasp the recording material 5 conveyed by the recording material conveying roller 42 and unload the recording material 5 upwardly of the apparatus.

In the embodiment of FIG. 13, since the feed rollers 17A and 17B, the detector 39 for detecting the forward edge of the recording material 5, and the recording material conveying roller 42 for moving the recording material 5 as mentioned above are provided, it is possible to reliably conduct feeding and positioning of the recording material 5.

A further embodiment of the light beam scanning apparatus will now be described with reference to FIGS. 16 to 22E. In this embodiment, the recording material 5 is positioned with respect to the sub-scanning mirror 10 and the sub-scanning is conducted as shown in FIG. 2. This embodiment is provided with a positioning means for adjusting the position of the recording material 5 in the main scanning direction after the recording material 5 is fed onto the holding surface 11a as described below mainly with reference to FIGS. 16, 17A through 17E, 18A and 18B.

As shown in FIGS. 17A and 17B, the recording material 5 is fed onto the holding surface 11a and allowed to fall by its weight therealong, and the position of the recording material 5 in the sub-scanning direction is adjusted by the sheet stop plates 21, 21 in the same manner as described with reference to FIGS. 12A and 12B.

Figure 18A:
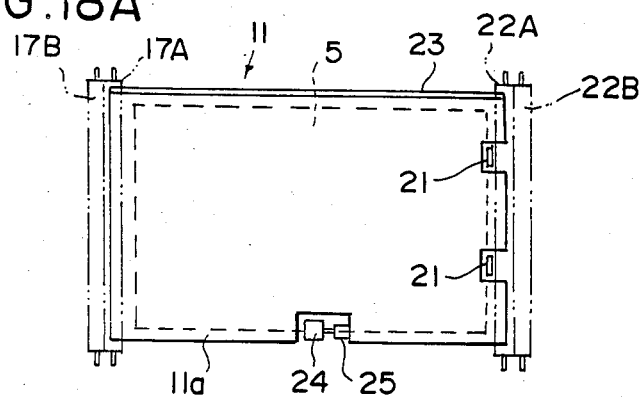
Figure 18B:
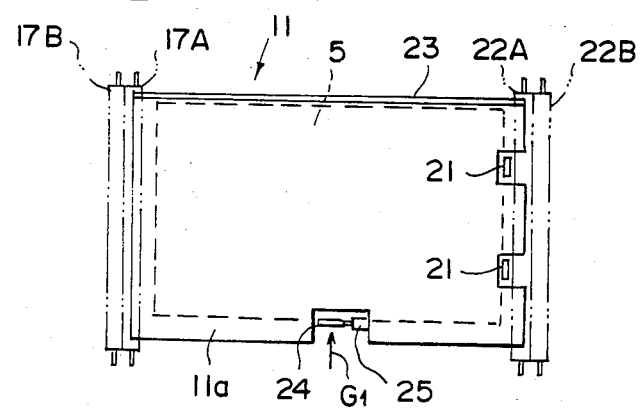
Figure 19:
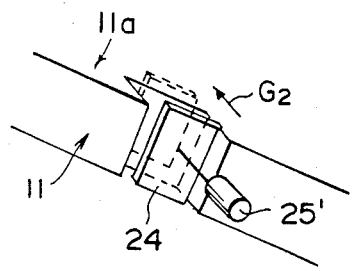
FIG. 19 is a perspective view showing an example of the shifting plate used in the embodiment of FIG. 16.

As shown in FIG. 16, the guide plate 23 projecting upwardly is provided at one side end portion of the recording material holding means 11, and the shifting plate 24 for making the recording material 5 contact the guide plate 23 and adjusting the position of the recording material 5 in the main scanning direction is provided at the other side end portion of the recording material holding means 11. The shifting plate 24 is moveable by a drive means 25 constituted by a rotary solenoid, a motor or the like between a first position, as indicated by the solid line in FIG. 16, at which the shifting plate 24 pushes the side edge of the recording material 5 and makes the recording material 5 contact the guide plate 23, and a second position, as indicated by the broken line in FIG. 16, at which the shifting plate 24 is retracted from the side edge of the recording material 5. Specifically, the shifting plate 24 is maintained at the second position as shown in FIG. 18A until the recording material 5 is fed by the feed rollers 17A and 17B onto the holding surface 11a and the positioning of the recording material 5 in the sub-scanning direction by the sheet stop plates 21, 21 is finished. When the positioning of the recording material 5 in the sub-scanning direction is finished, the shifting plate 24 is rotated in the direction as indicated by the arrow G1 as shown in FIG. 16 to the first position as shown in FIG. 18B. At the first position, the shifting plate 24 pushes the recording material 5 towards the guide plate 23 and makes it contact the guide plate 23, thereby adjusting the position of the recording material 5 in the main scanning direction. Movement of the shifting plate 24 between the first and second positions may also be conducted in any other manner, for example, by linear movement in the direction as indicated by the arrow G2 by use of a linear movement type solenoid 25' as shown in FIG. 19. Also, a plurality of the shifting plates 24 may be provided, and the length and the shape of the shifting plate 24 may be selected in accordance with the size of the recording material 5 or the like. As shown in FIG. 20, a plurality of the guide plates 23 may be provided in spaced relation to each other.

When positioning of the recording material 5 in the main scanning direction and in the sub-scanning direction is finished as described above, two-dimensional scanning with the laser beam 2 is carried out as shown in FIG. 17C.

When recording with the laser beam 2 is finished, the shifting plate 24 is retracted to the second position. As shown in FIGS. 17D and 17E, the recording material 5 is then allowed to fall by its weight along the holding surface 11a and unloaded from the apparatus in the same manner as described with reference to FIGS. 12D and 12E.

In the embodiment of FIG. 16, positioning of the recording material 5 in the sub-scanning direction on the holding surface 11a may also be conducted by use of a member other than the sheet stop plates 21, 21. For example, as shown in FIG. 21, in the case where the angle of inclination of the holding surface 11a with respect to the horizontal plane is relatively small and the recording material 5 does not fall by its weight along the holding surface 11a, the recording material conveying roller 42 as mentioned with reference to FIG. 13 may be provided.

Figure 22A:
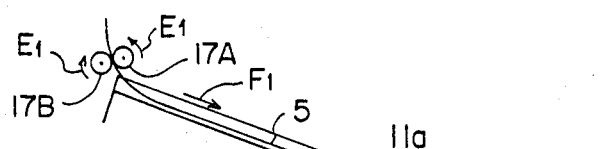
Figure 22B:
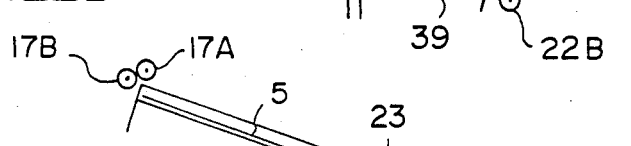
Figure 22C:
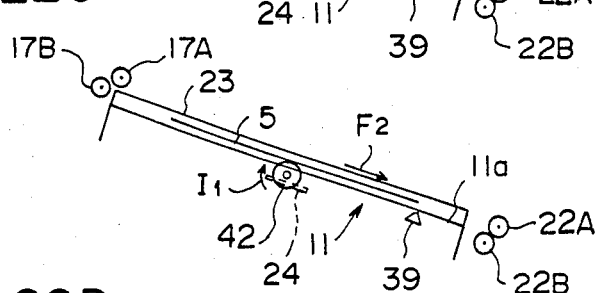
Figure 22D:
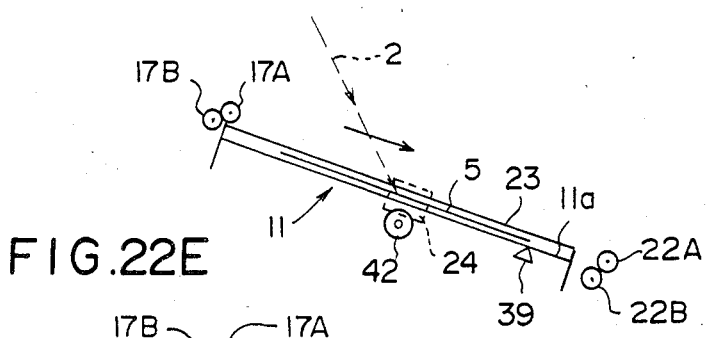
Figure 22E:
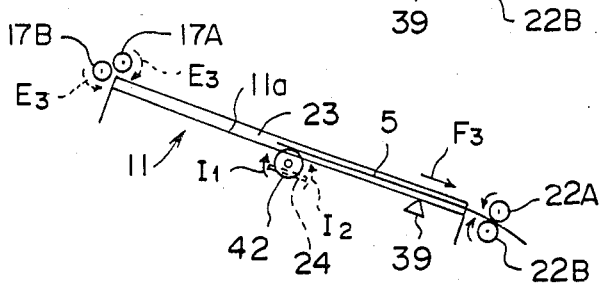

In this case, as shown in FIGS. 22A through 22E, positioning of the recording material 5 by use of the recording material conveying roller 42 is carried out in the same manner as described with reference to FIGS. 15A through 15E. In FIGS. 22A through 22E, the arrows I1, I2 and E3 respectively correspond to the arrows G1, G2 and E2 in FIGS. 15A through 15E. As shown in FIG. 22D, when positioning of the recording material 5 in the sub-scanning direction is finished, positioning thereof in the main scanning direction is carried out by the shifting plate 24 and the guide plate 23, the recording material conveying roller 42 is retracted to the second position, and then recording with the laser beam 2 is started.

A still further embodiment of the light beam scanning apparatus will hereinbelow be described with reference to FIGS. 23 to 27E. In this embodiment, instead of the shifting plate 24 in the embodiment of FIG. 16, at least one shifting roller is provided for positioning the recording material 5 in the main scanning direction on the holding surface 11a.

Figure 23:
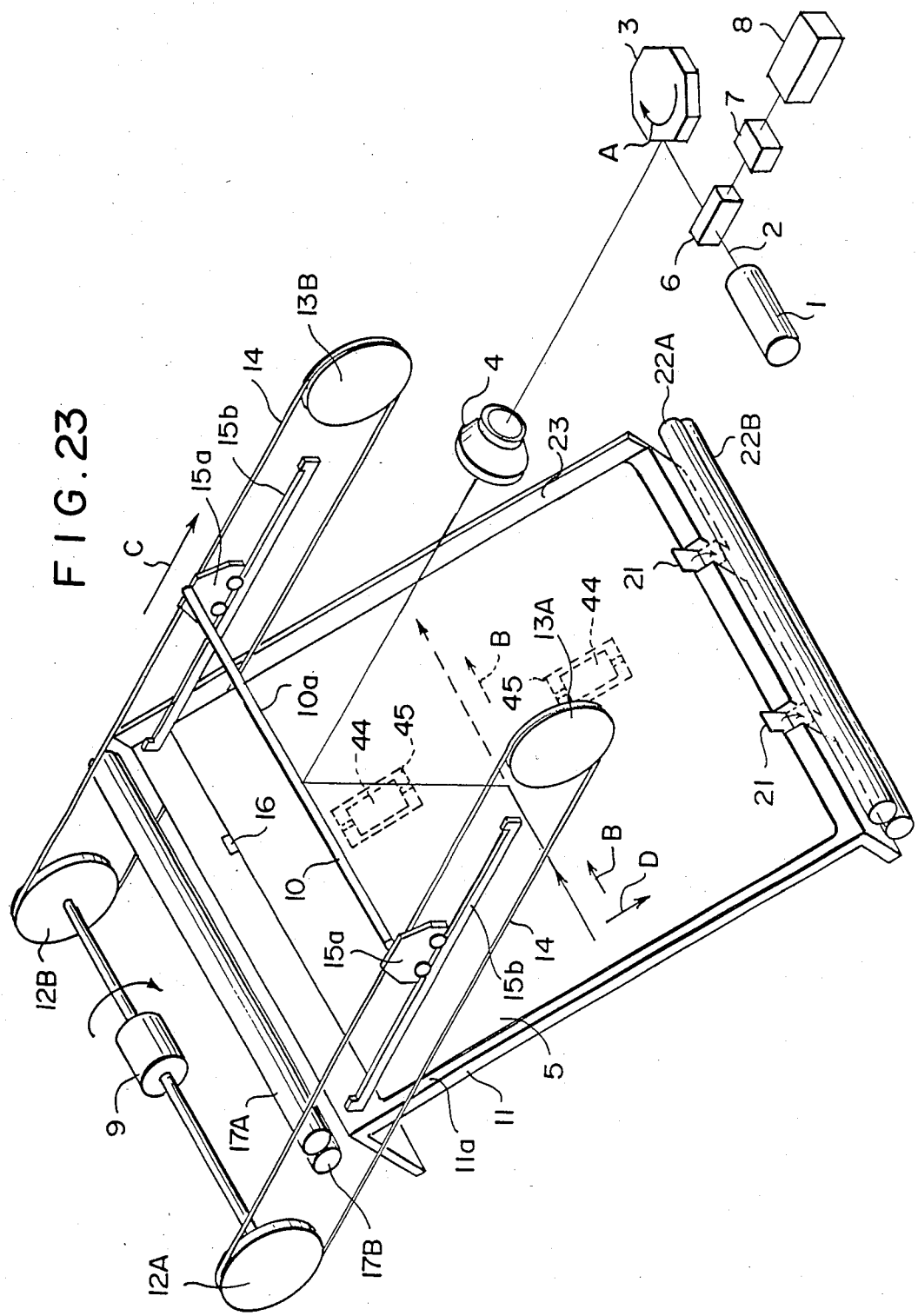
FIG. 23 is a schematic perspective view showing a still further embodiment of the light beam scanning apparatus in accordance with the present invention.
Figure 25A:
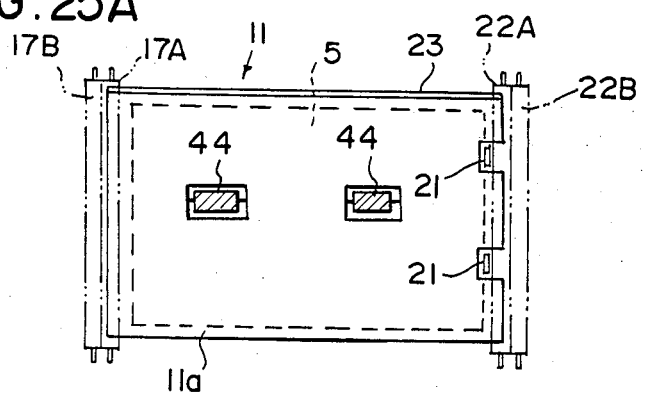
Figure 25B:
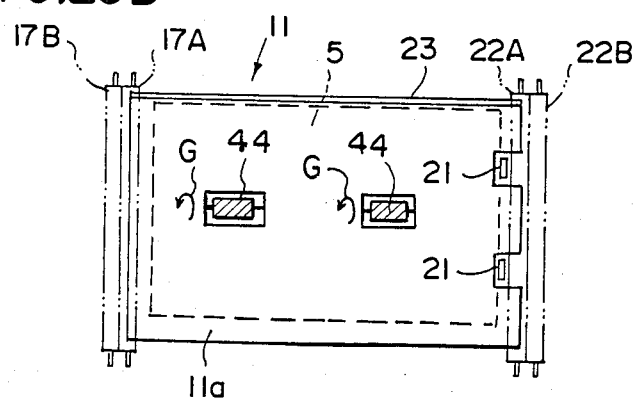

In the embodiment of FIG. 23, shifting rollers 44, 44 (by way of example, two pieces in this embodiment) for making the recording material 5 contact the guide plate 23 and adjusting the position of the recording material 5 in the main scanning direction are provided under the holding surface 11a. The shifting rollers 44, 44 are exposed in openings 45, 45 of the holding surface 11a and vertically moveable between first positions at which the upper ends of the shifting rollers 44, 44 appear on the holding surface 11a and second positions at which the upper ends thereof are retracted from the holding surface 11a. At the first positions, the shifting rollers 44, 44 contact the lower surface of the recording material 5 and move the recording material 5. Specifically, the shifting rollers 44, 44 are maintained at the second positions as shown in FIGS. 24A and 24B until the recording material 5 is fed onto the holding surface 11a by the feed rollers 17A and 17B and positioning of the recording material 5 in the sub-scanning direction by the sheet stop plates 21, 21 is finished in the same manner as described above with reference to FIGS. 12A and 12B. As shown in FIG. 24C, when positioning of the recording material 5 in the sub-scanning direction is finished, the shifting rollers 44, 44 are moved upwardly to the first positions. FIGS. 25A and 25B are plan views showing the recording material holding means 11 with the shifting rollers 44, 44 at the first positions.

FIG. 25A shows the condition before the shifting rollers 44, 44 are rotated at the first positions. In this condition, the position of the recording material 5 has been adjusted only in the sub-scanning direction. As shown in FIG. 25B, when the shifting rollers 44, 44 are then rotated in the directions as indicated by the arrows G, G, the recording material 5 is thereby moved towards the guide plate 23, the side edge of the recording material 5 contacts the guide plate 23, and positioning of the recording material 5 in the main scanning direction is thus conducted. The number, lengths and positions of the shifting rollers 44, 44 are not limited to those shown, and may be selected in accordance with the type of the recording material 5 or the like. It is also possible to use a plurality of guide plates 23, 23, . . . as shown in FIG. 20.

As shown in FIG. 24D, when the positioning of the recording material 5 in the main scanning direction and in the sub-scanning direction is finished as described above, the shifting rollers 44, 44 are moved down to the second positions, and two-dimensional scanning with the laser beam 2 is conducted in this condition.

As shown in FIGS. 24E and 24F, when recording with the laser beam 2 is finished, the recording material 5 is allowed to fall by its weight along the holding surface 11a and unloaded from the apparatus in the same manner as described with reference to FIGS. 12D and 12E.

Figure 26:
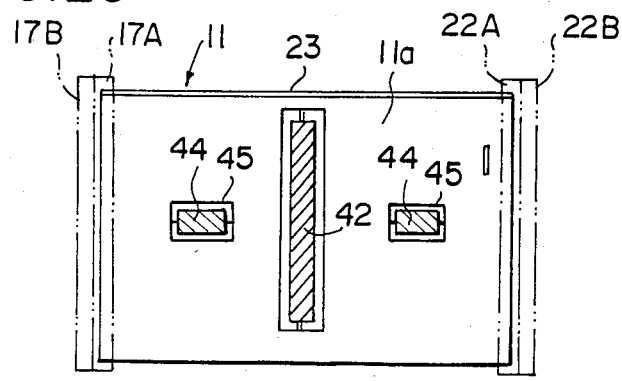
FIG. 26 is a plan view showing the scanning sheet holding means provided with a scanning sheet conveying roller in the embodiment of FIG. 23, FIGS. 27A to 27F are explanatory views showing the positioning of the scanning sheet by the scanning sheet conveying roller in the embodiment of FIG. 23.

As shown in FIG. 26, positioning of the recording material 5 in the sub-scanning direction may also be conducted by use of the recording material conveying roller 42 as mentioned with reference to FIGS. 13 and 21.

Figure 27A:
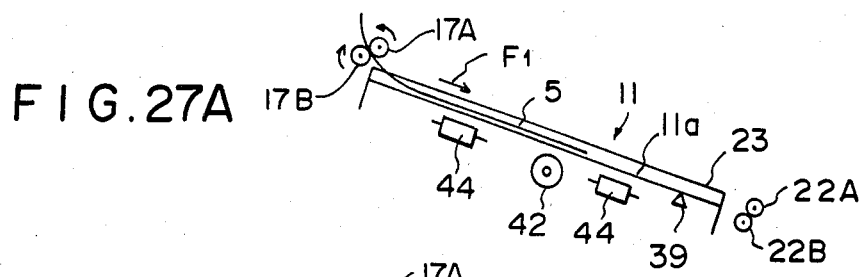
Figure 27B:
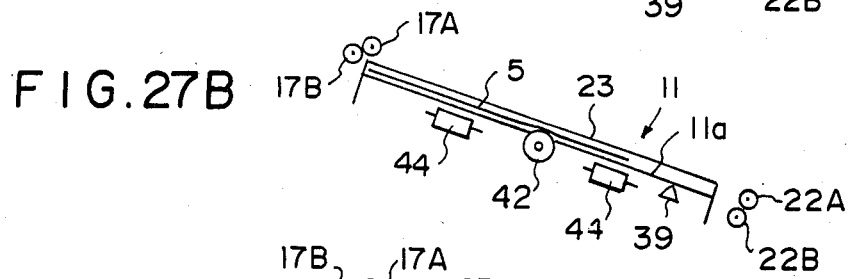
Figure 27C:
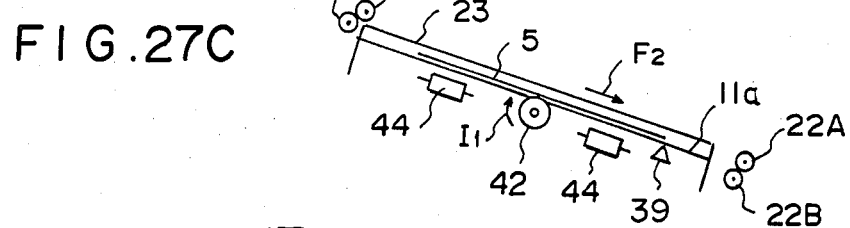
Figure 27D:
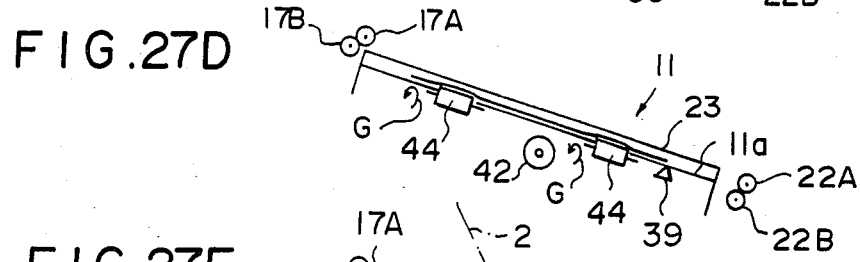
Figure 27E:
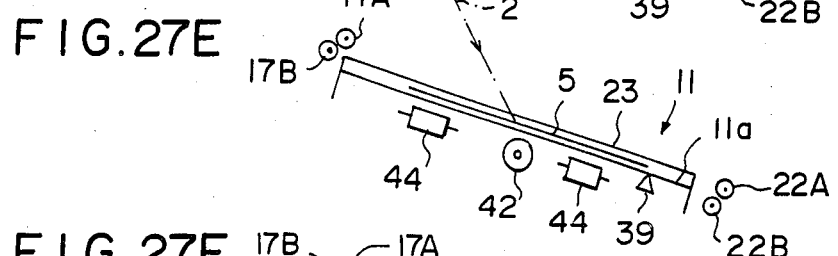
Figure 27F:
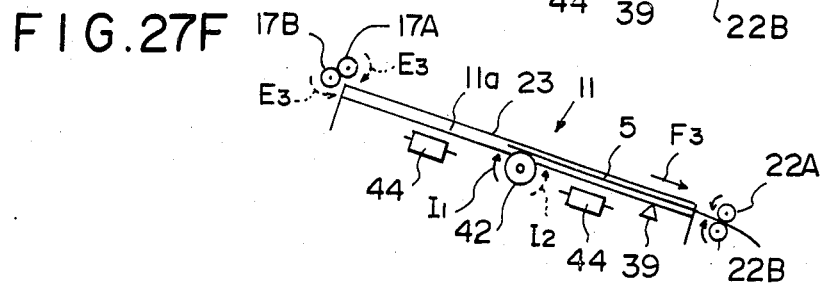

In this case, as shown in FIGS. 27A, 27B and 27C, positioning of the recording material 5 in the sub-scanning direction is conducted in the same manner as described with reference to FIGS. 15A, 15B and 15C. Thereafter, as shown in FIG. 27D, the recording material conveying roller 42 is moved down to its second position, and the shifting rollers 44, 44 which have been maintained at their second positions are moved upwardly to their first positions, and rotated in the directions as indicated by the arrows G, G. Thus positioning of the recording material 5 in the main scanning direction is effected by the shifting rollers 44, 44 and the guide plate 23. When the positioning in the main scanning direction is completed, the shifting rollers 44, 44 are retracted to their second positions and recording with the laser beam 2 is conducted as shown in FIG. 27E. As shown in FIG. 27F, after recording with the laser beam 2 is completed, the recording material 5 is unloaded from the apparatus in the same manner as described with reference to FIG. 15E. It would be understood that the arrows I1, I2 and E3 in FIGS. 27C and 27F respectively correspond to the arrows G1, G2 and E2 in FIGS. 15C and 15E.

Figure 28:
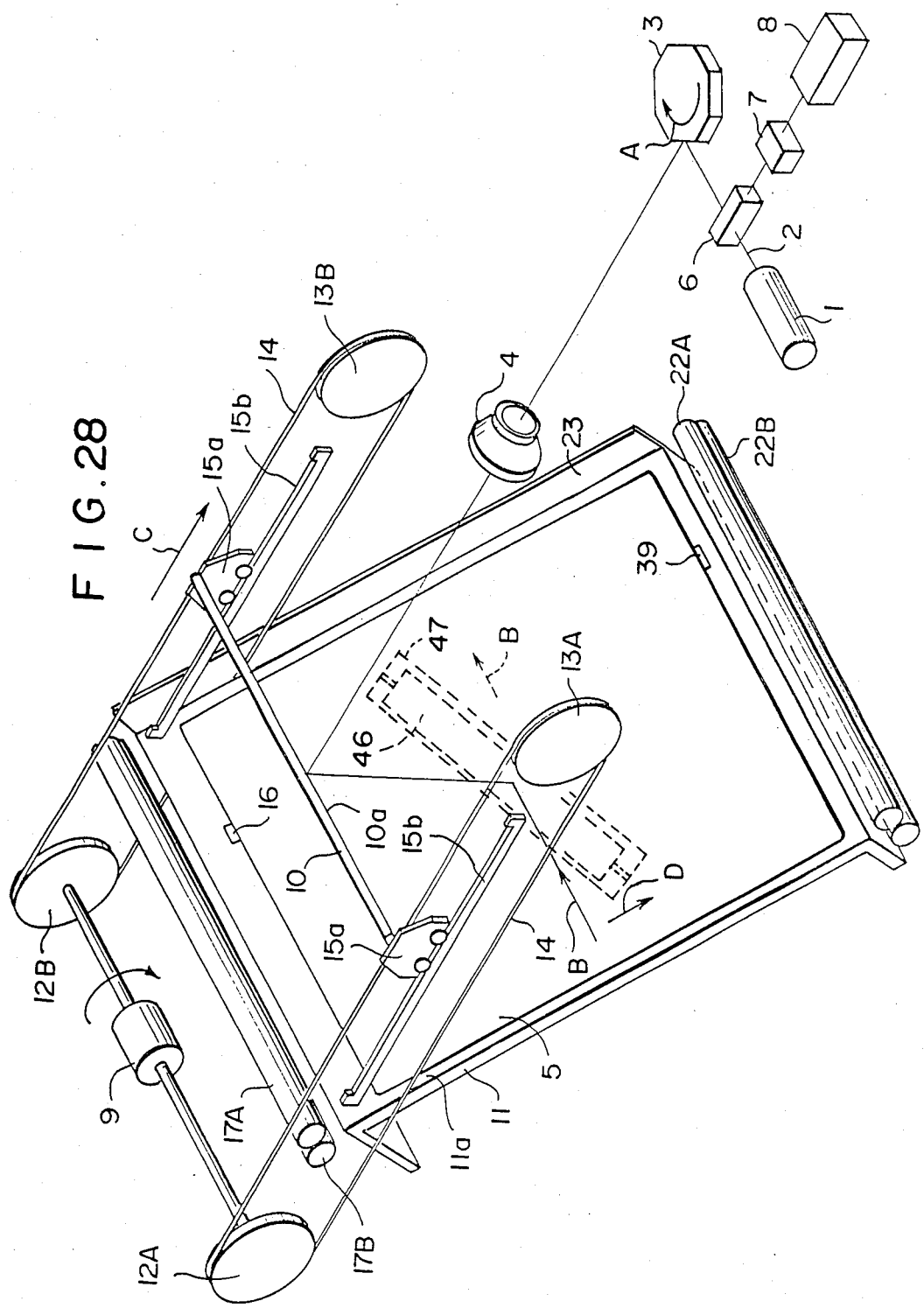
FIG. 28 is a schematic perspective view showing another embodiment of the light beam scanning apparatus in accordance with the present invention.

In another embodiment shown in FIG. 28, the recording material 5 is positioned with respect to the sub-scanning mirror 10 and the sub-scanning is conducted as shown in FIG. 14. This embodiment is provided with a scanning sheet stop means for the main scanning direction, a scanning sheet stop means for the sub-scanning direction, a feed means, and an oblique conveying roller as described below.

As shown in FIG. 29A, the recording material 5 is fed in the direction as indicated by the arrow F1 inside of the guide plate 23 on the holding surface 11a by the feed rollers 17A and 17B up to a point prior to the predetermined position.

On the other hand, as shown in FIG. 28, an oblique conveying roller 46 is provided under the holding surface 11a so that it is exposed in an opening 47 of the holding surface 11a and moveable between a first position at which the upper end of the oblique conveying roller 46 appears on the holding surface 11a and a second position at which the upper end thereof is retracted from the holding surface 11a. As shown in FIG. 29A, the oblique conveying roller 46 is maintained at the second position while the recording material 5 is fed onto the holding surface 11a by the feed rollers 17A and 17B. As shown in FIG. 29B, when the recording material 5 has been fed by the feed rollers 17A and 17B up to the point prior to the predetermined position on the holding surface 11a, the oblique conveying roller 46 is moved upwardly to the first position and contacts the lower surface of the recording material 5. Shifting of the recording material 5 conducted by the oblique conveying roller 46 at the first position will be described below with reference to FIGS. 30A through 30D which are plan views showing the recording material holding means 11.

Figure 30C:
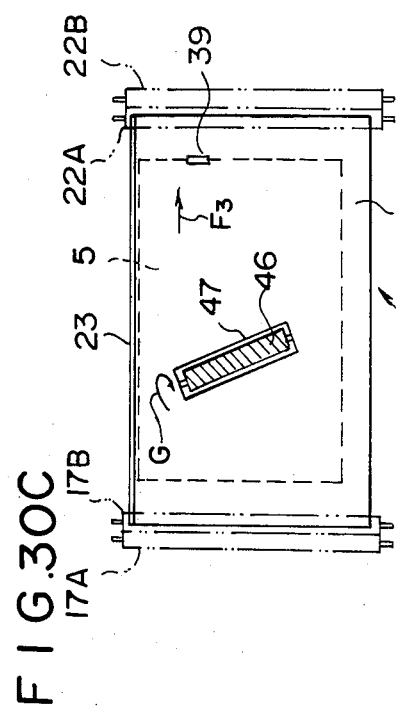
Figure 30D:
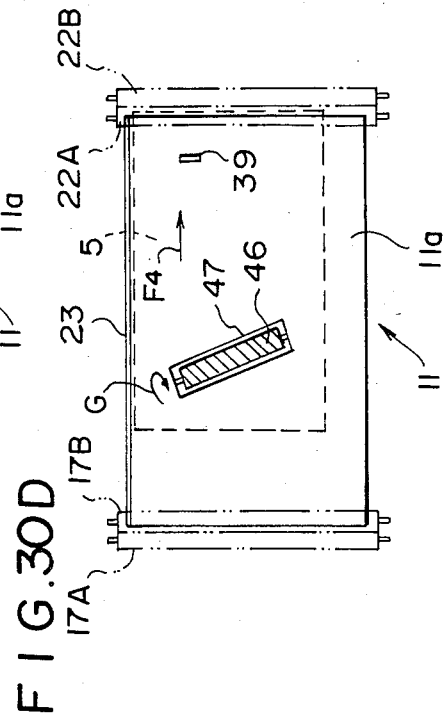
Figure 30A:
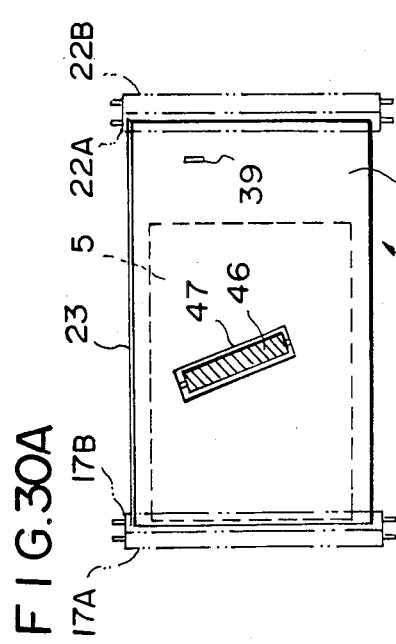
Figure 30B:
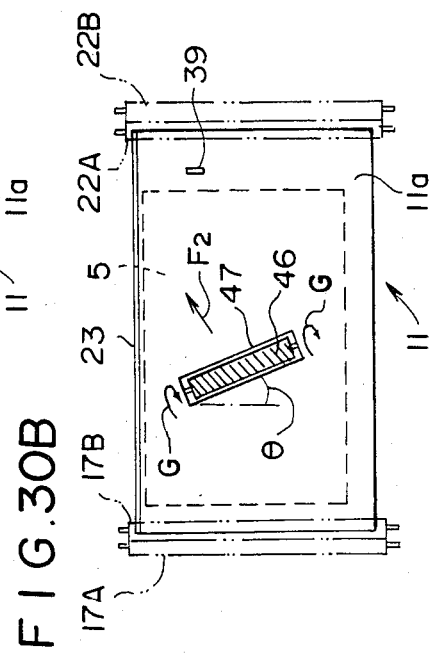

FIG. 30A shows the condition after the feeding of the recording material 5 by the feed rollers 17A and 17B is finished and the oblique conveying roller 46 is moved upwardly to the first position. The recording material holding means 11 is provided with the detector 39 such as the reflection type photo-interrupter or the limit switch, which acts as the recording material stop means for the sub-scanning direction, at a portion where the forward edge of the recording material 5 is positioned when the recording material 5 is at the predetermined position. The oblique conveying roller 46 conveys the recording material 5 in a resultant oblique direction formed by combining the direction of the one side edge of the holding surface 11a, where the guide plate 23 is provided, with the direction of the different edge of the holding surface 11a which is normal to said one side edge and near which the detector 39 is provided. For this purpose, the oblique conveying roller 46 extends obliquely with respect to the main scanning direction and the sub-scanning direction on the holding surface 11a. As shown in FIG. 30B, when the recording material 5 is fed inwardly of the guide plate 23 and the detector 39 by the feed rollers 17A and 17B, the oblique conveying roller 46 is rotated in the direction as indicated by the arrow G and conveys the recording material 5 in the direction as indicated by the arrow F2. The angle $\theta$ of the oblique conveying roller 46 with respect to the main scanning direction on the holding surface 11a is adjusted to such a value that the side edge of the recording material 5 contacts the guide plate 23 before the forward edge of the recording material 5 arrives at the detector 39. The recording material 5 is first made to contact the guide plate 23 by the oblique conveying roller 46, and positioning of the recording material 5 in the main scanning direction is thus conducted. Thereafter, as shown in FIG. 30C, the oblique conveying roller 46 continues to rotate, and the recording material 5 is thereby moved in the sub-scanning direction as indicated by the arrow F3 with the side edge contacting the guide plate 23 up to the predetermined position at which the forward edge of the recording material 5 arrives at the detector 39. The detector 39 detects the forward edge of the recording material 5 arriving at the predetermined, and generates a detection signal. The detection signal is sent to a drive member (not shown) for the oblique conveying roller 46 and stops the rotation of the oblique conveying roller 46. When the recording material 5 is placed at the predetermined position on the holding surface 11a, the oblique conveying roller 46 is retracted from the first position shown in FIG. 29C to the second position shown in FIG. 29D, and two-dimensional scanning with the laser beam 2 is conducted in this condition.

As shown in FIGS. 29E and 30D, when recording with the laser beam 2 is finished, the oblique conveying roller 46 is moved upwardly to the first position, rotates in the direction as indicated by the arrow G, and moves the recording material 5 towards the lower end of the recording material holding means 11 in the direction as indicated by the arrow F4 until the forward edge portion of the recording material 5 is grasped between the unloading rollers 22A and 22B. When the recording material 5 is unloaded from the apparatus by the unloading rollers 22A and 22B, the oblique conveying roller 46 is moved down to the second position for allowing the feeding of the next recording material 5. The position of the detector 39 is not limited to the aforesaid position, and the detector 39 may be provided at a portion in the recording material holding means 11 where the rear edge of the recording material 5 is positioned when the recording material 5 is at the predetermined position, and the guide plate 23 may be modified as shown in FIG. 20.

Figure 31:
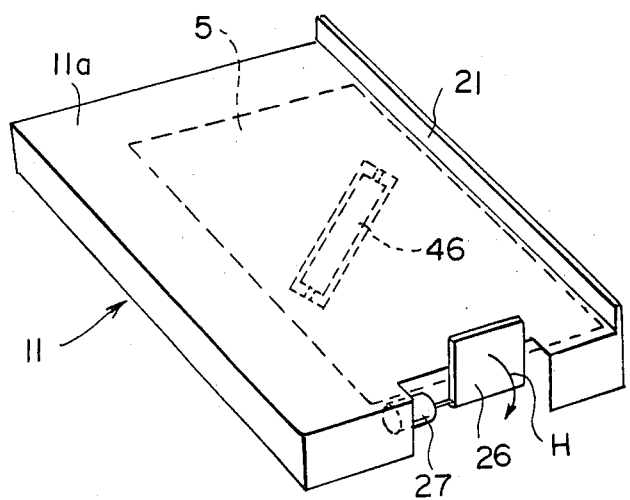
FIG. 31 is a perspective view showing an example of the scanning sheet stop means used in the embodiment of FIG. 28, FIGS. 32A to 32D are schematic views showing examples of the oblique conveying roller used in the embodiment of FIG. 28.

In the embodiment of FIG. 28, the detector 39 is used as the recording material stop means for controlling the positioning of the recording material 5 in the sub-scanning direction. However, as shown in FIG. 31, the recording material stop means may also be constituted by a recording material stop plate 26 extending normal to the guide plate 23 in the vicinity of the lower end of the recording material holding means 11 so that the recording material stop plate 26 contacts the recording material 5 and adjusts the position thereof. The recording material stop plate 26 is operated by a drive means 27 constituted by a rotary solenoid, a motor or the like. As long as the recording material 5 is fed by the feed means such as the feed rollers and positioned by the oblique conveying roller 46 as mentioned above, the stop plate 26 is projected above the holding surface 11a for contacting the forward edge of the recording material 5 and stopping it at the predetermined position in the sub-scanning direction. When positioning of the recording material 5 in the main scanning direction and in the sub-scanning direction is completed and recording with the laser beam 2 is finished, the stop plate 26 is rotated in the direction as indicated by the arrow H and retracted from the holding surface 11a for allowing the recording material 5 to be unloaded. In the case where the positioning of the recording material 5 in the sub-scanning direction is controlled by the stop plate 26, the oblique conveying roller 46 may be provided in such a direction that it makes the recording material 5 contact the stop plate 26 prior to the guide plate 23, thereby first conducting the positioning in the sub-scanning direction. Also, instead of using the unloading rollers 22A and 22B, the recording material 5 may be unloaded by rotating the oblique conveying roller 46 reversely to the direction as indicated by the arrow G, moving the recording material 5 towards the feed rollers 17A and 17B until it is grasped therebetween, and reversely rotating the feed rollers 17A and 17B. In this case, the stop plate 26 may be fixed at the position projecting above the holding surface 11a.

In the embodiment of FIG. 28, the guide plate 23 is used for positioning of the recording material 5 in the main scanning direction. However, in the case where positioning in the sub-scanning direction is conducted with the stop plate 26, positioning in the main scanning direction may be conducted by using a recording material stop means comprising a detector or the like positioned in the vicinity of the side edge of the holding surface 11a. When the detector is used as the recording material stop means for controlling the position of the recording material 5 in the main scanning direction, the oblique conveying roller 46 should be provided in such a direction that the forward edge of the recording material 5 is contacted with the stop plate 26 by the oblique conveying roller 46 before the detector detects the side edge of the recording material 5.

Figure 32A:
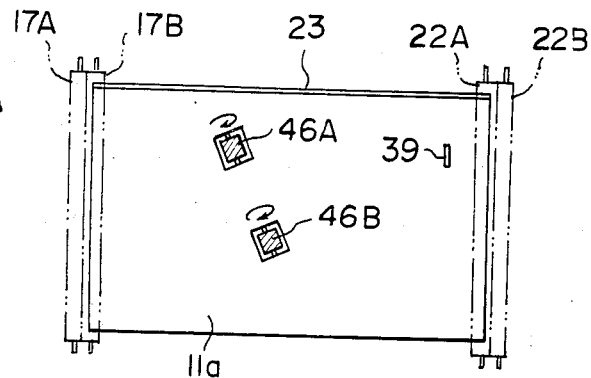
Figure 32B:
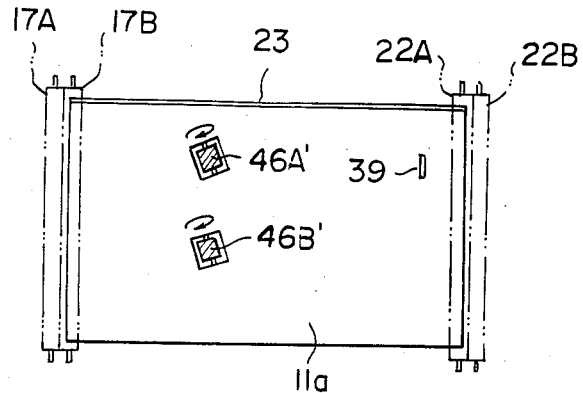
Figure 32C:
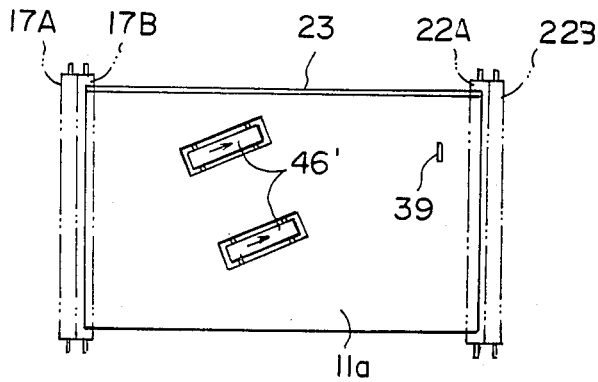
Figure 32D:
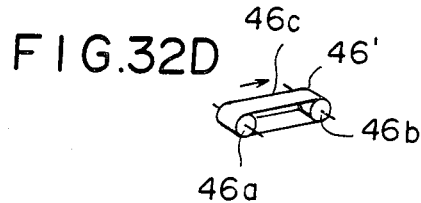

As shown in FIG. 32A, instead of providing a single long roller as the oblique conveying roller 46, it is also possible to provide relatively short oblique conveying rollers 46A and 46B in coaxial relation. Also, as shown in FIG. 32B, oblique conveying rollers 46A' and 46B' may be provided so that their rotation shafts are deviated in parallel with each other. The oblique conveying roller may not be a unit roller insofar as the same function as a roller is obtained. For example, two members respectively comprising rotatable rollers 46a and 46b and a belt 46c applied therearound as shown in FIG. 32D may be positioned as oblique conveying rollers 46', 46' as shown in FIG. 32C.

FIG. 33 shows a further embodiment wherein the recording material holding means 11 is provided with an adhesion means for adhering the recording material 5 to the holding surface 11a so that the recording material 5 is not readily deviated from the predetermined position on the holding surface 11a due to vibration and is maintained in the flat form on the holding surface 11a even though the recording material 5 is formed of a material which is readily bent or curled.

Figure 34:
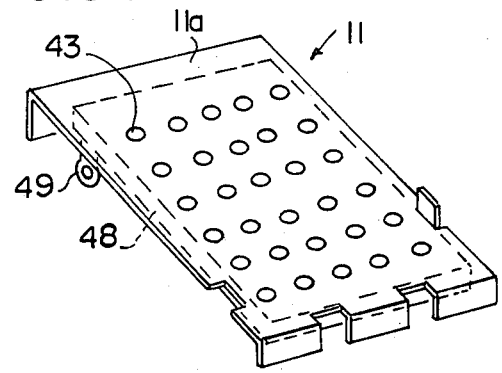
FIG. 34 is a perspective view showing an example of the scanning sheet holding means provided with an adhesion means in the embodiment of FIG. 33.
Figure 35:
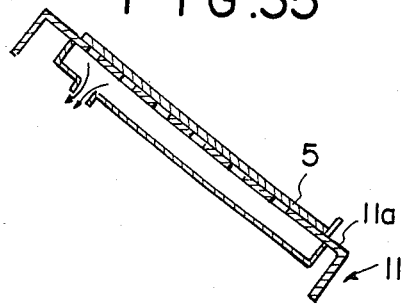
FIG. 35 is a sectional view showing the scanning sheet holding means of FIG. 34, FIGS. 36A, 36B and 36C are plan views showing the scanning sheet holding means provided with an adhesion groove in the embodiment of FIG. 33.

In this embodiment, as shown in FIG. 34, the holding surface 11a of the recording material holding means 11 is provided with a plurality of adhesion holes 43, 43, ... approximately over the entire area thereof, and a suction box 48 having the upper side open to the holding surface 11a and provided with a suction means 49 constituted by an air pump or the like is positioned under the holding surface 11a. As long as the recording material 5 is fed onto the holding surface 11a and the position thereof is adjusted as mentioned above, the suction means 49 is not operated and adhesion of the recording material 5 by the suction box 48 is not effected. As shown in FIG. 35, when the recording material 5 is placed at the predetermined position on the holding surface 11a, the suction means 49 is activated to adhere the recording material 5 onto the holding surface 11a via the suction holes 43, 43, ... by vacuum attraction. In this manner, the recording material 5 is maintained in the flat form at the predetermined position along the holding surface 11a by being adhered by the adhesion means comprising the suction box 48 and the adhesion holes 43, 43, ... Therefore, the laser beam 2 is converged accurately on the recording material 5, and it becomes possible to achieve scanning with the laser beam 2 accurately. Even though the recording material 5 is subjected to vibration during scanning with the laser beam 2, it is possible to maintain the recording material 5 consistently at the predetermined position.

Figure 36A:
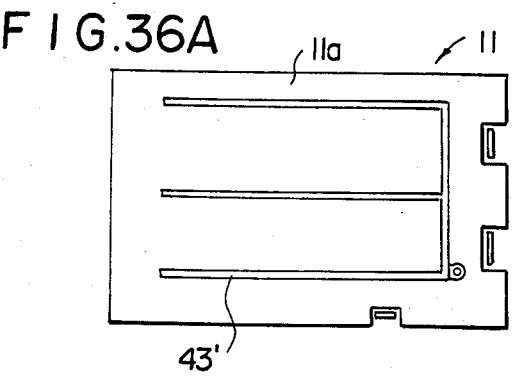
Figure 36B:
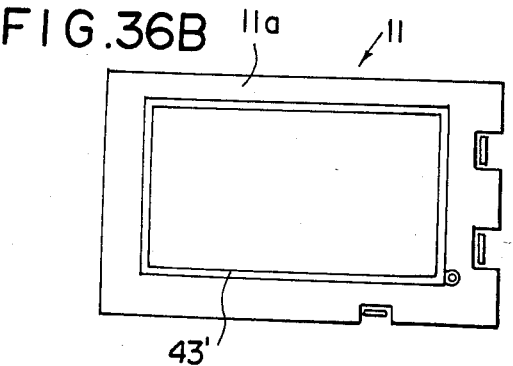
Figure 36C:
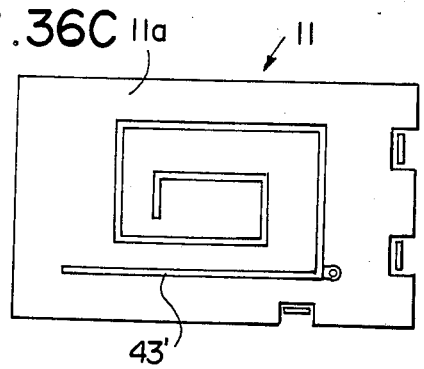

As shown in FIGS. 36A, 36B and 36C, in the case where adhesion accuracy for the recording material 5 may not be so much high for reason of the focal depth of the image forming lens 4 or the like, an adhesion groove 43' may be formed in the holding surface 11a for adhering the recording material 5. The adhesion groove 43' may be of any shape such as a circular shape or a spiral shape insofar as the entire area of the recording material 5 can be adhered efficiently. Instead of the suction means, it is also possible to use an electrostatic adhesion means or the like.

Figure 37:
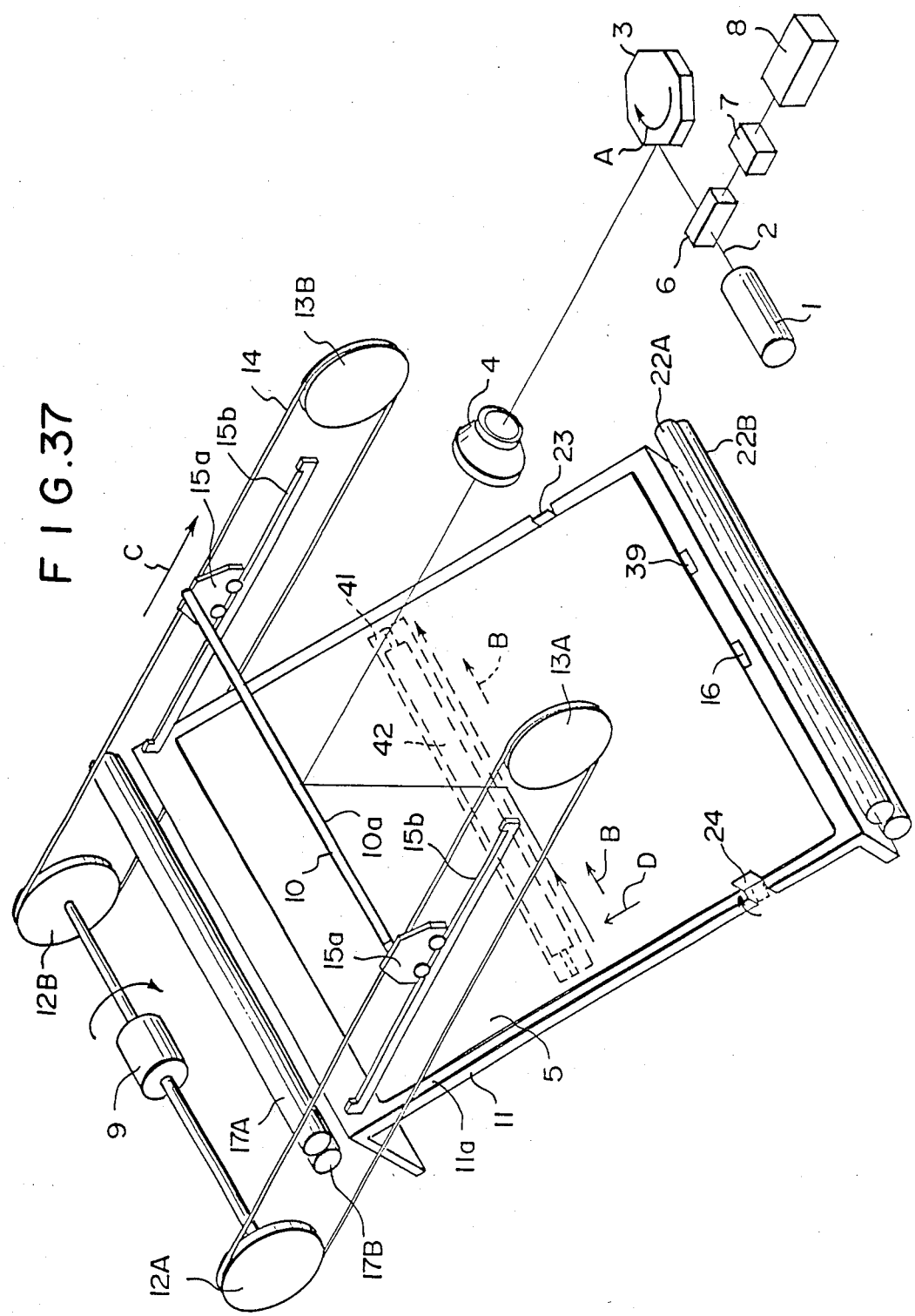
FIG. 37 is a schematic perspective view showing a still further embodiment of the light beam scanning apparatus in accordance with the present invention.

FIG. 37 shows a still further embodiment wherein a recording material positioning means for feeding the recording material 5 onto the holding surface 11a and reliably stopping it at the predetermined position on the recording material 5 and a photodetector for detecting the laser beam 2 coming to an edge of the recording material 5 placed at the predetermined position and generating a recording start signal are provided. The embodiment of FIG. 37 has a configuration similar to that shown in FIG. 13, except that the photodetector 16 is provided at the portion of the recording material holding means 11 where the lower edge of the recording material 5 is positioned when the recording material 5 is at the predetermined position.

In the embodiment of FIG. 37, the recording material positioning means is constituted by the feed rollers 17A and 17B, the recording material conveying roller 42, and the recording material detector 39 as described with reference to FIGS. 15A through 15E. However, stopping and positioing of the recording material 5 at the predetermined position may be conducted without using the recording material detector 39 as mentioned above. Also, the means for moving the recording material 5 is not limited to the recording material conveying roller 42, and may be any other means insofar as it can control the movement of the recording material 5 on the holding surface 11a and stopping thereof at the predetermined position.

Figure 38A:
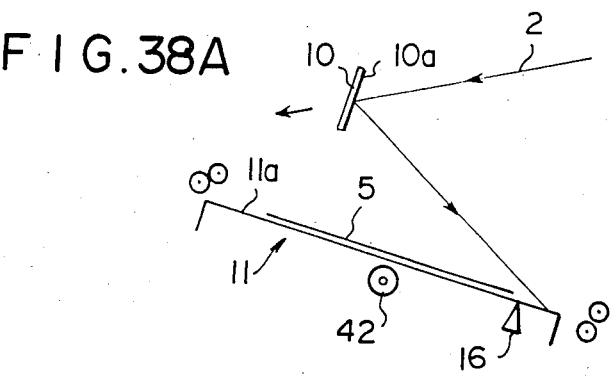
FIGS. 38A, 38B and 38C are explanatory views showing the function of the photodetector in the embodiment of FIG. 37.
Figure 38B:
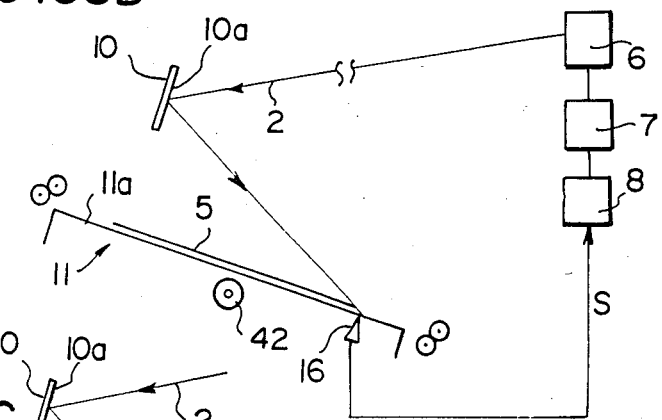
Figure 38C:
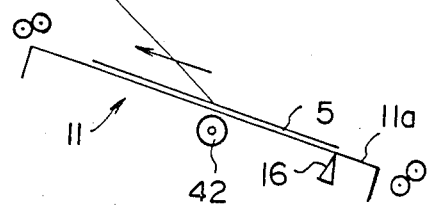
Figure 39:
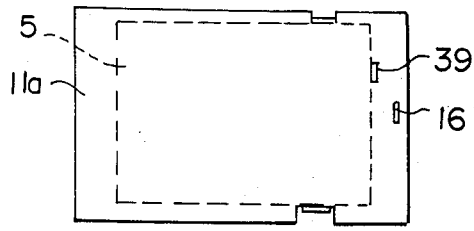
FIG. 39 is a plan view showing the position of the photodetector in a modified form of the embodiment of FIG. 37.

When the recording material 5 is stopped at the predetermined position on the holding surface 11a as described with reference to Figure and the recording material conveying roller 42 is retracted to its second position as shown in FIG. 15D, two-dimensional scanning with the laser beam 2 is started. As mentioned above, the scanning position of the laser beam 2 in the sub-scanning direction changes as the reflection surface 10a of the sub-scanning mirror 10 moves. In this embodiment, as shown in FIG. 38A, the initial position of the sub-scanning mirror 10 is adjusted so that the laser beam 2 starts scanning from outside of the edge, as viewed in the sub-scanning direction, of the recording material 5 placed at the predetermined position, i.e. the lower edge thereof. Before the laser beam 2 is modulated by the modulator 6, the laser beam 2 scans the holding surface 11a in the main scanning direction and is moved in the sub-scanning direction towards the recording material 5 as the sub-scanning mirror 10 moves. On the other hand, the photodetector 16 is provided at the portion of the recording material holding means 11 where the lower edge of the recording material 5 is positioned when the recording material 5 is at the predetermined position, i.e. at the portion approximately in line with the recording material detector 39 in the main scanning direction. As shown in FIG. 38B, the photodtector 16 detects the laser beam 2 moving in the sub-scanning direction and arrives at the photodetector 16 as the sub-scanning mirror 10 is moved, and generates a recording start signal S. The recording start signal S is sent to the image signal output circuit 8, which starts output of an image signal based on the recording start signal S. Thus, approximately simultaneously with the arrival of the laser beam 2 at the lower edge of the recording material 5, the laser beam 2 is modulated by the modulator 6 operated by the modulator drive circuit 7 based on the signal generated by the image signal output circuit 8. Therefore, substantial recording with the modulated laser beam 2 is started from the lower edge of the recording material 5. Thus, as shown in FIG. 38C, recording with the laser beam 2 is carried out over the whole surface of the recording material 5. With this embodiment provided with the recording material positioning means and the photodetector 16, it is possible to conduct recording efficiently from the edge of the recording material 5, and to record an image edge of a predetermined width at the end portion of the recording material 5 by setting a time difference between detection of the laser beam 2 by the photodetector 16 and operation of the image signal output circuit 8 and scanning the end portion of the recording material 5 with the unmodulated laser beam 2, followed by recording with the modulated laser beam 2. The position of the photodetector 16 is not limited to the portion of the recording material holding means 11 where the forward edge of the recording material 5 is positioned when the recording material 5 is at the predetermined position. For example, as shown in FIG. 39, the photodetector 16 may be provided at a position prior to the recording material detector 39 as viewed in the sub-scanning direction. Thus the photodetector 16 may be provided at any position insofar as it detects the laser beam 2 outside of said predetermined position and prior to the recording material 5 as viewed in the sub-scanning direction. In this case, the time between detection of the laser beam 2 by the photodetector 16 and impingement of the laser beam 2 upon the recoding material 5 may be counted in advance, and modulation of the laser beam 2 may be started when the counted time elapses after the photodetector 16 detects the laser beam 2.

In the embodiment of FIG. 37 provided with the photodetector 16, the control sequence for the start of substantial recording is not limited to the one mentioned above. For example, before the recording material 5 is fed onto the holding surface 11a, the laser beam 2 may be made to scan without modulation and detected by the photodetector 16. At this detecting position, a signal for stopping movement of the sub-scanning mirror 10 may be sent to a control means for the motor 9 for the sub-scanning mirror 10. Thus the position of the sub-scanning mirror 10 may be determined and emission of the laser beam 2 may be interrupted. Then, feeding and positioning of the recording material 5 may be conducted, and the laser beam source 1 and the image signal output circuit 8 may be simultaneously activated to scan the recording material 5 with the laser beam 2 modulated by the modulator 6. In any case, with this embodiment, since substantial recording is started accurately from a desired position such as the lower edge of the recording material 5, it is possible to efficiently obtain an image on the recording material 5 at a high positioning accuracy.

When recording with the laser beam 2 is thus finished, the recording material 5 is unloaded from the apparatus in the same manner as described with reference to FIG. 15E. In the case where the holding surface 11a of the type allowing the recording material 5 to fall by its weight therealong, the feeding, unloading and positioning of the recording material 5 may be carried out in the same manner as described with reference to FIG. 12B, 12D and 12E.

FIG. 40 shows another embodiment wherein the holding surface 11a is formed of a material exhibiting a reflectivity with respect to the laser beam 2 different from the reflectivity of the surface of the recording material 5, and a photodetector 16 is positioned above an edge, as viewed in the sub-scanning direction, of the recording material 5 on the holding surface 11a, i.e. the lower edge of the recording material 5, for detecting the laser beam 2 reflected by the holding surface 11a and controlling the start of recording with the laser beam 2. The embodiment of FIG. 40 is constituted in the same manner as the embodiment of FIG. 37, except for the material of the holding surface 11a and the position of the photodetector 16.

Figure 41A:
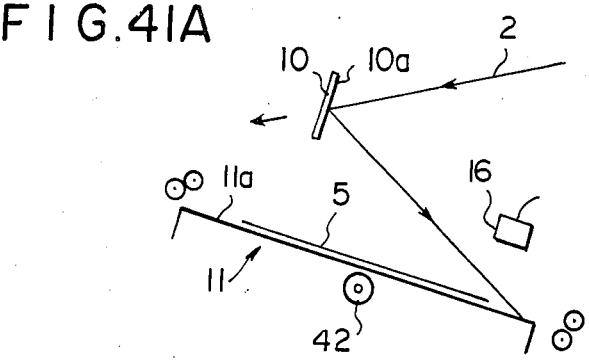
FIGS. 41A, 41B and 41C are explanatory views showing the function of the photodetector in the embodiment of FIG. 40.
Figure 41B:
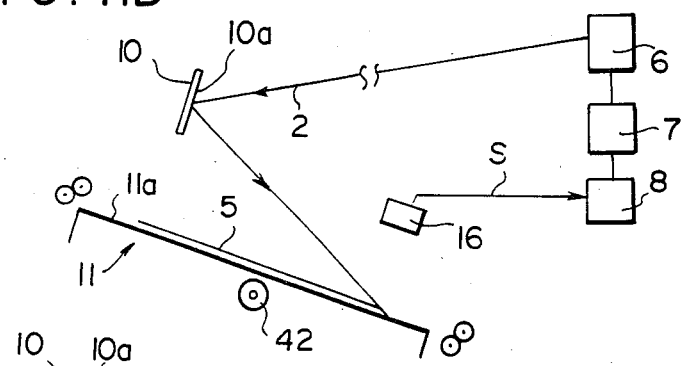
Figure 41C:
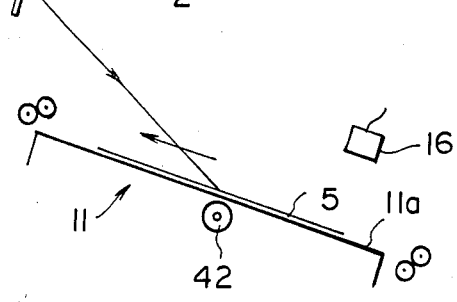

In the embodiment of FIG. 40, the photodetector 16 is provided above the lower edge of the recording material 5 on the holding surface 11a for detecting the laser beam 2 reflected by the holding surface 11a. As shown in FIG. 41A, as long as the laser beam 2 scans the holding surface 11a outside of the recording material 5 before arriving at the lower edge of the recording material 5, the laser beam 2 impinging upon the holding surface 11a and reflected thereby impinges upon the photodetector 16. As mentioned above, the surface of the recording material 5 and the holding surface 11a exhibit different reflectivities to the laser beam 2. As shown in FIG. 41B, when the laser beam 2 arrives at the lower edge of the recording material 5, the condition of the laser beam 2 reflected by the side of the holding surface 11a changes. The photodetector 16 detects the change in the reflection of the laser beam 2 and generates a detection signal S which is used for starting the recording as mentioned with reference to FIGS. 38B and 38C. The photodetector 16 may be provided at any position above the edge, as viewed in the sub-scanning direction, of the recording material 5 insofar as changes in reflection of the laser beam 2 arriving at the edge of the recording material 5 are detected by the photodetector 16. Also, the recording material 5 need not necessarily be accurately placed at the same position on the holding surface 11a. Thus the position of the recording material 5 held on the holding surface 11a may be different slightly within such a range that the photodetector 16 can detect changes in reflection of the laser beam 2 arriving at the edge of the recording material 5.

FIG. 42 shows a further embodiment wherein a reflection band extends in parallel with a side edge of the recording material 5 on the holding surface 11a, and a photodetector is positioned above the reflection band for controlling the start point of substantial recording for each scanning line in the main scanning direction.

Figure 43:
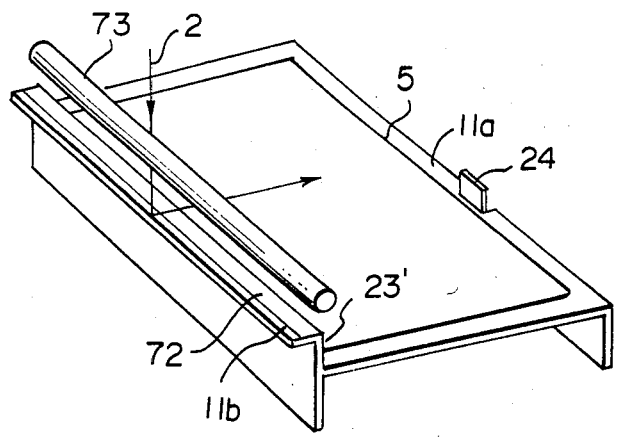
FIG. 43 is a perspective view showing a modified form of the scanning sheet holding means in the embodiment of FIG. 42.

Referring to FIG. 42, a reflection band 72 for reflecting the laser beam 2 is positioned on the holding surface 11a in parallel with a side edge 5b of the recording material 5 outside of the side edge 5b and within the scanning region of the laser beam 2. The reflection band 72 reflects the laser beam 2 each time the laser beam 2 scans along a main scanning line. On the other hand, a long photodetector 73 for detecting the laser beam 2 reflected by the reflection band 72 is positioned above the reflection band 72 therealong. The photodetector 73 detects the laser beam 2 reflected each time the laser beam 2 passes over the reflection band 72, and generates a signal for main scanning synchronization. The photodetector 73 need not necessarily be so much long insofar as it substantially detects the laser beam 2 reflected by the reflection band 72. For example, in the case where the recording material 5 is comparatively small and the reflected laser beam 2 can be detected substantially, a comparatively short photodetector may be provided at the center in the sub-scanning direction above the reflection band 72. Also, a plurality of photodetectors may be positioned along the reflection band 72. Further, as shown in FIG. 43, a long guide plate 23' extending in the sub-scanning direction may be provided for contacting the side edge of the recording material 5 and adjusting the position thereof in the main scanning direction, a supporting base 11b may be positioned normal to the guide plate 23' so as to extend from the upper end of the guide plate 23' toward outwardly of the recording material holding means 11, and the reflection band 72 may be formed on the supporting base 11b.

As mentioned above, the reflection band 72 is positioned in parallel with the side edge 5b of the recording material 5, and the distance between the reflection band 72 and the side edge 5b is constant. Therefore, the laser beam 2 arrives at the side edge 5b of the recording material 5 when a predetermined time elapses after the laser beam 2 passes over the reflection band 72 and the signal for main scanning synchronization is generated by the photodetector 73. Thus generation of the signal for main scanning synchronization corresponds to the timing of recording start for each scanning line of the laser beam 2. Accordingly, when the signal for main scanning synchronization is used, it is possible to easily control the start point of recording with the laser beam 2. The control of the recording start point will hereinbelow be described in detail with reference to FIGS. 44 and 45.

Figure 44:
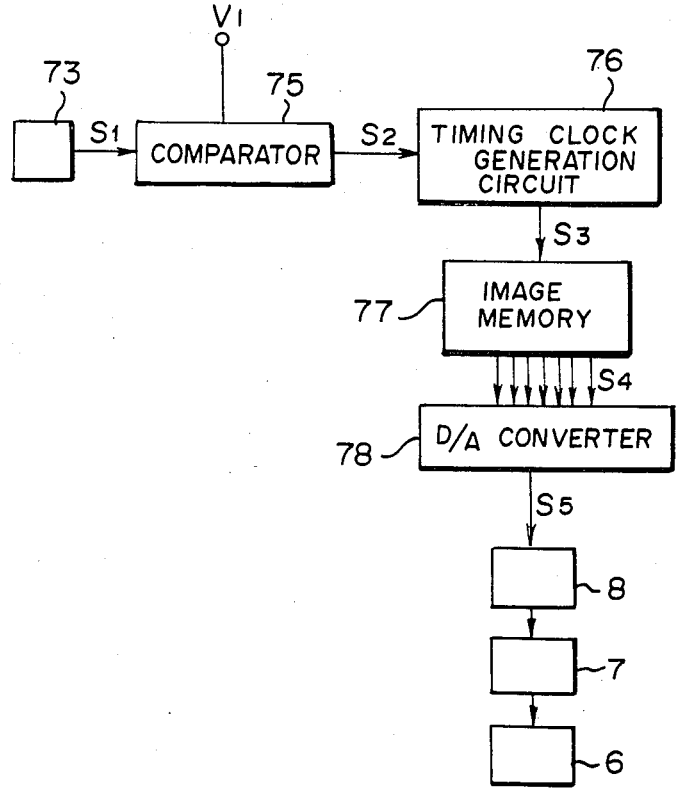
FIG. 44 is an explanatory block diagram showing the control of the start point of substantial scanning of the light beam in the main scanning direction.

As shown in FIG. 44, the signal S1 for main scanning synchronization generated by the photodetector 73 is sent to a comparator 75 which shapes the signal S1 based on a reference voltage V1 and generates a digital signal suitable for timing processing as a synchronizing signal S2. The synchronizing signal S2 is then sent to a timing clock generation circuit 76 which generates a picture element clock S3 necessary for image recording on the recording material 5 and sends the picture element clock S3 to an image memory 77. The image memory 77 stores in advance image information which should be recorded on the recording material 5 and which is received from an external unit (not shown), and generates a digital image signal S4 for each picture element in conformity with the generation timing of the picture element clock S3. The digital image signal S4 is converted by a D/A converter 78 into an analog image signal S5 which is sent to the image signal output circuit 8. The image signal output circuit 8 transmits the analog image signal S5 to the modulator 6 via the modulator drive circuit 7, and the modulator 6 modulates the laser beam 2 based on the image signal.

Figure 45:
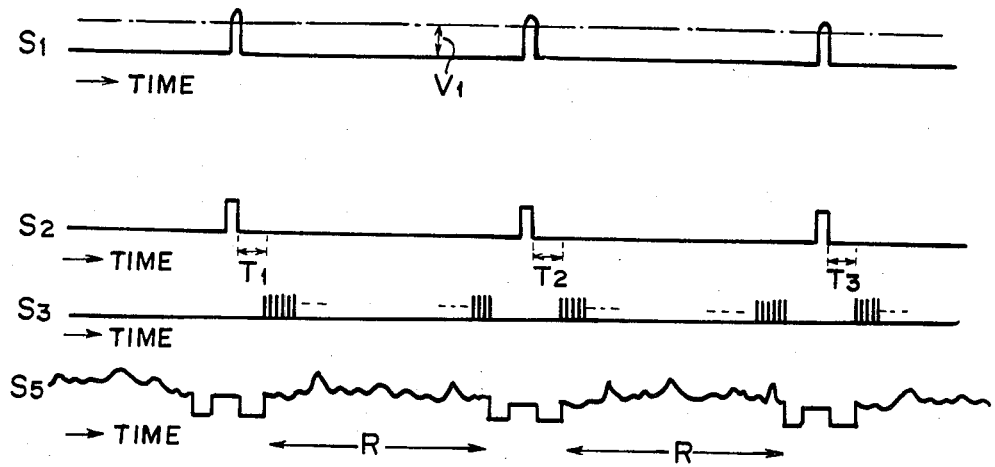
FIG. 45 is a timing chart showing the signal for main scanning synchronization, the synchronizing signal, the picture element clock, and the analog image signal.

Also, the reflection band 72 is spaced by a predetermined distance from the side edge 5b of the recording material 5, and a predetermined time, i.e. the time taken for the laser beam 2 to move from the reflection band 72 to the side edge tb of the recording material 5, should elapse between the generation of the signal S1 for main scanning synchronization and the start of generation of the picture element clock S3. This predetermined time may be determined in advance by measuring the laser beam scanning speed and the distance between the reflection band 72 and the side edge 5b. The timing clock generation circuit 76 is provided with a delay circuit for adjusting so that the first picture element clock is generated when the predetermined delay time elapses after the synchronizing signal S2 is received. Specifically, as shown in FIG. 45, the signal S1 for main scanning synchronization is shaped based on the reference voltage V1 into the synchronizing signal S2 which is sent to the timing clock generation circuit 76. The timing of generation of the first pulse of the picture element clock S3 generated by the timing clock generation circuit 76 based on the synchronizing signal S2 is delayed by T1 from the transmission of the synchronizing signal S2. In the case where the deflector for deflecting the laser beam 2 is the multi-face rotating mirror 3 as in this embodiment, delay times T1, T2, T3, ..., Tn should be determined respectively for "n" number of reflection surfaces of the multi-face rotating mirror 3, and the generation timing of the picture element clock S3 should be delayed by the respective delay times. Thus it becomes possible to record an image accurately without jitter.

Based on the timing of the picture element clock S3 generated as mentioned above, the analog image signal S5 as shown in FIG. 45 is obtained from the D/A converter 78. In FIG. 45, the range indicated by the arrow R is the image region recorded while the laser beam 2 scans along one main scanning line. As shown, when the laser beam 2 passes over the reflection band 72, a signal of a predetermined level is sent to the modulator for turn it on and making the laser beam 2 impinge upon the reflection band 72.

With the embodiment of FIG. 42, since the reflected laser beam is generated periodically in conformity with the main scanning by use of the reflection band 72 and detected by the photodetector 73 for generating the signal for main scanning synchronization, it is possible to control the timing of modulation of the laser beam for each scanning line and to control the start point of the main scanning. Also, since the means for carrying out the start point control is compact and cheap, it is possible to prevent the apparatus from becoming large and expensive, and to efficiently control the start point of recording with the laser beam.

Figure 46:
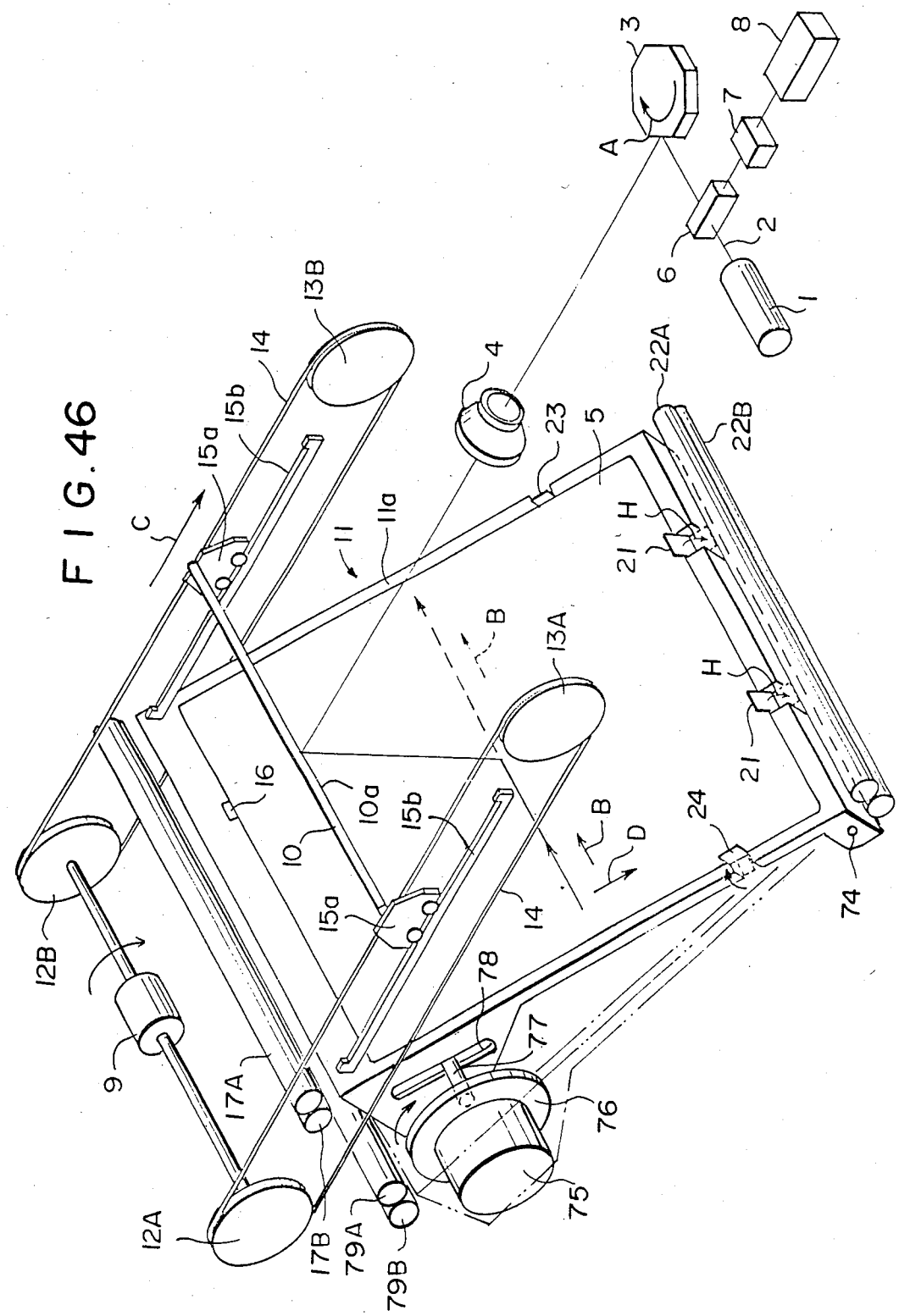
FIG. 46 is a schematic perspective view showing an even further embodiment of the light beam scanning apparatus in accordance with the present invention.

FIG. 46 shows an even further embodiment wherein a supporting shaft 74 extends in the sub-scanning direction at the lower end portion of the recording material holding means 11, and the recording material holding means 11 is rotatable around the supporting shaft 74 to a first position as indicated by the solid line in FIG. 46 where scanning with the laser beam 2 is conducted, and a second position as indicated by the chain line, whereby the position of the recording material holding means 11 is changed in accordance with the size of the recording material 5 fed to the recording material holding means 11. Rotation of the recording material holding means 11 and feeding of recording materials of different sizes will hereinbelow be described with reference to FIGS. 46 and 47B through 47G.

Referring to FIG. 46, an engagement groove 78 is formed at the upper portion of the side face of the recording material holding means 11, and engaged with an eccentric pin 77 secured perpendicuarly to a circular supporting plate 76 which is rotated by a motor 75 in the direction as indicated by the arrow. As the supporting plate 76 is rotated, the eccentric pin 77 moves inside of the engagement groove 78, and the recording material holding means 11 is moved from the first position to the second position.

The feed rollers 17A and 17B are provided in the vicinity of the upper end of the recording material holding means 11 placed at the first position, and feed rollers 79A and 79B are provided in the vicinity of the upper end of the recording material holding means 11 placed at the second position. As shown in FIG. 47, the magazine 18 housing recording materials 5' of a small size is provided in the vicinity of the feed rollers 17A and 17B, and a magazine 86 housing recording materials 5" of a large size is provided in the vicinity of the feed rollers 79A and 79B. In the case where the small recording material 5' should be fed onto the recording material holding means 11, the recording material holding means 11 is placed at the first position as shown in FIG. 47A, and the recording material 5' is taken up by the adhesion means 20 and fed by the feed rollers 17A and 17B onto the holding surface 11a. As shown in FIGS. 47B and 47C, two-dimensional scanning with the laser beam 2 and unloading of the recording material 5' are conducted in the same manner as described with reference to FIGS. 12C, 12D and 12E.

Figure 47D:
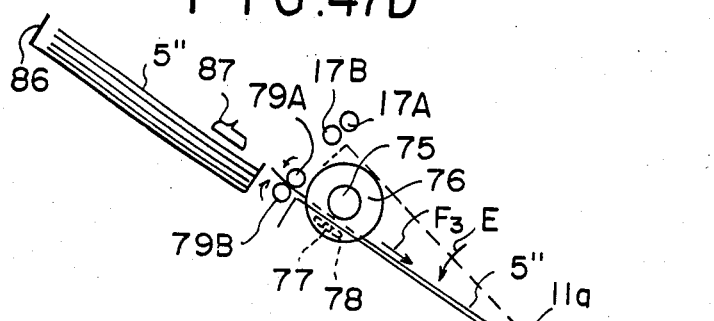
Figure 47E:
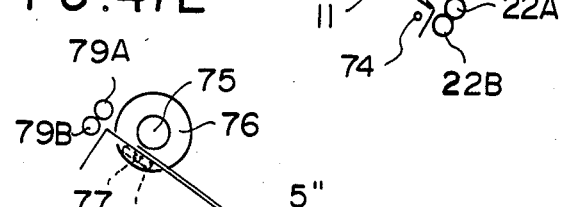
Figure 47F:
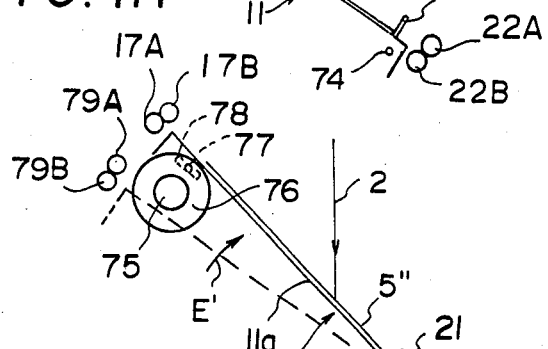
Figure 47G:
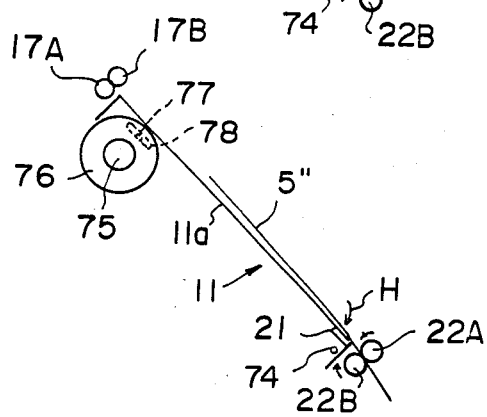

As shown in FIG. 47D, when recording on the large recording material 5" is conducted after the recording on the small recording material 5' is finished as mentioned above, the recording material holding means 11 is rotated in the direction as indicated by the arrow E to the second position by the eccentric pin 77 deflected by operation of the motor 75. When the recording material holding means 11 is placed at the second position, the large recording material 5" is taken up by an adhesion means 87 and moved until it is grasped between the feed rollers 79A and 79B. The feed rollers 79A and 79B feed the recording material 5" up to a point prior to the predetermined position on the holding surface 11a. As shown in FIG. 47E, when the rear edge of the recording material 5" leaves the feed rollers 79A and 79B, it falls by its weight and is stopped at the predetermined position by the recording material stop plates 21, 21. As shown in FIG. 47F, after the positioning of the recording material 5" is thus conducted, the recording material holding means 11 is rotated in the direction as indicated by the arrow E' and returned to the first position. At the first position, the recording material 5" is scanned by the laser beam 2. In the case where the direction of the sub-scanning mirror 10 is changeable so that the laser beam 2 is converged on the recording material 5" held on the recording material holding means 11 placed at the second position, recording may be conducted with the recording material holding means 11 placed at the second position.

With the embodiment of FIG. 46, since the recording material holding means 11 is moveable around the supporting shaft 74 so that its upper end moves, it is possible to efficiently feed the recording material onto the recording material holding means 11 in accordance with the size of the recording material. In this embodiment, the first position of the recording material holding means 11 where the small recording material 5' is fed thereonto coincides with the position where scannig with the laser beam 2 is conducted. However, it is also possible to adjust the feeding positions for the small recording material 5' and the large recording material 5" at positions different from the scanning position with the laser beam 2, and to move the recording material holding means 11 to the scanning position after feeding of the recording materials 5' and 5". Though the rotation means for rotating the recording material holding means 11 in this embodiment is constituted by the motor 75, the supporting plate 76, the eccentric pin 77 and the engagement groove 78, it may be constituted by any other members. Also, the number of positions which the recording material holding means 11 can take may be selected arbitrarily in accordance with the number of sizes of the recording materials.

Figure 48:
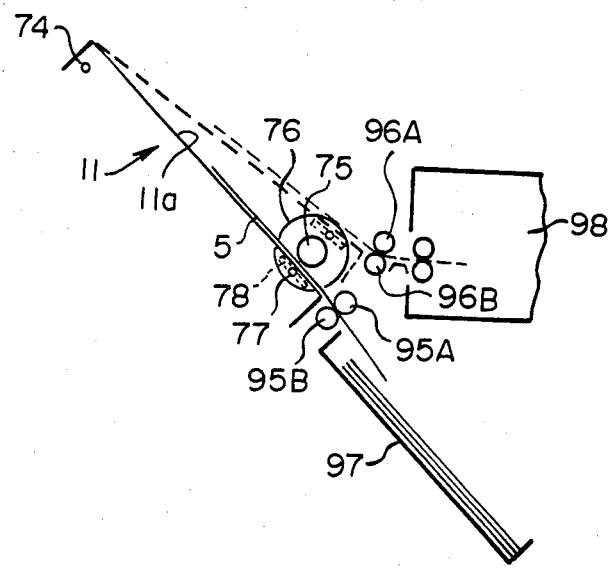

As mentioned above, when the recording material holding means 11 is fabricated rotatably, it becomes possible to efficiently feed the recording material 5. On the other hand, it becomes possible to efficiently conduct unloading of the recording material 5 in accordance with processing of the recording material 5 after unloading when, as shown in FIG. 48, the suporting shaft 74 is provided at the upper end portion of the recording material holding means 11, and the recording material holding means 11 is rotated around the supporting shaft so that the lower end of the recording material holding means 11 moves. Specifically, the recording material holding means 11 is rotated between a first position at which the lower end thereof communicates with a pair or rollers 95A and 95B for feeding the recording material 5 carrying an image recorded thereon to a receiving magazine 97, and a second position at which the lower end communicates with rollers 96A and 96B for feeding the recording material 5 to an automatic developing machine 98. Thus it becomes possible to efficiently unload the recording material 5 from the recording material holding means 11 in accordance with the processing after the recording is finished, for example, to preferentially send a particular recording material to the developing process.

Figure 49:
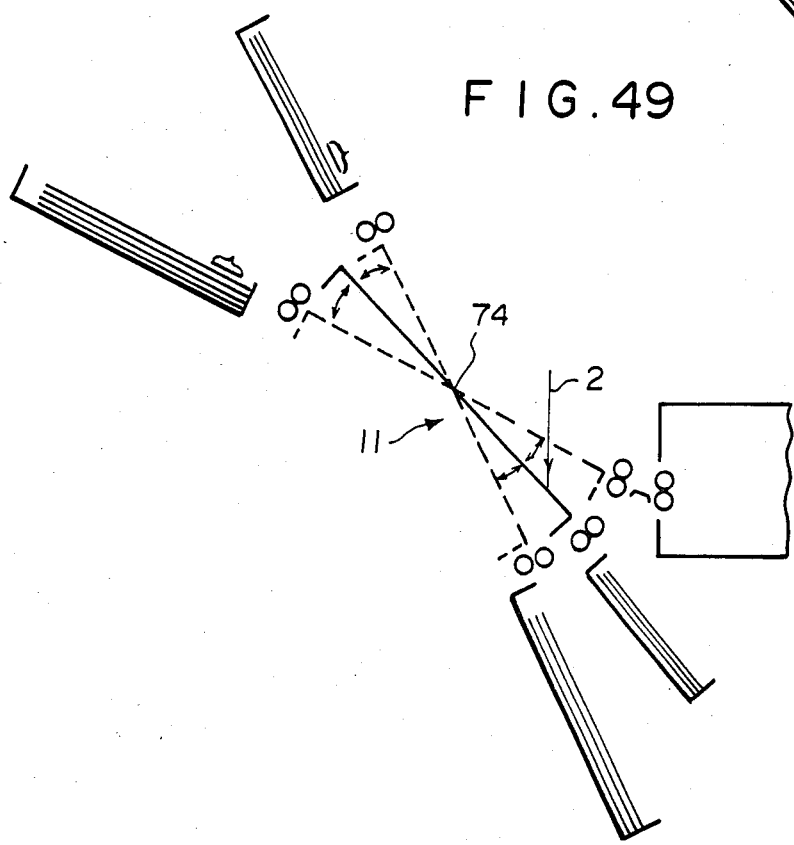
Figure 50:
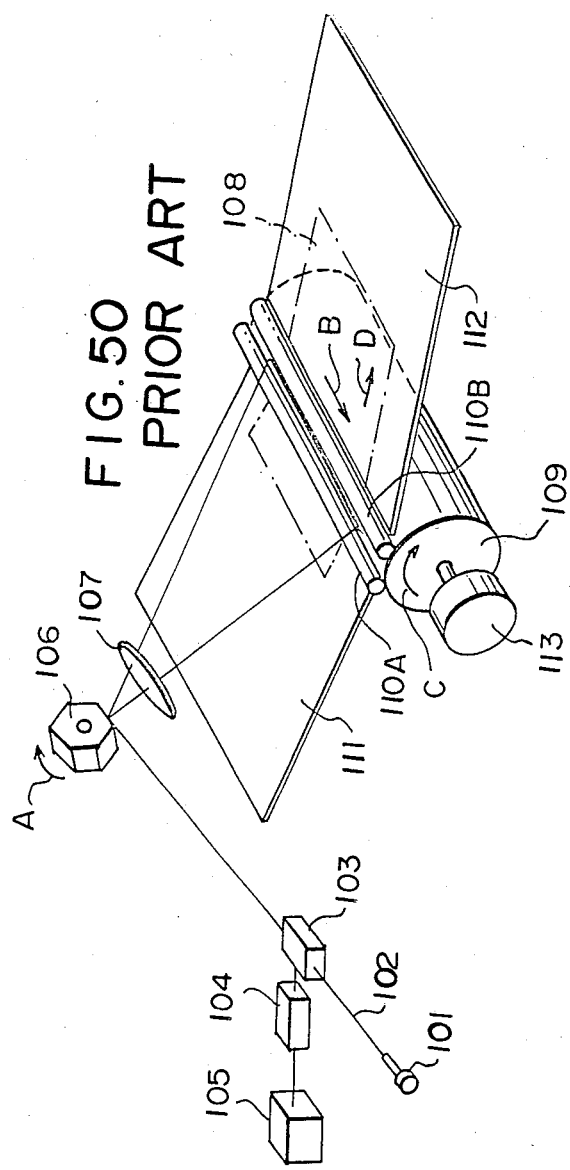
FIG. 50 is a schematic perspective view showing the conventional light beam recording apparatus.
Figure 51:
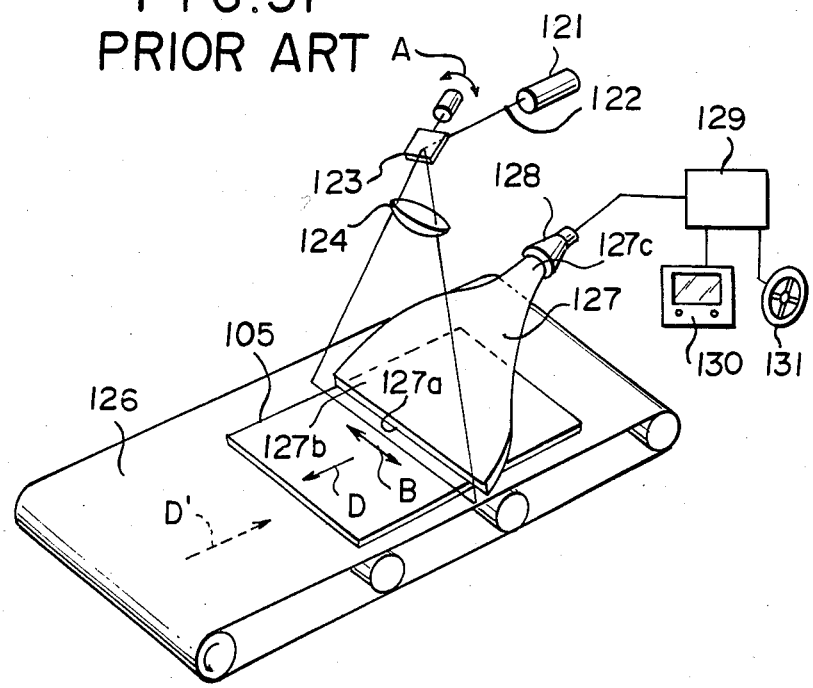
FIG. 51 is a perspective view showing an example of the conventional light beam read-out apparatus.
Figure 52:
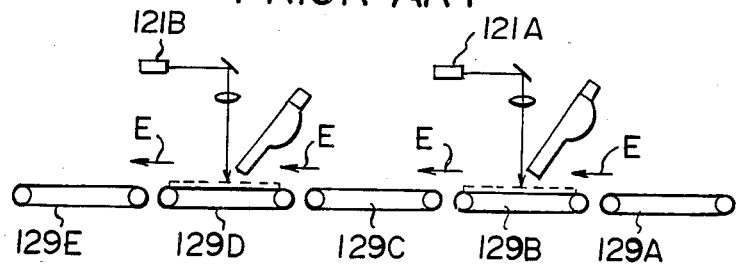
FIG. 52 is a side view showing another example of the conventional light beam read-out apparatus.

Further, as shown in FIG. 49, the supporting shaft 74 may be provided at the center of the recording material holding means 11 so that both the upper end and the lower end of the recording material holding means 11 are moveable. In this case, the position of the recording material holding means 11 as indicated by the solid line is taken as a standard position where recording with the laser beam 2 is conducted, and the position for feeding the recording material and the position for unloading it are selected in accordance with the size of the recording material, the processing of the recording material after unloading, or the like. The position of the supporting shaft 74 may be set to any other position suitable for control of rotation of the recording material holding means 11 insofar as the position is on a straight line approximately parallel to the main scanning line in the vicinity of the holding surface 11a.

In FIGS. 11 to 49, the embodiments of the light beam scanning apparatus in accordance with the present invention are described by taking the recording apparatus as an example. However, the light beam scanning apparatus in accordance with the present invention is also applicable to various light beam read-out apparatuses such as a radiation image read-out apparatus used in a radiation image recording and reproducing system wherein a stimulable phosphor sheet is used as disclosed in U.S. Pat. Nos. 4,258,264 and 4,346,295, and Japanese Unexamined Patent Publication No. 56(1981)-11395. The same effects are obtained also with the light beam readout apparatuses. In this case, a read-out means comprising a photodetector for detecting light reflected by the scanning sheet, light transmitting through the scanning sheet or light emitted by the scanning sheet may be moved on the scanning sheet to face the scanning line in synchronization with the movement of the sub-scanning mirror. Also, in the cases of the embodiments shown in FIGS. 37 and 40, the signal generated by the photodetector 16 is used as a read-out start signal, and the read-out start signal is sent to a photodetector such as a photomultiplier constituting a part of the read-out means for activating the photodetector, thereby controlling the start of the image read-out. It is also possible to activate the photodetector of the read-out means simultaneously with the start of scanning without providing the photodetector 16, and detect the sheet edge by said photodetector, thereby starting the substantial read-out. Further, in the case of the embodiment shown in FIG. 42, the signal for main scanning synchronization generated by the photodetector 73 for detecting the laser beam reflected by the reflection band 72 is used as a signal for controlling the start point of substantial read-out scanning in the main scanning direction, and is sent to the read-out means for controlling it so that read-out is started simultaneously with the arrival of the laser beam at the predetermined read-out start position.

I claim:

1. A light beam recording apparatus in which a light beam emitted by a light beam source and modulated on the basis of image information is scanned in a main scanning direction on a recording material, and moved with respect to the recording material in a sub-scanning direction approximately normal to the main scanning direction, whereby the light beam is two-dimensionally scanned on the recording material and an image represented by said image information is recorded, the light beam recording apparatus comprising:
(i) a main scanning light deflector positioned in an optical path of said light beam, which is emitted by said light beam source, for deflecting said light beam,
(ii) an image forming lens positioned in an optical path of said light beam, which has been deflected by said main scanning light deflector, for forming an image of said light beam on a predetermined straight line,
(iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens, and
(iv) a recording material holding means for holding said recording material on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror.

2. An apparatus as defined in claim 1 wherein said recording material holding means is positioned below said subscanning mirror.

3. An apparatus as defined in claim 1 further comprising a means for moving said sub-scanning mirror along a guide means.

4. An apparatus as defined in claim 3 wherein said moving means comprises mirror supporting members respectively secured to ends of said sub-scanning mirror, guide rails for guiding said mirror supporting members, wires respectively connected to said mirror supporting members and applied around pulleys, and a motor for rotating said pulleys.

5. A light beam read-out apparatus in which a light beam emitted by a light beam source is scanned in a main scanning direction on a sheet carrying an image recorded thereon, and is moved with respect to the sheet in a subscanning direction approximately normal to the main scanning direction, whereby the light beam is two-dimensionally scanned on the sheet, light representing the image is generated, and the image is read out by detecting the light, the light beam read-out apparatus comprising:
(i) a main scanning light deflector positioned in an optical path of said light beam, which is emitted by said light beam source, for deflecting said light beam,
(ii) an image forming lens positioned in an optical path of said light beam, which has been deflected by said main scanning light deflector, for forming an image of said light beam on a predetermined straight line,
(iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens,
(iv) a sheet holding means for holding said sheet on a plane formed by a locus of a straight line moving as said sub scanning mirror is moved in said optical axis direction of said image forming lens and lying at a position conjugate with said predetermined straight line, on which the image of said light beam is formed by said image forming lens, with respect to said sub-scanning mirror, and
(v) a light detection means provided with a light receiving face extending along a main scanning line on said sheet, and positioned close to said sheet for movement in said sub-scanning direction as said main scanning line is moved accompanying the movement of said sub-scanning mirror.

6. An apparatus as defined in claim 5 wherein said light detection means is a long photomultiplier provided with a light receiving face extending along a main scanning line on said sheet, and positioned close to said sheet.

7. An apparatus as defined in claim 5 wherein said sheet is a stimulable phosphor sheet carrying a radiation image stored thereon, said light beam is stimulating rays which cause said stimulable phosphor sheet to emit light in proportion to the stored radiation energy, and said light detection means detects said light emitted by said stimulable phosphor sheet.

8. A light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:

(i) a main scanning light deflector positioned in an optical path of said light beam, which is emitted by said light beam source, for deflecting said light beam, (ii) an image forming lens positioned in an optical path of said light beam, which has been deflected by said main scanning light deflector, for forming an image of said light beam on a predetermined straight line, (iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens, (iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror, a scanning sheet holding surface of said scanning sheet holding means allowing said scanning sheet to fall by its weight, said scanning sheet holding means being provided, in the vicinity of a lower end portion thereof, with a sheet stop plate moveable between a first position at which one end portion of said sheet stop plate projects out of said scanning sheet holding surface and contacts said scanning sheet, thereby to stop said scanning sheet at a predetermined position on said scanning sheet holding surface, and a second position at which said one end portion of said sheet stop plate is retracted from said scanning sheet holding surface, (v) a feed means positioned in the vicinity of an upper end of said scanning sheet holding means for conveying said scanning sheet onto said scanning sheet holding surface, and (vi) an unloading means positioned in the vicinity of a lower end of said scanning sheet holding means for grasping said scanning sheet, which falls by its weight from said predetermined position, and conveying said scanning sheet out of said scanning sheet holding means.

9. An apparatus as defined in claim 8 wherein said feed means and said unloading means are respectively constituted by a pair of rollers.

10. A light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:
(i) a main scanning light deflector positioned in an optical path of said light beam, which is emitted by said light beam source, for deflecting said light beam, (ii) an image forming lens positioned in an optical path of said light beam, which has been deflected by said main scanning light deflector, for forming an image of said light beam on a predetermined straight line, (iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens, (iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror, (v) a feed means positioned in the vicinity of an upper end of said scanning sheet holding means for feeding said scanning sheet up to a position prior to a predetermined position on said scanning sheet holding means, and (vi) a scanning sheet conveying roller extending in said main scanning direction under a scanning sheet holding surface of said scanning sheet holding means for movement between a first position at which an upper end of said scanning sheet conveying roller appears on said scanning sheet holding surface and a second position at which said upper end of said scanning sheet conveying roller is retracted from said scanning sheet holding surface so that, when said scanning sheet conveying roller is at said first position, it conveys the fed scanning sheet towards said predetermined position.

11. An apparatus as defined in claim 10 wherein said feed means comprises a pair of rollers.

12. A light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:
(i) a main scanning light deflector positioned in an optical path of said light beam, which is emitted by said light beam source, for deflecting said light beam, (ii) an image forming lens positioned in an optical path of said light beam, which has been deflected by said main scanning light deflector, for forming an image of said light beam on a predetermined straight line, (iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens, (iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror, (v) a guide plate projecting upwardly at one side end of said scanning sheet holding means, and (vi) a shifting plate positioned in the vicinity of the other side end of said scanning sheet holding means for movement between a first position at which said shifting plate pushes a side edge of said scanning sheet on said scanning sheet holding means and makes said scanning sheet contact said guide plate and a second position at which said shifting plate is retracted from the side edge of said scanning sheet.

13. An apparatus as defined in claim 12 wherein said guide plate comprises a plurality of plate-like members positioned in spaced relation to each other.

14. An apparatus as defined in claim 12 wherein said shifting plate is rotatable between said first position and said second position.

15. An apparatus as defined in claim 12 wherein said shifting plate is moveable linearly between said first position and said second position.

16. A light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:
(i) a main scanning light deflector positioned in an optical path of said light beam, which is emitted by said light beam source, for deflecting said light beam,
(ii) an image forming lens positioned in an optical path of said light beam, which has been deflected by said main scanning light deflector, for forming an image of said light beam on a predetermined straight line,
(iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens,
(iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror,
(v) a guide plate projecting upwardly at one side end of said scanning sheet holding means, and
(vi) a shifting roller positioned under a scanning sheet holding surface of said scanning sheet holding means for movement between a first position at which an upper end of said shifting roller appears on said scanning sheet holding surface and a second position at which said upper end of said shifting roller is retracted from said scanning sheet holding surface so that, when said shifting roller is at said first position, it shifts said scanning sheet on said scanning sheet holding surface towards said one side end of said scanning sheet holding means and makes said scanning sheet contact said guide plate.

17. An apparatus as defined in claim 16 wherein said guide plate comprises a plurality of plate-like members positioned in spaced relation to each other.

18. An apparatus as defined in claim 16 wherein two or more shifting rollers are provided.

19. A light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:
(i) a main scanning light deflector positioned in an optical path of said light beam, which is emitted by said light beam source, for deflecting said light beam,
(ii) an image forming lens positioned in an optical path of said light beam, which has been deflected by said main scanning light deflector, for forming an image of said light beam on a predetermined straight line,
(iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens,
(iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror,
(v) a scanning sheet stop means for said main scanning direction positioned in the vicinity of one side edge of a scanning sheet holding surface of said scanning sheet holding means,
(vi) a scanning sheet stop means for said sub-scanning direction positioned in the vicinity of a different edge of said scanning sheet holding surface in a direction normal to said one side edge of said scanning sheet holding surface,
(vii) a feed means for feeding said scanning sheet onto said scanning sheet holding surface inwardly of said scanning sheet stop means for said main scanning direction and said scanning sheet stop means for said sub-scanning direction, and
viii) an oblique conveying roller positioned under said scanning sheet holding surface for movement between a first position at which an upper end of said oblique conveying roller appears on said scanning sheet holding surface and a second position at which said upper end of said oblique conveying roller is retracted from said scanning sheet holding surface so that, when said oblique conveying roller is at said first position, it conveys said scanning sheet in a resultant oblique direction obtained by combining the direction of said one side edge of said scanning sheet holding surface with the direction of said different edge thereof.

20. An apparatus as defined in claim 19 wherein said scanning sheet stop means for said main scanning direction comprises a guide plate or guide plates positioned in spaced relation to each other.

21. An apparatus as defined in claim 19 wherein said scanning sheet stop means for said sub-scanning direction comprises a detector for detecting a forward edge of said scanning sheet.

22. An apparatus as defined in claim 19 wherein said scanning sheet stop means for said sub-scanning direction comprises a stop plate for contacting said scanning sheet.

23. An apparatus as defined in claim 19 wherein said feed means comprises a pair of rollers.

24. An apparatus as defined in claim 19 wherein two or more oblique conveying rollers are provided.

25. A light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:
(i) a main scanning light deflector positioned in an optical path of said light beam, which is emitted by said light beam source, for deflecting said light beam,
(ii) an image forming lens positioned in an optical path of said light beam, which has been deflected by said main scanning light deflector, for forming an image of said light beam on a predetermined straight line,
(iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens, and
(iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror, wherein said scanning sheet holding means is provided with an adhesion means for adhering said scanning sheet to a scanning sheet holding surface of said scanning sheet holding means.

26. An apparatus as defined in claim 25 wherein said adhesion means comprises a plurality of adhesion holes or at least one adhesion groove formed in said scanning sheet holding surface of said scanning sheet holding means, and a suction box positioned under said scanning sheet holding surface in open relation thereto for adhering said scanning sheet by vacuum attraction via said adhesion holes or said adhesion groove.

27. A light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:
(i) a main scanning light deflector positioned in an optical path of said light beam, which is emitted by said light beam source, for deflecting said light beam,
(ii) an image forming lens positioned in an optical path of said light beam, which has been deflected by said main scanning light deflector, for forming an image of said light beam on a predetermined straight line,
(iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens,
(iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror,
(v) a scanning sheet positioning means for feeding said scanning sheet onto a scanning sheet holding surface of said scanning sheet holding means and stopping said scanning sheet at a predetermined position on said scanning sheet holding surface, and
(vi) a photodetector positioned in the vicinity of an edge, as viewed in said sub-scanning direction, of said scanning sheet stopped at said predetermined position on said scanning sheet holding surface for detecting said light beam prior to said scanning sheet, as viewed in said sub-scanning direction, and generating a read-out or recording start signal.

28. An apparatus as defined in claim 27 wherein said scanning sheet positioning means comprises a pair of feed rollers, a means for moving said scanning sheet to said predetermined position, and a detector for detecting said edge, as viewed in said sub-scanning direction, of said scanning sheet stopped at said predetermined position.

29. An apparatus as defined in claim 27 wherein said scanning sheet positioning means comprises a pair of feed rollers, and a scanning sheet stop plate for contacting said scanning sheet and stopping it.

30. A light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:
(i) a main scanning light deflector positioned in an optical path of said light beam, which is emitted by said light beam source, for deflecting said light beam,
(ii) an image forming lens positioned in an optical path of said light beam, which has been deflected by said main scanning light deflector, for forming an image of said light beam on a predetermined straight line,
(iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens,
(iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror,
a scanning sheet holding surface of said scanning sheet holding means being formed of a material exhibiting a reflectivity with respect to said light beam different from the reflectivity of the surface of said scanning sheet, and
(v) a photodetector positioned above an edge, as viewed in said sub-scanning direction, of said scanning sheet held on said scanning sheet holding surface for detecting light reflected by said scanning sheet holding surface.

31. A light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:
(i) a main scanning light deflector positioned in an optical path of said light beam, which is emitted by said light beam source, for deflecting said light beam,
(ii) an image forming lens positioned in an optical path of said light beam, which has been deflected by said main scanning light deflector, for forming an image of said light beam on a predetermined straight line,
(iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens,
(iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror,
(v) a reflection band for reflecting said light beam, said reflection band extending in parallel with a side edge of said scanning sheet, which is held by said scanning sheet holding means, outside of said side edge and within a scanning region of said light beam on said scanning sheet holding means, and
(vi) a photodetector positioned above said reflection band for detecting light reflected by said reflection band and generating a signal for main scanning synchronization.

32. An apparatus as defined in claim 31 wherein a guide plate for contacting said side edge of said scanning sheet is provided at a side edge portion of said scanning sheet holding means, a supporting base is extended normal to said guide plate from an upper end of said guide plate toward outwardly of said scanning sheet holding means, and said reflection band is formed on said supporting base.

33. A light beam scanning apparatus in which a light beam emitted by a light beam source is scanned in a main scanning direction on a scanning sheet, and moved with respect to the scanning sheet in a sub-scanning direction approximately normal to the main scanning direction, whereby the light beam is two-dimensionally scanned on the scanning sheet, the light beam scanning apparatus comprising:
(i) a main scanning light deflector positioned in an optical path of said light beam, which is emitted by said light beam source, for deflecting said light beam,
(ii) an image forming lens positioned in an optical path of said light beam, which has been deflected by said main scanning light deflector, for forming an image of said light beam on a predetermined straight line,
(iii) a long sub-scanning mirror positioned in an optical path of said light beam, which has passed through said image forming lens, for movement in the optical axis direction of said image forming lens, said sub-scanning mirror extending in said main scanning direction and inclining with respect to said optical path of said light beam which has passed through said image forming lens,
(iv) a scanning sheet holding means for holding said scanning sheet on a plane formed by a locus of a straight line moving as said sub-scanning mirror is moved in said optical axis direction of said image forming lens and lying at a position conjugate with said predetermined straight line, on which the image of said light beam is formed by said image forming lens, with respect to said sub-scanning mirror, and
(v) a rotation means for rotating said scanning sheet holding means around a straight line approximately parallel with a main scanning line in the vicinity of a scanning sheet holding surface of said scanning sheet holding means.

34. An apparatus as defined in claim 33 wherein said rotation means comprises a motor, a circular supporting plate rotated by said motor, an eccentric pin secured to said circular supporting plate perpendicularly thereto, and an engagement groove formed in a side face of said scanning sheet holding means and engaged with said eccentric pin.

* * * * *